(12) United States Patent
Sakurabu et al.

(10) Patent No.: US 12,401,922 B2
(45) Date of Patent: *Aug. 26, 2025

(54) IMAGING ELEMENT, IMAGING APPARATUS, OPERATION METHOD OF IMAGING ELEMENT, AND PROGRAM

(71) Applicant: FUJIFILM CORPORATION, Tokyo (JP)

(72) Inventors: Hitoshi Sakurabu, Saitama (JP); Makoto Kobayashi, Saitama (JP); Ryo Hasegawa, Saitama (JP); Tomoyuki Kawai, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,291

(22) Filed: Dec. 14, 2023

(65) Prior Publication Data

US 2024/0114260 A1     Apr. 4, 2024

Related U.S. Application Data

(63) Continuation of application No. 18/165,229, filed on Feb. 6, 2023, now Pat. No. 11,882,375, which is a
(Continued)

(30) Foreign Application Priority Data

Mar. 13, 2019     (JP) ................................ 2019-046435

(51) Int. Cl.
*H04N 25/75*     (2023.01)
*H04N 25/704*     (2023.01)
(Continued)

(52) U.S. Cl.
CPC ........... *H04N 25/75* (2023.01); *H04N 25/704* (2023.01); *H04N 25/71* (2023.01); *H04N 25/772* (2023.01)

(58) Field of Classification Search
None
See application file for complete search history.

(56) References Cited

U.S. PATENT DOCUMENTS 11,509,823 B2    11/2022    Kawai et al.
11,616,927 B2     3/2023    Sakurabu et al.
(Continued)

FOREIGN PATENT DOCUMENTS

CN    1649393 A      8/2005
CN    103404126 A    11/2013
(Continued)

OTHER PUBLICATIONS

English language translation of the following: Office action dated Jul. 8, 2024 from the SIPO in a Chinese patent application No. 202310033460.3 corresponding to the instant patent application. This office action translation is submitted now in order to supplement the understanding of the cited references which are being disclosed in the instant Information Disclosure Statement.
(Continued)

*Primary Examiner* — Mark T Monk
(74) *Attorney, Agent, or Firm* — SOLARIS Intellectual Property Group, PLLC

(57) ABSTRACT

An imaging element includes a reading circuit that reads out pixel data obtained by imaging a subject at a first frame rate, a memory that stores the read pixel data, and an output circuit that outputs image data based on the stored pixel data at a second frame rate. The first frame rate is a frame rate higher than the second frame rate. The pixel data includes phase difference pixel data and non-phase difference pixel
(Continued)

data different from the phase difference pixel data. The reading circuit reads out the pixel data of each of a plurality of frames in parallel within an output period defined by the second frame rate as a period in which the image data of one frame is output, and performs reading of the non-phase difference pixel data and a plurality of reading of the phase difference pixel data within the output period.

25 Claims, 31 Drawing Sheets

Related U.S. Application Data continuation of application No. 17/400,133, filed on Aug. 12, 2021, now Pat. No. 11,616,927, which is a continuation of application No. PCT/JP2020/002930, filed on Jan. 28, 2020.

(51) Int. Cl.
*H04N 25/71* (2023.01)
*H04N 25/772* (2023.01)

(56) References Cited

U.S. PATENT DOCUMENTS

| | | | |
|---|---|---|---|
| 11,882,375 B2* | 1/2024 | Sakurabu | H04N 23/60 |
| 2005/0168610 A1 | 8/2005 | Kobayashi | |
| 2014/0085512 A1 | 3/2014 | Ikeda et al. | |
| 2015/0085172 A1 | 3/2015 | Uenishi | |
| 2016/0353005 A1 | 12/2016 | Kaibara | |
| 2018/0115729 A1 | 4/2018 | Ise et al. | |
| 2021/0377479 A1 | 12/2021 | Sakurabu et al. | |

FOREIGN PATENT DOCUMENTS

| | | |
|---|---|---|
| JP | 2014-178603 A | 9/2014 |
| JP | 2018-66928 A | 4/2018 |
| JP | 2018-195892 A | 12/2018 |
| JP | 7481313 B2 | 5/2024 |

OTHER PUBLICATIONS

International Search Report issued in International Application No. PCT/JP2020/002930 on Apr. 28, 2020.
Written Opinion of the ISA issued in International Application No. PCT/JP2020/002930 on Apr. 28, 2020.
Notice of Allowance issued by USPTO on Dec. 7, 2022, in relatedU.S. Appl. No. 17/400,133.
Non-Final Office Action issued by USPTO on Jun. 14, 2023, in related U.S. Appl. No. 18/165,229.
Notice of Allowance issued by USPTO on Sep. 20, 2023, in related U.S. Appl. No. 18/165,229.
English language translation of the following: Office action dated Jun. 24, 2025 from the JPO in a Japanese patent application No. 2024-071724 corresponding to the instant patent application. This office action translation is submitted now in order to supplement the understanding of the cited references which are being disclosed in the instant Information Disclosure Statement.

* cited by examiner

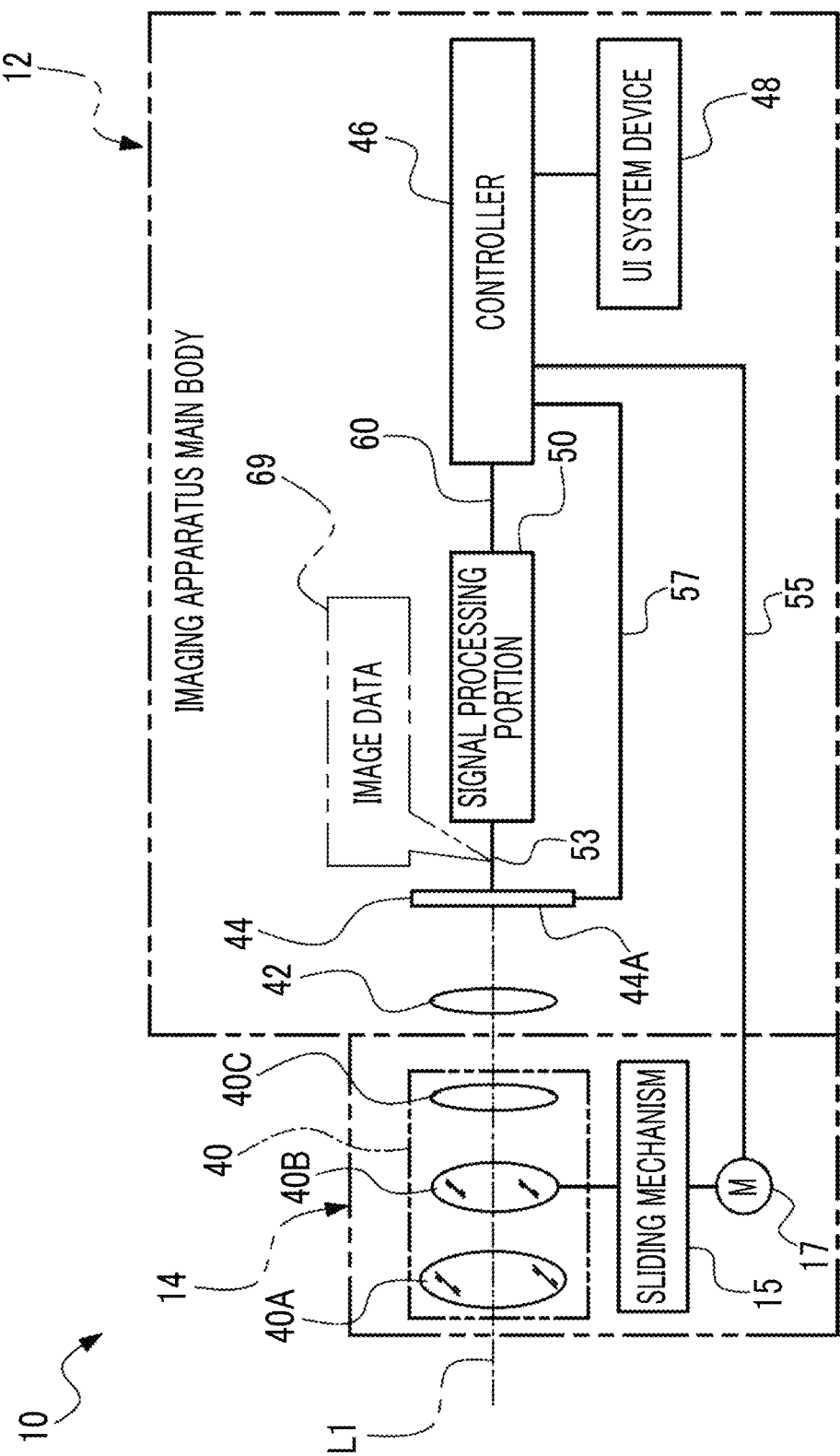

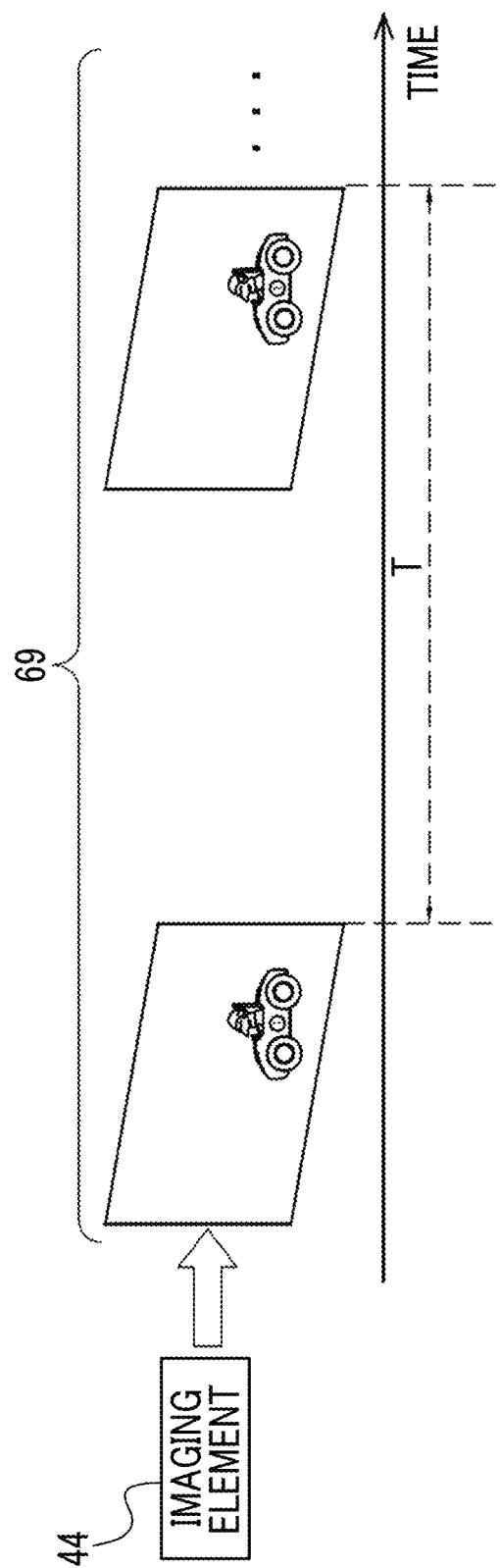

US 12,401,922 B2

IMAGING ELEMENT, IMAGING APPARATUS, OPERATION METHOD OF IMAGING ELEMENT, AND PROGRAM

CROSS-REFERENCE TO RELATED APPLICATIONS

This application is a continuation application of U.S. application Ser. No. 18/165,229, filed on Feb. 6, 2023, which is a continuation of U.S. application Ser. No. 17/400,133, filed on Aug. 12, 2021, which is a continuation application of International Application No. PCT/JP2020/002930, filed on Jan. 28, 2020. Further, this application claims priority from Japanese Patent Application No. 2019-046435, filed on Mar. 13, 2019. The entire disclosure of each of the applications above is incorporated herein by reference.

BACKGROUND

1. Technical Field

The technology of the present disclosure relates to an imaging element, an imaging apparatus, an operation method of an imaging element, and a program.

2. Description of the Related Art

JP2014-178603A discloses an imaging apparatus comprising an imaging unit, a region-of-interest decision unit, a control unit, and a focal point detection unit.

In the imaging apparatus disclosed in JP2014-178603A, the imaging unit has a plurality of imaging regions and generates image signals corresponding to rays incident on the imaging regions. The region-of-interest decision unit decides a region-of-interest of an image indicated by the image signals based on the image signals output from the imaging unit.

The control unit includes a first control portion and a second control portion. The first control portion performs a control such that an imaging region on which an optical image corresponding to the region-of-interest is incident among the plurality of imaging regions is imaged under a first imaging condition. The second control portion performs a control such that an imaging region other than the imaging region on which the optical image corresponding to the region-of-interest is incident among the plurality of imaging regions is imaged under a second imaging condition different from the first imaging condition. The focal point detection unit detects a focal point adjustment state of the region-of-interest. The first control portion performs a control for performing imaging at a higher frame rate than the second control portion.

SUMMARY

An embodiment according to the technology of the present disclosure provides an imaging element, an imaging apparatus, an operation method of an imaging element, and a program capable of increasing accuracy of auto-focus with a simple configuration, compared to a case of reading out pixel data a plurality of number of times from a pixel dedicated to the auto-focus within a reading period in which an image of one frame is read out.

A first aspect according to the technology of the present disclosure is an imaging element that includes a phase difference pixel and comprises a reading portion that reads out pixel data obtained by imaging a subject at a first frame rate and is incorporated in the imaging element, a storage portion that stores the pixel data read out by the reading portion and is incorporated in the imaging element, and an output portion that outputs image data based on the pixel data stored in the storage portion at a second frame rate and is incorporated in the imaging element, in which the first frame rate is a frame rate higher than the second frame rate, the pixel data includes phase difference pixel data and non-phase difference pixel data different from the phase difference pixel data, and the reading portion reads out the pixel data of each of a plurality of frames in parallel within an output period defined by the second frame rate as a period in which the image data of one frame is output, and performs reading of the non-phase difference pixel data and a plurality of reading of the phase difference pixel data within the output period. Accordingly, high accuracy of auto-focus can be achieved with a simpler configuration than in a case where the pixel data is read out a plurality of number of times from a pixel dedicated to the auto-focus within a reading period in which an image of one frame is read out.

A second aspect according to the technology of the present disclosure is the imaging element according to the first aspect, in which the reading portion performs reading of the non-phase difference pixel data and reading of the phase difference pixel data in parallel. Accordingly, more pieces of the phase difference pixel data and the non-phase difference pixel data can be read out within a limited time period, compared to a case where reading of one of the non-phase difference pixel data and the phase difference pixel data is started after reading of the other is completed.

A third aspect according to the technology of the present disclosure is the imaging element according to the first or second aspect, in which the reading portion reads out the pixel data in units of lines. Accordingly, the pixel data can be thinned out in units of lines.

A fourth aspect according to the technology of the present disclosure is the imaging element according to any one of the first to third aspects, in which the phase difference pixel data is pixel data of the phase difference pixel, and the non-phase difference pixel data is pixel data of a non-phase difference pixel that is a pixel different from the phase difference pixel. The phase difference pixel data and the non-phase difference pixel data can be easily obtained, compared to a case of generating the phase difference pixel data from pixel data of a pixel other than the phase difference pixel and generating the non-phase difference pixel data from pixel data of a pixel other than the non-phase difference pixel.

A fifth aspect according to the technology of the present disclosure is the imaging element according to the fourth aspect, in which reading of the non-phase difference pixel data is reading of the non-phase difference pixel data from the non-phase difference pixel, and the plurality of reading of the phase difference pixel data is a plurality of reading of the phase difference pixel data from the phase difference pixel. Accordingly, the non-phase difference pixel data and a plurality of pieces of the phase difference pixel data can be obtained within the output period, compared to a case where reading of the phase difference pixel data from the phase difference pixel and reading of the non-phase difference pixel data from the non-phase difference pixel are alternately performed once for each output period.

A sixth aspect according to the technology of the present disclosure is the imaging element according to the fourth or fifth aspect, further comprising an imaging surface on which a plurality of first lines including the phase difference pixel and a plurality of second lines consisting of only the non-phase difference pixel are arranged, in which the reading portion includes a first reading portion that reads out the phase difference pixel data from each phase difference pixel included in the plurality of first lines, and a second reading portion that reads out the non-phase difference pixel data from each non-phase difference pixel included in the plurality of second lines. Accordingly, a load exerted on reading of the phase difference pixel data and a load exerted on reading of the non-phase difference pixel data can be distributed.

A seventh aspect according to the technology of the present disclosure is the imaging element according to the sixth aspect, in which reading of the phase difference pixel data from the phase difference pixel by the first reading portion and reading of the non-phase difference pixel data from the non-phase difference pixel by the second reading portion are independently performed. Accordingly, a case where one of reading of the phase difference pixel data and reading of the non-phase difference pixel data affects the other can be avoided.

An eighth aspect according to the technology of the present disclosure is the imaging element according to the seventh aspect, in which in a reading period of one frame, reading of the phase difference pixel data from the phase difference pixel by the first reading portion is performed earlier than reading of the non-phase difference pixel data from the non-phase difference pixel by the second reading portion. Accordingly, the phase difference pixel data can be quickly used for processing of the auto-focus, compared to a case where reading of the non-phase difference pixel data is performed earlier than reading of the phase difference pixel data.

A ninth aspect according to the technology of the present disclosure is the imaging element according to any one of the sixth to eighth aspects, in which the first lines are lines in which the phase difference pixel and the non-phase difference pixel are periodically arranged. Accordingly, accuracy of the auto-focus for a wide area can be increased, compared to a case of using a line in which the phase difference pixels and the non-phase difference pixels are arranged in a locally concentrated manner.

A tenth aspect according to the technology of the present disclosure is the imaging element according to any one of the sixth to ninth aspects, in which on the imaging surface, the first lines and a predetermined number of lines of the second lines are alternately arranged in a direction intersecting with a line direction of the first lines. Accordingly, the accuracy of the auto-focus for the wide area can be increased, compared to a case where the first lines and the second lines are arranged in a locally concentrated manner in the direction intersecting with the line direction of the first lines.

An eleventh aspect according to the technology of the present disclosure is the imaging element according to any one of the first to tenth aspects, in which the reading portion reads out the non-phase difference pixel data of one frame as recording pixel data within a reading period of one frame, and reads out the phase difference pixel data during reading of the non-phase difference pixel data as the recording pixel data. Accordingly, more pieces of the non-phase difference pixel data as the recording pixel data and the phase difference pixel data can be read out within a limited time period, compared to a case where the phase difference pixel data is read out after waiting for reading of the non-phase difference pixel data as the recording pixel data.

A twelfth aspect according to the technology of the present disclosure is the imaging element according to the eleventh aspect, in which the reading portion reads out the non-phase difference pixel data and the phase difference pixel data as display pixel data within the reading period of one frame, and reads out the non-phase difference pixel as the recording pixel data in a case where a predetermined condition is satisfied. Accordingly, general-purpose properties can be increased, compared to a case of reading out non-phase difference pixel data at all times as the recording pixel data.

A thirteenth aspect according to the technology of the present disclosure is the imaging element according to the eleventh aspect, in which the reading portion reads out the non-phase difference pixel data as the recording pixel data in a case of a continuous shooting mode. Accordingly, in a case of the continuous shooting mode, the non-phase difference pixel data read out as the recording pixel data can be recorded.

A fourteenth aspect according to the technology of the present disclosure is the imaging element according to any one of the first to thirteenth aspects, further comprising a derivation portion that derives a correction coefficient for correcting light reduction characteristics caused by the phase difference pixel based on the phase difference pixel data, in which the output portion outputs the correction coefficient derived by the derivation portion. Accordingly, light reduction characteristics appearing in an image based on the phase difference pixel data can be corrected.

A fifteenth aspect according to the technology of the present disclosure is the imaging element according to any one of the first to fourteenth aspects, in which the image data includes first pixel data based on the non-phase difference pixel data and second pixel data based on the phase difference pixel data obtained by the plurality of reading, and in a case of outputting the image data of one frame, the output portion outputs the first pixel data and the second pixel data at different timings. Accordingly, it is possible to contribute to size reduction of the imaging element, compared to a case of using a dedicated output circuit for each of the phase difference pixel data and the non-phase difference pixel data.

A sixteenth aspect according to the technology of the present disclosure is the imaging element according to the fifteenth aspect, in which the output portion outputs the first pixel data after output of the second pixel data is completed. Accordingly, the phase difference pixel data can be quickly used for processing of the auto-focus, compared to a case where the phase difference pixel data is output after output of the non-phase difference pixel data is completed.

A seventeenth aspect according to the technology of the present disclosure is the imaging element according to any one of the first to sixteenth aspects, in which the image data includes pixel data based on the non-phase difference pixel data and pixel data based on a statistical value of the phase difference pixel data obtained by the plurality of reading. Accordingly, an output data amount from the imaging element can be decreased, compared to a case of outputting a plurality of pieces of the phase difference pixel data obtained for each frame.

An eighteenth aspect according to the technology of the present disclosure is the imaging element according to the seventeenth aspect, in which the statistical value is an arithmetic mean value of the phase difference pixel data. Accordingly, the output data amount from the imaging element can be decreased, compared to a case of outputting the plurality of pieces of phase difference pixel data obtained for each frame.

A nineteenth aspect according to the technology of the present disclosure is the imaging element according to any one of the first to eighteenth aspects, further comprising an A/D converter that is shared for the phase difference pixel data and the non-phase difference pixel data, in which the A/D converter performs A/D conversion on the phase difference pixel data and the non-phase difference pixel data at different timings. Accordingly, it is possible to contribute to size reduction of the imaging element, compared to a case of using a dedicated A/D converter for each of the phase difference pixel data and the non-phase difference pixel data.

A twentieth aspect according to the technology of the present disclosure is the imaging element according to any one of the first to eighteenth aspects, further comprising a plurality of A/D converters, in which the plurality of A/D converters include a first A/D converter used for only the phase difference pixel data and a second A/D converter used for only the non-phase difference pixel data. Accordingly, the A/D conversion of the phase difference pixel data and the A/D conversion of the non-phase difference pixel data can be performed in parallel in the output period.

A twenty-first aspect according to the technology of the present disclosure is the imaging element according to any one of the first to twentieth aspects, in which at least a photoelectric conversion element and the storage portion are formed in one chip. Accordingly, portability of the imaging element is increased, compared to an imaging element in which the photoelectric conversion element and the storage portion are not formed in one chip.

A twenty-second aspect according to the technology of the present disclosure is the imaging element according to the twenty-first aspect, in which the imaging element is a laminated imaging element in which the photoelectric conversion element is laminated with the storage portion. Accordingly, a transfer speed of the image data from the photoelectric conversion element to the storage portion can be increased, compared to a case of not laminating the photoelectric conversion element and the storage portion.

A twenty-third aspect according to the technology of the present disclosure is an imaging apparatus comprising the imaging element according to any one of the first to twenty-second aspects, and a control portion that performs at least one of a control for displaying the image based on the image data output by the output portion on a display portion or a control for storing the image data output by the output portion in a storage device. Accordingly, high accuracy of the auto-focus can be achieved with a simpler configuration than in a case where the pixel data is read out a plurality of number of times from the pixel dedicated to the auto-focus within the reading period in which the image of one frame is read out.

A twenty-fourth aspect according to the technology of the present disclosure is an operation method of an imaging element including a phase difference pixel, a reading portion that reads out pixel data obtained by imaging a subject at a first frame rate, a storage portion that stores the pixel data read out by the reading portion, and an output portion that outputs image data based on the pixel data stored in the storage portion at a second frame rate, the imaging element incorporating the reading portion, the storage portion, and the output portion, in which the first frame rate is a frame rate higher than the second frame rate, the pixel data includes phase difference pixel data and non-phase difference pixel data different from the phase difference pixel data, and the operation method comprises, by the reading portion, reading out the pixel data of each of a plurality of frames in parallel within an output period defined by the second frame rate as a period in which the image data of one frame is output, and performing reading of the non-phase difference pixel data and a plurality of reading of the phase difference pixel data within the output period. Accordingly, high accuracy of the auto-focus can be achieved with a simpler configuration than in a case where the pixel data is read out a plurality of number of times from the pixel dedicated to the auto-focus within the reading period in which the image of one frame is read out.

A twenty-fifth aspect according to the technology of the present disclosure is a program causing a computer to function as a reading portion and an output portion included in an imaging element including a phase difference pixel, the reading portion that reads out pixel data obtained by imaging a subject at a first frame rate, a storage portion that stores the pixel data read out by the reading portion, and the output portion that outputs image data based on the pixel data stored in the storage portion at a second frame rate, the imaging element incorporating the reading portion, the storage portion, and the output portion, in which the first frame rate is a frame rate higher than the second frame rate, the pixel data includes phase difference pixel data and non-phase difference pixel data different from the phase difference pixel data, and the reading portion reads out the pixel data of each of a plurality of frames in parallel within an output period defined by the second frame rate as a period in which the image data of one frame is output, and performs reading of the non-phase difference pixel data and a plurality of reading of the phase difference pixel data within the output period. Accordingly, high accuracy of the auto-focus can be achieved with a simpler configuration than in a case where the pixel data is read out a plurality of number of times from the pixel dedicated to the auto-focus within the reading period in which the image of one frame is read out.

A twenty-sixth aspect according to the technology of the present disclosure is an imaging element including a phase difference pixel and incorporating a processor and a memory, in which the processor is configured to read out pixel data obtained by imaging a subject at a first frame rate, the memory stores the pixel data read out by the processor, image data based on the pixel data stored in the memory is output at a second frame rate, the first frame rate is a frame rate higher than the second frame rate, the pixel data includes phase difference pixel data and non-phase difference pixel data different from the phase difference pixel data, and the processor is configured to read out the pixel data of each of a plurality of frames in parallel within an output period defined by the second frame rate as a period in which the image data of one frame is output, and perform reading of the non-phase difference pixel data and a plurality of reading of the phase difference pixel data within the output period.

BRIEF DESCRIPTION OF THE DRAWINGS

Exemplary embodiments of the technology of the disclosure will be described in detail based on the following figures, wherein:

FIG. 2 is a block diagram illustrating an example of a configuration of the imaging apparatus according to the first and second embodiments;

FIG. 3B is a conceptual diagram for describing an output frame rate of the imaging element included in the imaging apparatus according to the first and second embodiments;

DETAILED DESCRIPTION

Hereinafter, an example of embodiments of an imaging apparatus according to the embodiments of the technology of the present disclosure will be described in accordance with the appended drawings.

First, meanings of terms used in the following description will be described.

The abbreviation CPU stands for "Central Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory".

The abbreviation LSI stands for "Large-Scale Integration". The abbreviation ASIC stands for "Application Specific Integrated Circuit". The abbreviation PLD stands for "Programmable Logic Device". The abbreviation FPGA stands for "Field-Programmable Gate Array".

The abbreviation SSD stands for "Solid State Drive". The abbreviation DVD-ROM stands for "Digital Versatile Disc Read Only Memory". The abbreviation USB stands for "Universal Serial Bus". The abbreviation HDD stands for "Hard Disk Drive". The abbreviation EEPROM stands for "Electrically Erasable and Programmable Read Only Memory".

The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation OF stands for "Interface". The abbreviation UI stands for "User Interface". The abbreviation PC stands for "Personal Computer". The abbreviation AF stands for "Auto-Focus". The abbreviation AE stands for "Automatic Exposure". The abbreviation SoC stands for "System-on-a-chip".

First Embodiment

Figure 1:
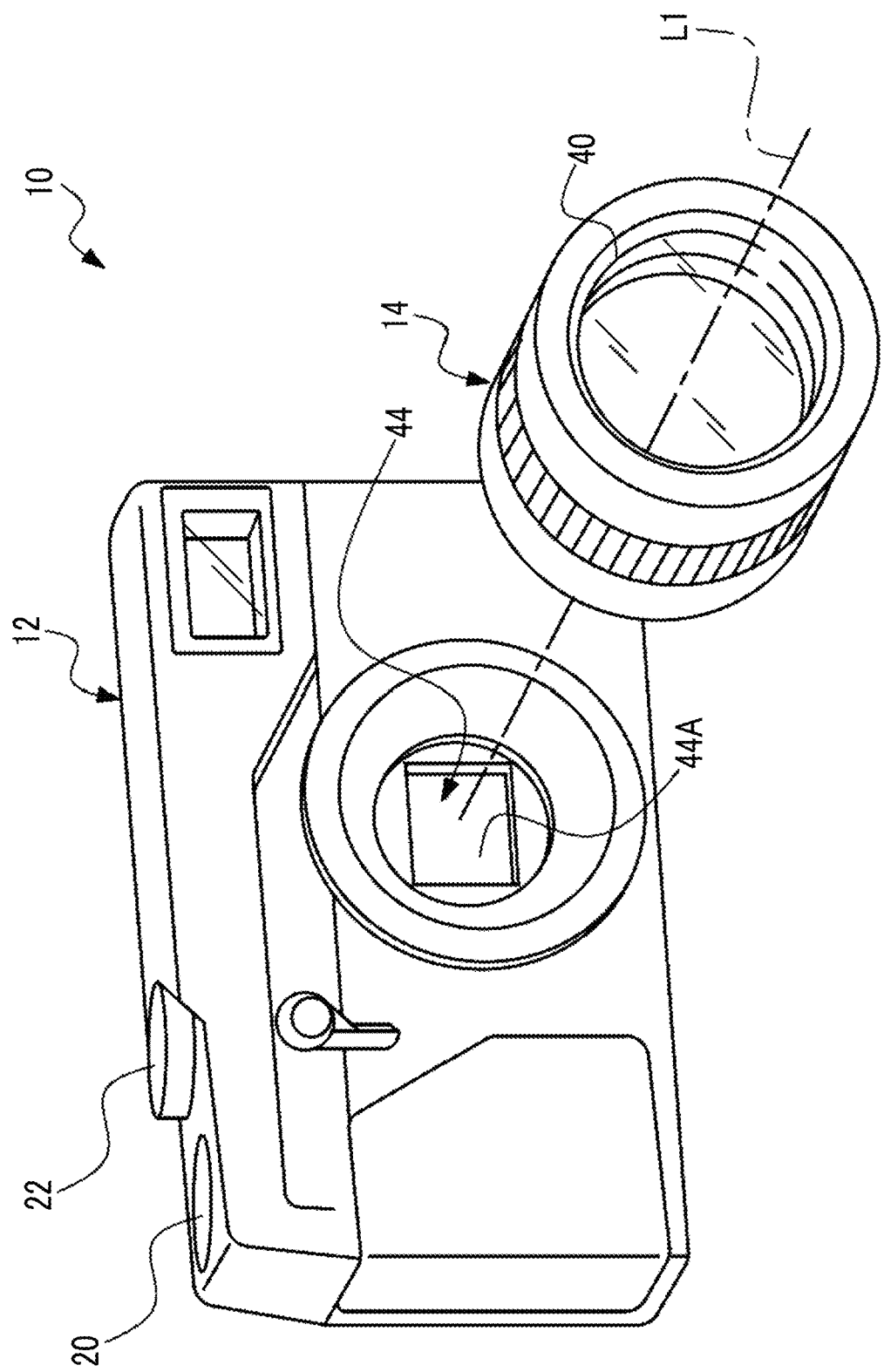
FIG. 1 is a perspective view illustrating an example of an exterior of an imaging apparatus according to first and second embodiments.

As illustrated in FIG. 1 as an example, an imaging apparatus 10 is an interchangeable lens camera. The imaging apparatus 10 comprises an imaging apparatus main body 12 and an interchangeable lens 14 that is interchangeably mounted on the imaging apparatus main body 12.

An imaging element 44 is disposed in the imaging apparatus main body 12. In a case where the interchangeable lens 14 is mounted on the imaging apparatus main body 12, subject light showing a subject is transmitted through the interchangeable lens 14, and an image of the subject light is formed on an imaging surface 44A of the imaging element 44.

A release button 20 and a dial 22 are disposed on an upper surface of the imaging apparatus main body 12. The dial 22 is operated in a case of setting an operation mode of an imaging system, an operation mode of a playback system, and the like. The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10, an imaging mode and a playback mode are selectively set as an operation mode in accordance with an instruction of a user. The imaging mode is broadly divided into a display motion picture imaging mode and a recording imaging mode. In each of the display motion picture imaging mode and the recording imaging mode, an AF mode is set in accordance with the instruction of the user.

In the display motion picture imaging mode, in a case where the AF mode is set, imaging for a display motion picture image is performed by setting an exposure state by performing an AE function and performing a focusing control by performing an AF function for each frame. A live view image is generated by performing imaging for the display motion picture image. Generally, the live view image is also referred to as a live preview image.

The recording imaging mode is broadly divided into a motion picture image recording imaging mode and a still picture image recording imaging mode. The motion picture image recording imaging mode and the still picture image recording imaging mode are selectively set in accordance with the instruction of the user. In the imaging apparatus 10, in the motion picture image recording imaging mode, in a case where the AF mode is set, imaging for a recording motion picture image is performed by setting the exposure state by performing the AE function and performing the focusing control by performing the AF function for each frame. A motion picture image obtained by performing the imaging for the recording motion picture image is recorded on a predetermined recording medium such as a memory card or a USB memory (hereinafter, simply referred to as the "predetermined recording medium"). The motion picture image obtained by performing the imaging for the recording motion picture image is an example of "recording pixel data" according to the embodiments of the technology of the present disclosure.

In the still picture image recording imaging mode, in a case where the AF mode is set, an imaging condition is adjusted by setting the release button 20 to the half push state. Then, in a case where the full push state is subsequently set, imaging for a still picture image is performed. That is, by setting the release button 20 to the half push state, the exposure state is set by performing the AE function, and then, the focusing control is performed by performing the AF function. In a case where the release button 20 is set to the full push state, imaging for a recording still picture image is performed. A still picture image obtained by performing the imaging for the recording still picture image is recorded on the predetermined recording medium. The still picture image obtained by performing the imaging for the recording still picture image is an example of the "recording pixel data" according to the embodiments of the technology of the present disclosure.

As illustrated in FIG. 2 as an example, the interchangeable lens 14 includes an imaging lens 40. The imaging lens 40 comprises an objective lens 40A, a focus lens 40B, and a stop 40C. The objective lens 40A, the focus lens 40B, and the stop 40C are arranged in an order of the objective lens 40A, the focus lens 40B, and the stop 40C along an optical axis L1 from a subject side to an imaging apparatus main body 12 side. The stop 40C operates by receiving motive power from a driving source (not illustrated) such as a motor. Accordingly, an opening degree of the stop 40C is changed. By changing the opening degree of the stop 40C, exposure is adjusted.

The focus lens 40B is attached to a sliding mechanism 15. A motor 17 is connected to the sliding mechanism 15. The motor 17 generates motive power and operates the sliding mechanism 15 by transmitting the generated motive power to the sliding mechanism 15. The sliding mechanism 15 moves the focus lens 40B along the optical axis L1 in response to the motive power provided from the motor 17.

The motor 17 is connected to a controller 46 of the imaging apparatus main body 12 through a communication line 55. The motor 17 is controlled by the controller 46. In the AF mode, by moving the focus lens 40B along the optical axis L1 under control of the controller 46, the image of the subject light is formed on the imaging surface 44A of the imaging element 44 at a focus position corresponding to a subject distance. The "focus position" here refers to a position of the focus lens 40B on the optical axis L1 in a focused state. Hereinafter, for convenience of description, a control for aligning the focus lens 40B to the focus position will be referred to as an "AF control".

The imaging apparatus main body 12 comprises a mechanical shutter 42 and the imaging element 44. The mechanical shutter 42 operates by receiving motive power from a driving source (not illustrated) such as a motor. In a case where the interchangeable lens 14 is mounted on the imaging apparatus main body 12, the subject light is transmitted through the imaging lens 40, and the image of the subject light is formed on the imaging surface 44A of the imaging element 44 through the mechanical shutter 42.

The imaging apparatus main body 12 comprises the controller 46, a UI system device 48, and a signal processing portion 50. Each of the controller 46 and the signal processing portion 50 is implemented by an LSI. In addition, each of the controller 46 and the signal processing portion 50 is positioned on a rear stage of the imaging element 44 and thus, is referred to as a rear stage circuit of the imaging element 44.

The controller 46 controls the entire imaging apparatus 10. The UI system device 48 is a device that presents information to the user or receives an instruction from the user. The UI system device 48 is connected to the controller 46. The controller 46 acquires various types of information from the UI system device 48 and controls the UI system device 48.

The imaging element 44 is connected to the controller 46 through a communication line 57 and generates image data 69 indicating the image of the subject by imaging the subject under control of the controller 46.

The imaging element 44 is connected to the signal processing portion 50 through a communication line 53. The signal processing portion 50 is a device including an ASIC. The controller 46 is connected to the signal processing portion 50 through a communication line 60.

The image data 69 is input into the signal processing portion 50 from the imaging element 44 through the communication line 53. The signal processing portion 50 performs various types of signal processing on the image data 69 which is input from the imaging element 44 through the communication line 53. The various types of signal processing include well-known signal processing such as white balance adjustment, sharpness adjustment, gamma correction, color space conversion processing, and color difference correction.

While the device including the ASIC is illustrated as the signal processing portion 50 in the first embodiment, the technology of the present disclosure is not limited thereto. The signal processing portion 50 may be a device including an ASIC, an FPGA, and/or a PLD. In addition, the signal processing portion 50 may be a computer including a CPU, a ROM, and a RAM. The number of CPUs may be singular or plural. In addition, the signal processing portion 50 may be implemented by a combination of a hardware configuration and a software configuration.

The imaging element 44 is an example of a "laminated imaging element" according to the embodiments of the technology of the present disclosure. In the present embodiment, the imaging element 44 is a CMOS image sensor. In addition, while the CMOS image sensor is illustrated here as the imaging element 44, the technology of the present disclosure is not limited thereto. For example, the technology of the present disclosure is also established in a case where the imaging element 44 is a CCD image sensor.

Figure 3A:
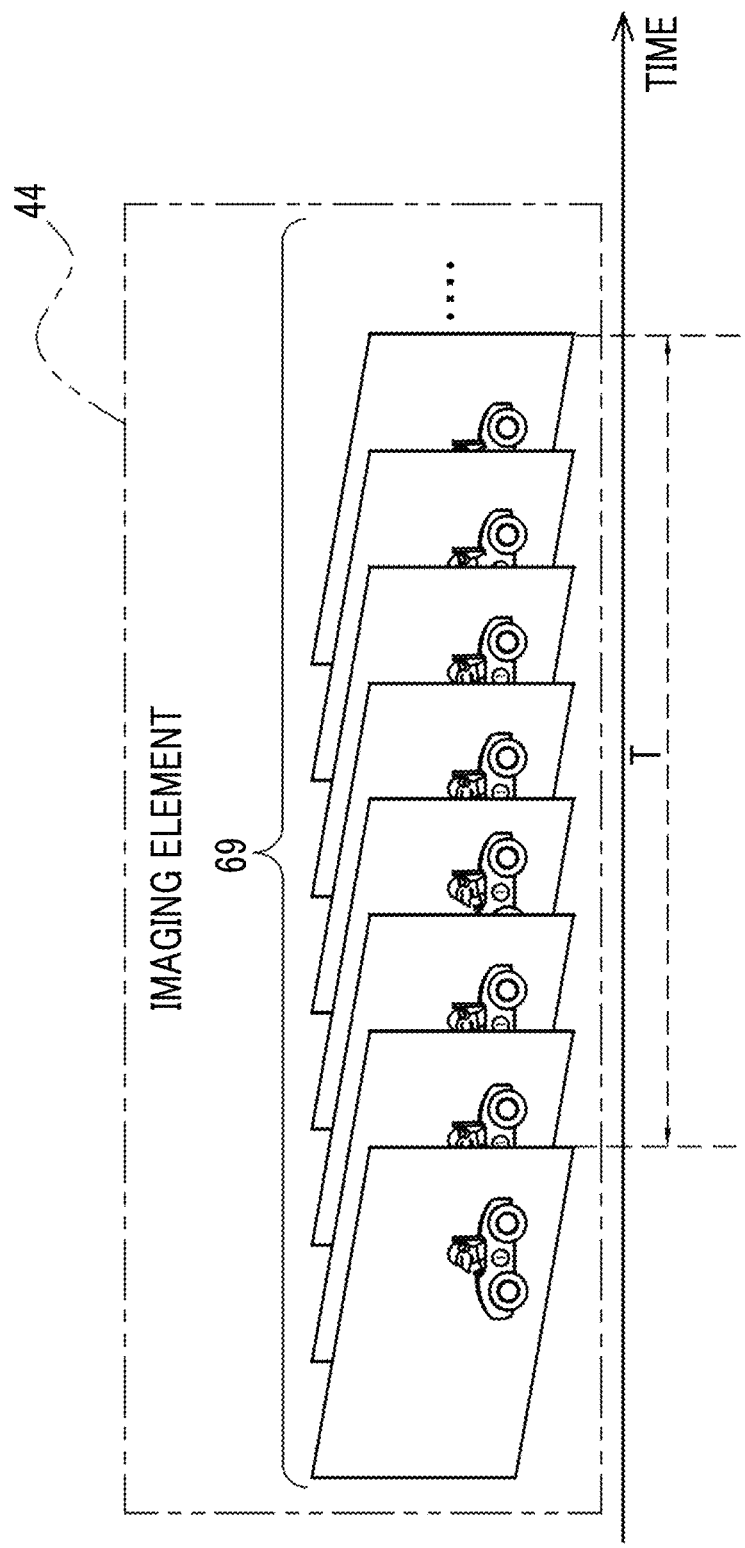
FIG. 3A is a conceptual diagram for describing an imaging frame rate of an imaging element included in the imaging apparatus according to the first and second embodiments.

In the imaging element 44, as illustrated in FIG. 3A as an example, a plurality of pieces of image data 69 each indicating the image of the subject are generated by imaging the subject at an imaging frame rate. In addition, in the imaging element 44, the generated plurality of pieces of image data 69 are output at an output frame rate. Any of the imaging frame rate and the output frame rate is a variable frame rate. The imaging frame rate is an example of a "first frame rate" according to the embodiments of the technology of the present disclosure, and the output frame rate is an example of a "second frame rate" according to the embodiments of the technology of the present disclosure.

The imaging frame rate and the output frame rate have a relationship of "imaging frame rate>output frame rate". That is, the imaging frame rate is a frame rate higher than the output frame rate. For example, the imaging frame rate is a frame rate at which imaging of eight frames is performed within a period T as illustrated in FIG. 3A, and the output frame rate is a frame rate at which two frames are output within the period T as illustrated in FIG. 3B. Specifically, 240 frames per second (fps) is exemplified as an example of the imaging frame rate, and 60 fps is exemplified as an example of the output frame rate.

Figure 4:
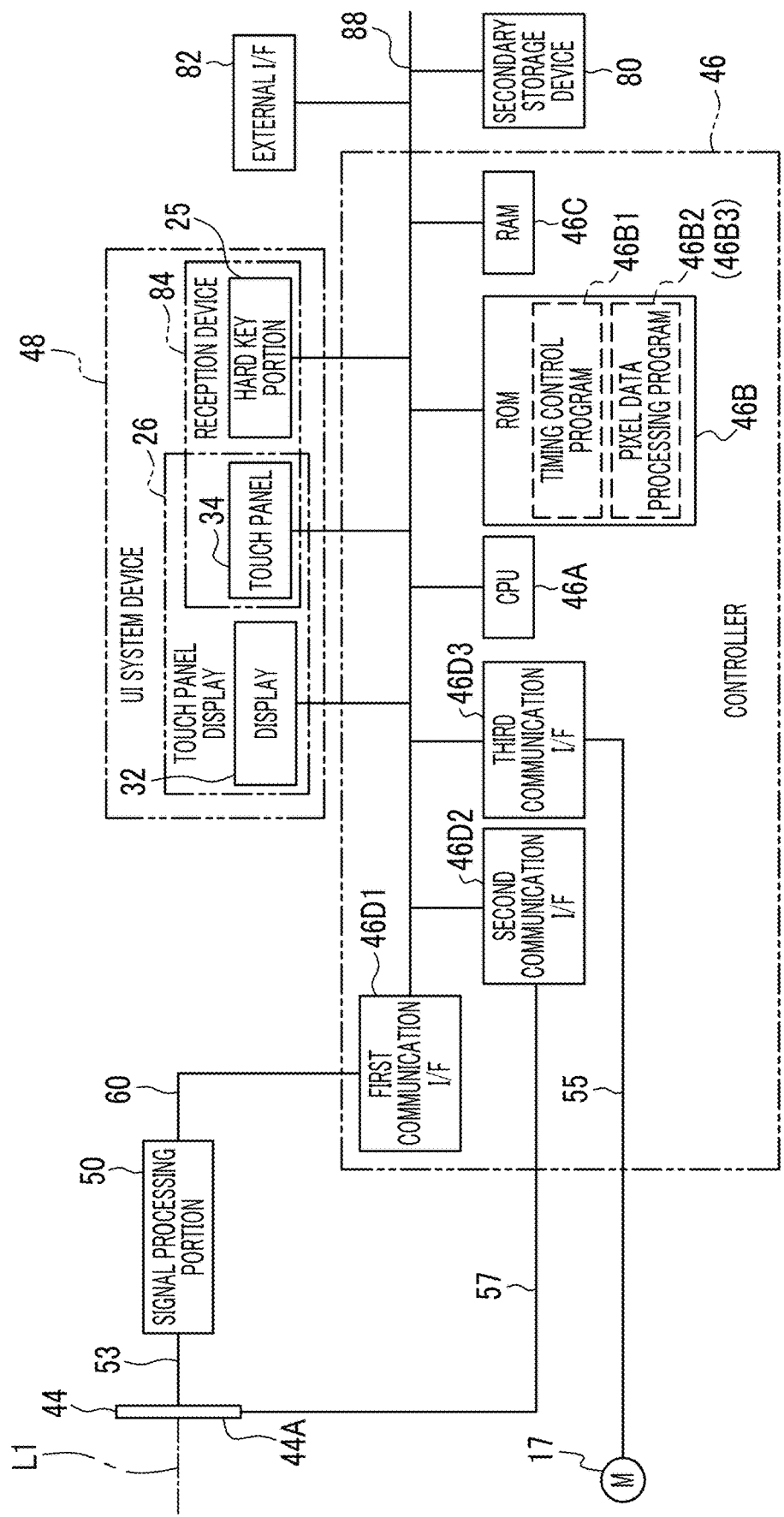
FIG. 4 is a block diagram illustrating an example of a configuration of an electric system of an imaging apparatus main body according to the first and second embodiments.

As illustrated in FIG. 4 as an example, the controller 46 comprises a CPU 46A, a ROM 46B, a RAM 46C, a first communication I/F 46D1, a second communication I/F 46D2, and a third communication I/F 46D3. The CPU 46A, the ROM 46B, the RAM 46C, the first communication I/F 46D1, the second communication I/F 46D2, and the third communication I/F 46D3 are connected to each other through a busline 88.

The ROM 46B stores various programs. The CPU 46A reads out the various programs from the ROM 46B and loads the read various programs into the RAM 46C. The CPU 46A controls the entire imaging apparatus 10 in accordance with the various programs loaded in the RAM 46C.

The various programs stored in the ROM 46B include a timing control program 46B1 and a pixel data processing program 46B2. The CPU 46A executes timing control processing (refer to FIG. 12), described later, in accordance with the timing control program 46B1. In addition, the CPU 46A executes pixel data processing (refer to FIG. 15), described later, in accordance with the pixel data processing program 46B2.

Each of the first communication I/F 46D1, the second communication I/F 46D2, and the third communication I/F 46D3 is a communication device including an FPGA. The first communication I/F 46D1 is connected to the signal processing portion 50 through the communication line 60. The image data 69 (refer to FIG. 2, FIG. 3A, and FIG. 3B) on which the various types of signal processing are performed by the signal processing portion 50 is input into the first communication I/F 46D1 through the communication line 60. The first communication I/F 46D1 transfers the image data 69 input from the signal processing portion 50 to the CPU 46A.

The second communication I/F 46D2 is connected to the imaging element 44 through the communication line 57. The CPU 46A controls the imaging element 44 through the second communication I/F 46D2.

The third communication I/F 46D3 is connected to the motor 17 through the communication line 55. The CPU 46A controls the motor 17 through the third communication I/F 46D3.

A secondary storage device 80 and an external I/F 82 are connected to the busline 88. The secondary storage device 80 is a non-volatile memory such as an SSD, an HDD, or an EEPROM. The CPU 46A reads out and writes various types of information in the secondary storage device 80.

The external I/F 82 is a communication device including an FPGA. The predetermined recording medium is connected to the external I/F 82. In addition, an external apparatus (not illustrated) such as a PC or a server is connected to the external I/F 82. The external I/F 82 exchanges various types of information between the CPU 46A and the external apparatus.

The UI system device 48 comprises the touch panel display 26 and a reception device 84. A display 32 is connected to the busline 88. A liquid crystal display is exemplified as an example of the display 32. Instead of the liquid crystal display, the display 32 may be a display of other types such as an organic EL display. The display 32 displays various images such as the live view image and the still picture image and also text information under control of the CPU 46A. The display 32 is an example of a "display portion (display)" according to the embodiments of the technology of the present disclosure. In addition, the CPU 46A is an example of a "control portion (processor)" according to the embodiments of the technology of the present disclosure.

The reception device 84 comprises a hard key portion 25 and a touch panel 34. The hard key portion 25 includes a plurality of hard keys including the release button 20 and the dial 22. The touch panel 34 is a transmissive touch panel and is overlaid on a surface of a display region of the display 32. The touch panel 34 detects a contact of an instruction object such as a finger or a stylus pen. The hard key portion 25 and the touch panel 34 are connected to the busline 88, and the CPU 46A operates in accordance with various instructions received by each of the hard key portion 25 and the touch panel 34.

Figure 5:
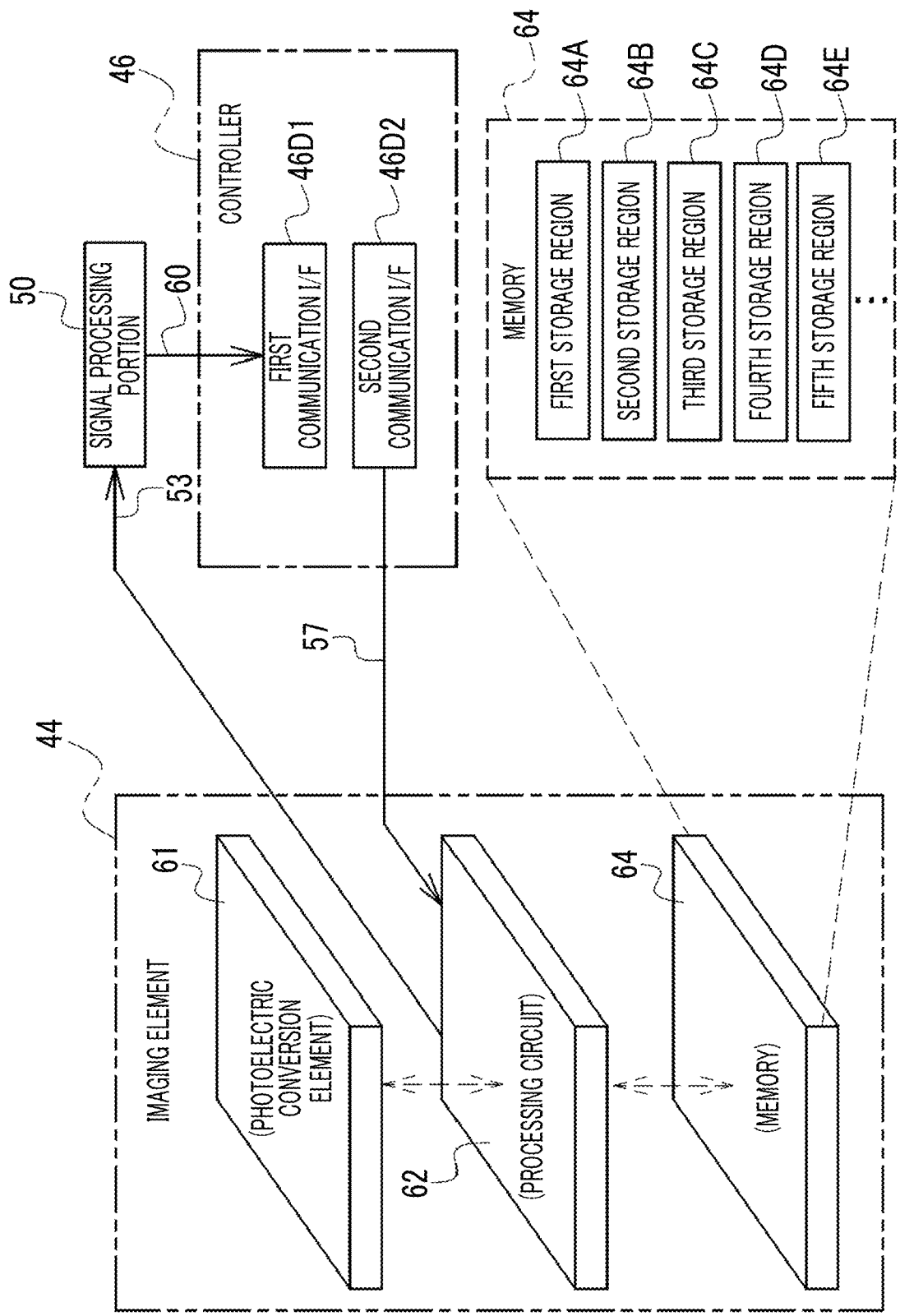
FIG. 5 is a block diagram illustrating an example of a laminated structure of the imaging element included in the imaging apparatus according to the first and second embodiments, and an example of a connection relationship among the imaging element, a signal processing portion, and a controller.

As illustrated in FIG. 5 as an example, the imaging element 44 incorporates a photoelectric conversion element 61, a processing circuit 62, and a memory 64. The imaging element 44 is an imaging element in which the photoelectric conversion element 61, the processing circuit 62, and the memory 64 are formed in one chip. That is, the photoelectric conversion element 61, the processing circuit 62, and the memory 64 are formed in one package. In the imaging element 44, the photoelectric conversion element 61 is laminated with the processing circuit 62 and the memory 64. Specifically, the photoelectric conversion element 61 and the processing circuit 62 are electrically connected to each other by a bump (not illustrated) of copper or the like having conductivity. The processing circuit 62 and the memory 64 are also electrically connected to each other by a bump (not illustrated) of copper or the like having conductivity. While a three-layer structure of the photoelectric conversion element 61, the processing circuit 62, and the memory 64 is illustrated here, the technology of the present disclosure is not limited thereto. A two-layer structure of the photoelectric conversion element 61 and a memory layer in which the processing circuit 62 and the memory 64 are formed in one layer may be used. The memory 64 is an example of a "storage portion (memory)" according to the embodiments of the technology of the present disclosure.

The processing circuit 62 is, for example, an LSI, and the memory 64 is, for example, a DRAM. However, the technology of the present disclosure is not limited thereto, and an SRAM may be employed as the memory 64 instead of the DRAM.

The processing circuit 62 is a device including an ASIC and an FPGA and controls the entire imaging element 44 in accordance with an instruction of the controller 46. While an example of implementing the processing circuit 62 by the device including the ASIC and the FPGA is exemplified here, the technology of the present disclosure is not limited thereto. For example, a device including an ASIC, an FPGA, and/or a PLD may be used. In addition, a computer including a CPU, a ROM, and a RAM may be employed as the processing circuit 62. The number of CPUs may be singular or plural. In addition, the processing circuit 62 may be implemented by a combination of a hardware configuration and a software configuration.

The photoelectric conversion element 61 includes a plurality of photodiodes arranged in a matrix form. Photodiodes of "4896×3265" pixels are exemplified as an example of the plurality of photodiodes.

Color filters are arranged in each photodiode included in the photoelectric conversion element 61. The color filters include a G filter corresponding to green (G) that most contributes to obtaining a brightness signal, an R filter corresponding to red (R), and a B filter corresponding to blue (B). The photoelectric conversion element 61 includes R pixels, G pixels, and B pixels (refer to FIG. 6). The R pixels are pixels corresponding to photodiodes in which the R filter is arranged. The G pixels are pixels corresponding to photodiodes in which the G filter is arranged. The B pixels are pixels corresponding to photodiodes in which the B filter is arranged.

The imaging element 44 has a so-called electronic shutter function and controls an electric charge accumulation time period of each photodiode in the photoelectric conversion element 61 by performing the electronic shutter function under control of the controller 46. The electric charge accumulation time period refers to a so-called shutter speed.

In the imaging apparatus 10, the imaging for the still picture image and imaging for the motion picture image are performed using a rolling shutter method. In the still picture image recording imaging mode, the imaging for the still picture image is implemented by performing the electronic shutter function and operating the mechanical shutter 42 (refer to FIG. 2). In addition, in the still picture image recording imaging mode, imaging for continuous shooting is implemented by performing the electronic shutter function without operating the mechanical shutter 42. In addition, in the motion picture image recording imaging mode, the imaging for the motion picture image is implemented by performing the electronic shutter function without operating the mechanical shutter 42. Furthermore, in the display motion picture imaging mode, imaging for the live view image is also implemented by performing the electronic shutter function without operating the mechanical shutter 42. While the rolling shutter method is illustrated here, the technology of the present disclosure is not limited thereto. A global shutter method may be applied instead of the rolling shutter method.

The processing circuit 62 reads out the image data 69 obtained by imaging the subject by the photoelectric conversion element 61. The image data 69 is signal electric charges accumulated in the photoelectric conversion element 61. The processing circuit 62 performs A/D conversion on the analog image data 69 read out from the photoelectric conversion element 61. The processing circuit 62 stores the digital image data 69 obtained by performing the A/D conversion on the analog image data 69 in the memory 64.

The processing circuit 62 is connected to the signal processing portion 50 through the communication line 53. In addition, the processing circuit 62 is connected to the second communication I/F 46D2 of the controller 46 through the communication line 57.

The memory 54 comprises a plurality of storage regions including a first storage region 64A, a second storage region 64B, a third storage region 64C, a fourth storage region 64D, and a fifth storage region 64E. For example, each of the plurality of storage regions stores the digital image data 69 at addresses corresponding to the pixels of the photoelectric conversion element 61 in units of pixels for each frame. In addition, the plurality of storage regions are randomly accessed by the processing circuit 62.

Figure 6:
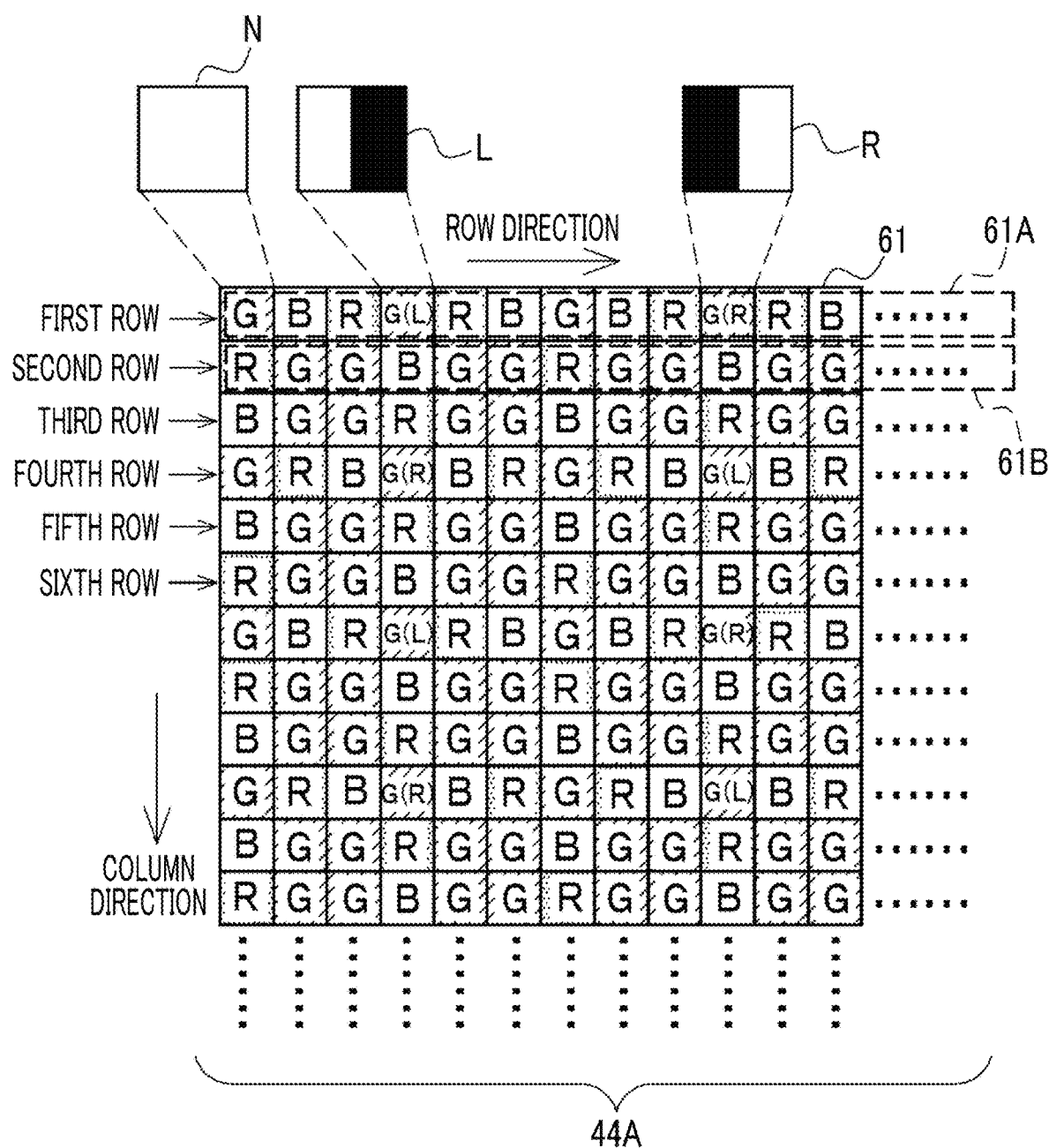
FIG. 6 is an arrangement diagram illustrating an example of arrangement, on an imaging surface, of each pixel included in a photoelectric conversion element of the imaging element included in the imaging apparatus according to the first and second embodiments.

As illustrated in FIG. 6 as an example, the R pixels, the G pixels, and the B pixels are arranged on the imaging surface 44A of the photoelectric conversion element 61 with predetermined periodicity in each of a row direction (horizontal direction) and a column direction (vertical direction). In the first embodiment, the R pixels, the G pixels, and the B pixels are arranged with periodicity corresponding to X-Trans (registered trademark) arrangement. While the X-Trans arrangement is illustrated in the example illustrated in FIG. 6, the technology of the present disclosure is not limited thereto. Arrangement of the R pixels, the G pixels, and the B pixels may be Bayer arrangement or honeycomb arrangement.

In the example illustrated in FIG. 6, in a first row, the R pixels, the G pixels, and the B pixels are arranged in circulation in an order of the G pixel, the B pixel, the R pixel, the G pixel, the R pixel, and the B pixel in the row direction. In addition, in a second row, the R pixels, the G pixels, and the B pixels are arranged in circulation in an order of the R pixel, the G pixel, the G pixel, the B pixel, the G pixel, and the G pixel in the row direction. In addition, in a third row, the R pixels, the G pixels, and the B pixels are arranged in circulation in an order of the B pixel, the G pixel, the G pixel, the R pixel, the G pixel, and the G pixel in the row direction. In addition, in a fourth row, the R pixels, the G pixels, and the B pixels are arranged in circulation in an order of the G pixel, the R pixel, the B pixel, the G pixel, the B pixel, and the R pixel in the row direction. In addition, in a fifth row, the R pixels, the G pixels, and the B pixels are arranged in circulation in an order of the B pixel, the G pixel, the G pixel, the R pixel, the G pixel, and the G pixel in the row direction. Furthermore, in a sixth row, the R pixels, the G pixels, and the B pixels are arranged in circulation in an order of the R pixel, the G pixel, the G pixel, the B pixel, the G pixel, and the G pixel in the row direction. An arrangement pattern of the R pixels, the G pixels, and the B pixels of the entire photoelectric conversion element 61 is formed by repetition of an arrangement pattern of the R pixels, the G pixels, and the B pixels of the first row to the sixth row in units of six rows in the column direction.

The photoelectric conversion element 61 is formed by two types of photosensitive pixels of phase difference pixels and non-phase difference pixels N that are pixels different from the phase difference pixels. Generally, the non-phase difference pixels N are also referred to as normal pixels. A plurality of phase difference pixel lines 61A and a plurality of non-phase difference pixel lines 61B are arranged on the imaging surface 44A. The phase difference pixel lines 61A are horizontal lines including the phase difference pixels. Specifically, the phase difference pixel lines 61A are horizontal lines in which the phase difference pixels and the non-phase difference pixels N coexist. The non-phase difference pixel lines 61B are horizontal lines including only a plurality of non-phase difference pixels N, that is, horizontal lines consisting of a plurality of non-phase difference pixels N. The phase difference pixel lines 61A are an example of a "first line" according to the embodiments of the technology of the present disclosure, and the non-phase difference pixel lines 61B are an example of a "second line" according to the embodiments of the technology of the present disclosure.

As illustrated in FIG. 6 as an example, the phase difference pixel lines 61A and a predetermined number of lines of the non-phase difference pixel lines 61B are alternately arranged on the imaging surface 44A in the column direction. For example, the "predetermined number of lines" here refer to two lines. While two lines are illustrated here as the predetermined number of lines, the technology of the present disclosure is not limited thereto. The predetermined number of lines may be a few lines more than or equal to three lines, ten and a few lines, a few tens of lines, a few hundred lines, or the like. In addition, in the example illustrated in FIG. 6, the row direction is an example of a "line direction of the first line" according to the embodiments of the technology of the present disclosure, and the column direction is an example of a "direction intersecting with the line direction of the first line" according to the embodiments of the technology of the present disclosure.

The phase difference pixel lines 61A are arranged in the column direction by skipping two lines at a time from the first row to a last row. Pixels of a part of the phase difference pixel lines 61A are the phase difference pixels. Specifically, the phase difference pixel lines 61A are horizontal lines in which the phase difference pixels and the non-phase difference pixels N are periodically arranged. The phase difference pixels are broadly divided into first phase difference pixels L and second phase difference pixels R. In the phase difference pixel lines 61A, the first phase difference pixels L and the second phase difference pixels R are alternately arranged at intervals of a few pixels in the line direction as the G pixels.

The first phase difference pixels L and the second phase difference pixels R are arranged to alternately appear in the column direction. In the example illustrated in FIG. 6, in a fourth column, the first phase difference pixel L, the second phase difference pixel R, the first phase difference pixel L, and the second phase difference pixel R are arranged in this order in the column direction from the first row. That is, the first phase difference pixels L and the second phase difference pixels R are alternately arranged in the column direction from the first row. In addition, in the example illustrated in FIG. 6, in a tenth column, the second phase difference pixel R, the first phase difference pixel L, the second phase difference pixel R, and the first phase difference pixel L are arranged in this order in the column direction from the first row. That is, the second phase difference pixels R and the first phase difference pixels L are alternately arranged in the column direction from the first row.

Figure 7:
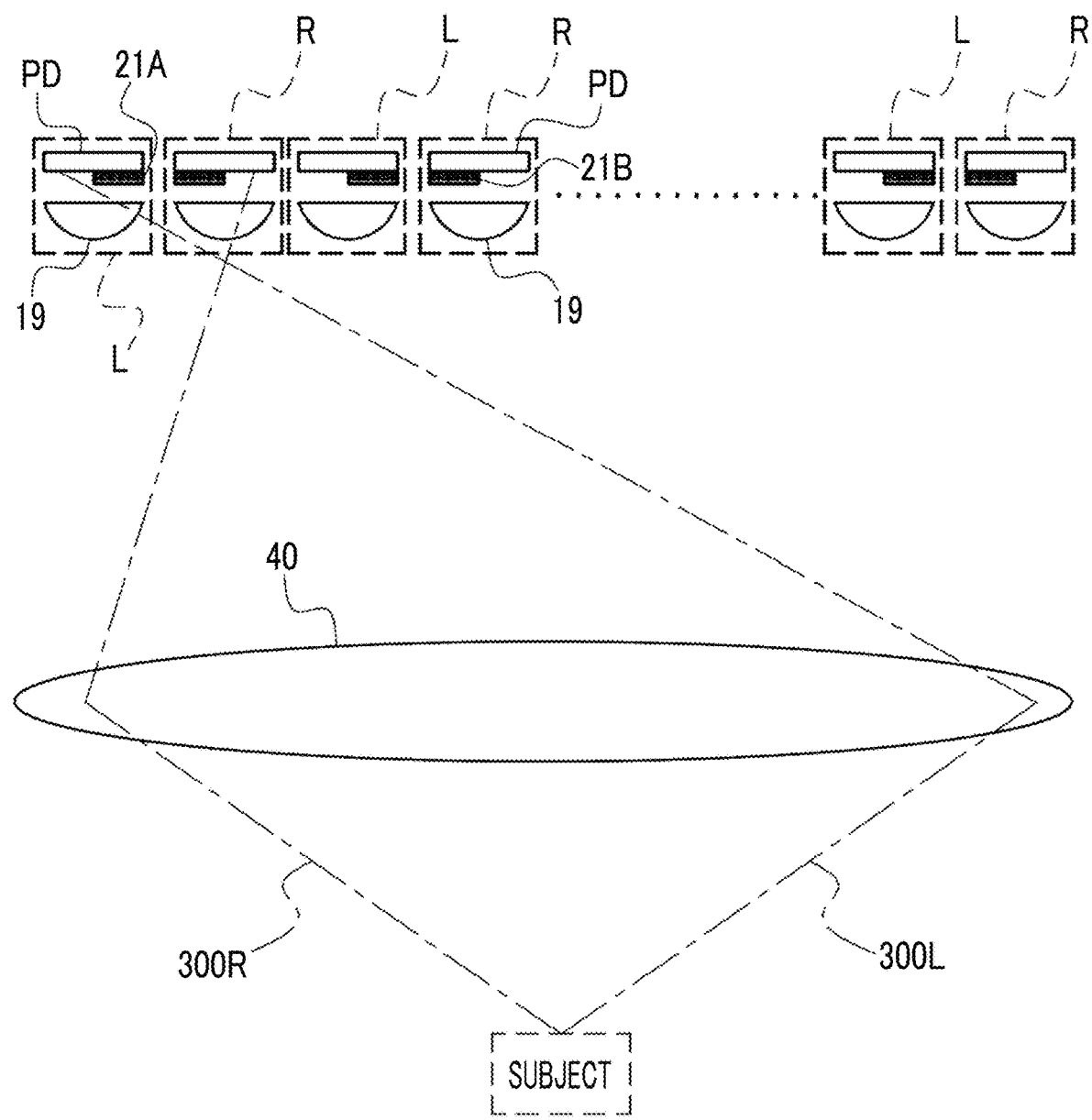
FIG. 7 is a conceptual diagram illustrating an example of incidence characteristics of subject light with respect to a first phase difference pixel and a second phase difference pixel included in the photoelectric conversion element illustrated in FIG. 6.

As illustrated in FIG. 7 as an example, each first phase difference pixel L comprises a microlens 19, a light shielding member 21A, and a photodiode PD. In the first phase difference pixel L, the light shielding member 21A is arranged between the microlens 19 and a light receiving surface of the photodiode PD. A left half (left side in a case of facing the subject from the light receiving surface (in other words, a right side in a case of facing the light receiving surface from the subject)) of the light receiving surface of the photodiode PD in the row direction is shielded against light by the light shielding member 21A.

Each second phase difference pixel R comprises the microlens 19, a light shielding member 21B, and the photodiode PD. In the second phase difference pixel R, the light shielding member 21B is arranged between the microlens 19 and the light receiving surface of the photodiode PD. A right half (right side in a case of facing the subject from the light receiving surface (in other words, a left side in a case of facing the light receiving surface from the subject)) of the light receiving surface of the photodiode PD in the row direction is shielded against light by the light shielding member 21B.

Luminous flux passing through an exit pupil of the imaging lens 40 is broadly divided into left region passing light 300L and right region passing light 300R. The left region passing light 300L refers to luminous flux of a left half of the luminous flux passing through the exit pupil of the imaging lens 40 in a case of facing a subject side from a phase difference pixel side. The right region passing light 300R refers to luminous flux of a right half of the luminous flux passing through the exit pupil of the imaging lens 40 in a case of facing the subject side from the phase difference pixel side. The luminous flux passing through the exit pupil of the imaging lens 40 is divided leftward and rightward by the microlens 19 and the light shielding members 21A and 21B functioning as a pupil separation portion. The first phase difference pixel L receives the left region passing light 300L as the subject light, and the second phase difference pixel R receives the right region passing light 300R as the subject light. Consequently, a first phase difference image corresponding to a subject image corresponding to the left region passing light 300L and a second phase difference image corresponding to a subject image corresponding to the right region passing light 300R are generated by the imaging element 44.

Hereinafter, for convenience of description, the first phase difference pixel L and the second phase difference pixel R will be referred to as the "phase difference pixel" unless otherwise necessary to distinguish therebetween. In addition, hereinafter, for convenience of description, the light shielding members 21A and 21B will be referred to as the "light shielding member" without the reference numerals unless otherwise necessary to distinguish therebetween.

Figure 8:
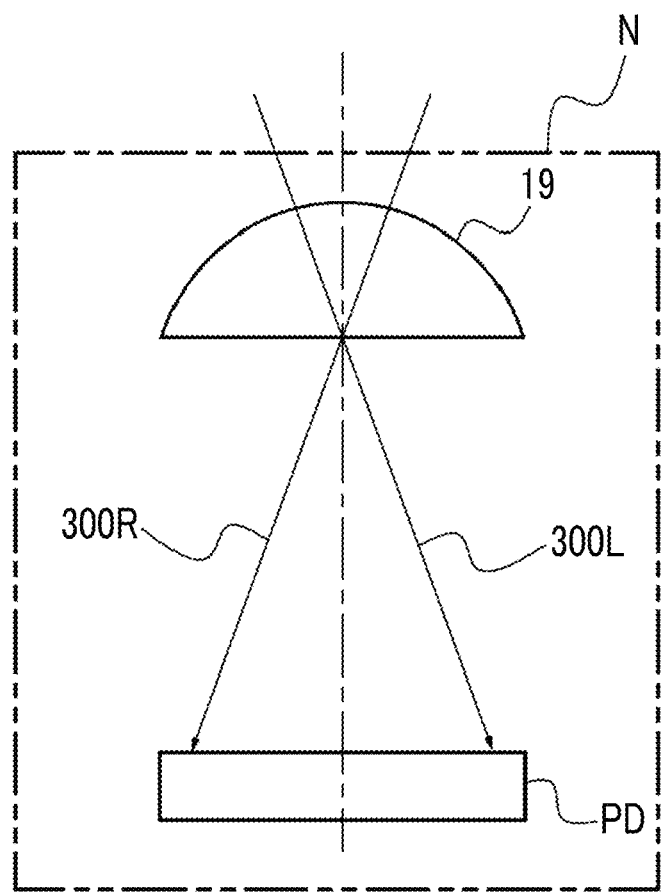
FIG. 8 is a schematic configuration diagram illustrating an example of a configuration of a non-phase difference pixel included in the photoelectric conversion element illustrated in FIG. 6.

As illustrated in FIG. 8 as an example, the non-phase difference pixel is different from the phase difference pixel in that the light shielding member is not included. The photodiode PD of the non-phase difference pixel receives the left region passing light 300L and the right region passing light 300R as the subject light.

Figure 9:
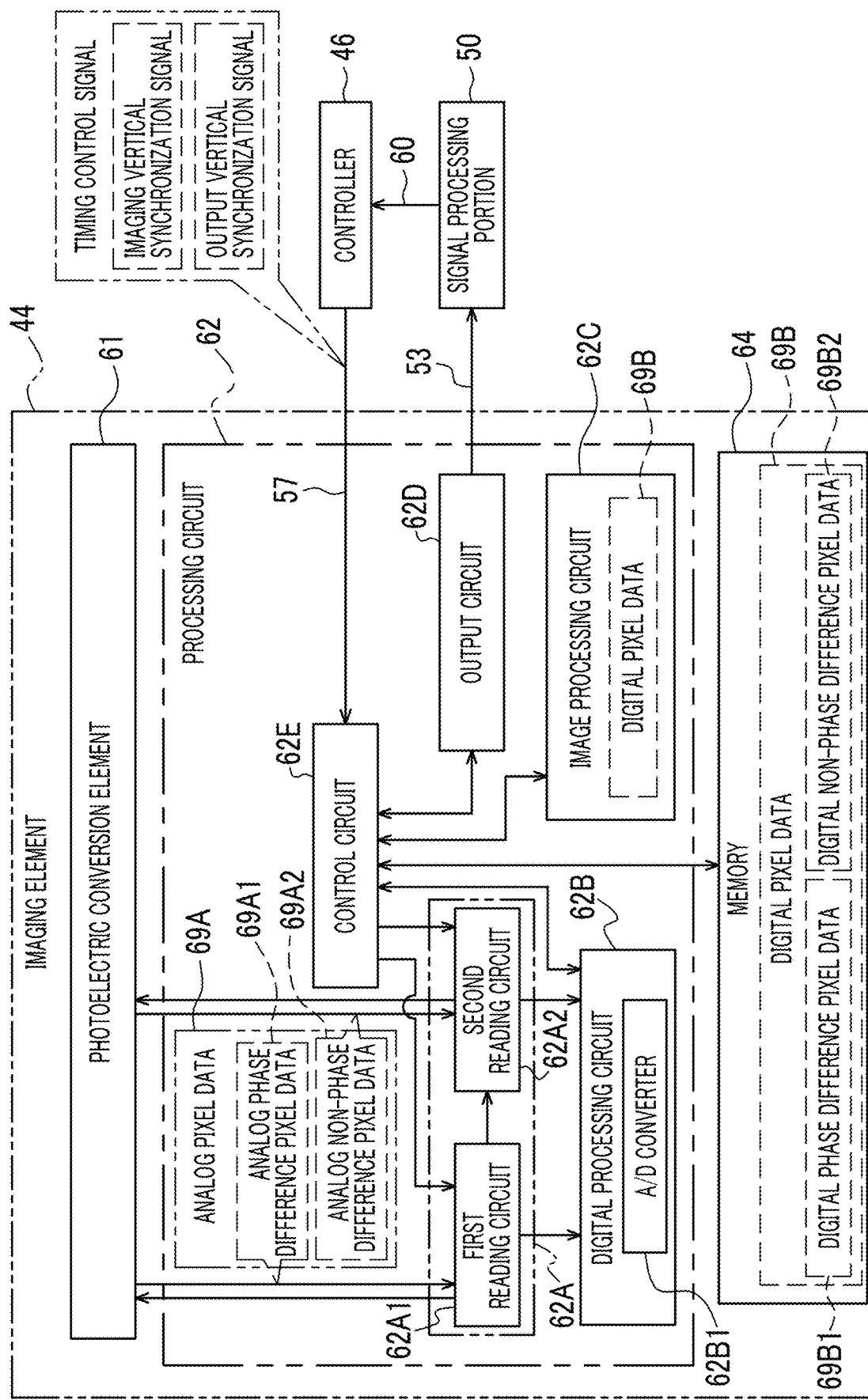
FIG. 9 is a block diagram illustrating an example of a configuration of an electric system of the imaging element included in the imaging apparatus according to the first embodiment.

As illustrated in FIG. 9 as an example, the processing circuit 62 comprises a reading circuit 62A, a digital processing circuit 62B, an image processing circuit 62C, an output circuit 62D, and a control circuit 62E. The reading circuit 62A is an example of a "reading portion (reading circuit)" according to the embodiments of the technology of the present disclosure. The output circuit 62D is an example of an "output portion (output circuit)" according to the embodiments of the technology of the present disclosure.

The reading circuit 62A comprises a first reading circuit 62A1 and a second reading circuit 62A2. The first reading circuit 62A1 is an example of a "first reading portion (first reading circuit)" according to the embodiments of the technology of the present disclosure, and the second reading circuit 62A2 is an example of a "second reading portion (second reading circuit)" according to the embodiments of the technology of the present disclosure.

Each of the first reading circuit 62A1 and the second reading circuit 62A2 is connected to the photoelectric conversion element 61, the digital processing circuit 62B, and the control circuit 62E. The memory 64 is connected to the control circuit 62E. The image processing circuit 62C is also connected to the control circuit 62E. The output circuit 62D is also connected to the control circuit 62E. The control circuit 62E is connected to the controller 46 through the communication line 57. The output circuit 62D is connected to the signal processing portion 50 through the communication line 53.

As illustrated in FIG. 9 as an example, the image data 69 is broadly divided into analog pixel data 69A and digital pixel data 69B. Hereinafter, for convenience of description, the analog pixel data 69A and the digital pixel data 69B will be referred to as the "image data 69" unless otherwise necessary to distinguish therebetween.

The analog pixel data 69A is broadly divided into analog phase difference pixel data 69A1 that is analog pixel data of the phase difference pixel, and analog non-phase difference pixel data 69A2 that is analog pixel data of the non-phase difference pixel N. The digital pixel data 69B is broadly divided into digital phase difference pixel data 69B1 and digital non-phase difference pixel data 69B2. The digital phase difference pixel data 69B1 is pixel data obtained by digitizing the analog phase difference pixel data 69A1. The digital non-phase difference pixel data 69B2 is pixel data obtained by digitizing the analog non-phase difference pixel data 69A2.

The analog pixel data 69A and the digital pixel data 69B are an example of "pixel data" according to the embodiments of the technology of the present disclosure. The analog phase difference pixel data 69A1 and the digital phase difference pixel data 69B1 are an example of "second pixel data" according to the embodiments of the technology of the present disclosure. The analog non-phase difference pixel data 69A2 and the digital non-phase difference pixel data 69B2 are an example of "first pixel data" according to the embodiments of the technology of the present disclosure.

The controller 46 supplies a timing control signal to the control circuit 62E through the communication line 57. The timing control signal includes an imaging vertical synchronization signal and an output vertical synchronization signal. The output vertical synchronization signal is a synchronization signal for defining an output timing in units of frames. In other words, the output vertical synchronization signal is a synchronization signal for defining the output frame rate. That is, an output period in which the digital pixel data 69B of one frame is output (hereinafter, simply referred to as the "output period") is defined by the output vertical synchronization signal. The imaging vertical synchronization signal is a synchronization signal for defining an imaging timing in units of frames. In other words, the imaging vertical synchronization signal is a synchronization signal for defining the imaging frame rate. That is, an interval in which imaging is performed is defined by the imaging vertical synchronization signal.

In the first embodiment, a plurality of imaging vertical synchronization signals are supplied to the control circuit 62E from the controller 46 within the output period. Accordingly, imaging of a plurality of frames is performed within the output period.

The reading circuit 62A reads out, in units of horizontal lines, the analog pixel data 69A that is obtained by imaging the subject at the imaging frame rate. That is, the reading circuit 62A controls the photoelectric conversion element 61 and reads out the analog pixel data 69A from the photoelectric conversion element 61 in units of horizontal lines under control of the control circuit 62E. The reading circuit 62A is a circuit that can selectively read out the analog phase difference pixel data 69A1 and the analog non-phase difference pixel data 69A2 for all pixels included in the photoelectric conversion element 61. As will be described in detail later, selectively reading of the analog phase difference pixel data 69A1 and the analog non-phase difference pixel data 69A2 is implemented by the first reading circuit 62A1 and the second reading circuit 62A2. While an example of a form of selectively reading out the analog phase difference pixel data 69A1 and the analog non-phase difference pixel data 69A2 for all pixels included in the photoelectric conversion element 61 is exemplified here, the technology of the present disclosure is not limited thereto. For example, the analog phase difference pixel data 69A1 and the analog non-phase difference pixel data 69A2 may be selectively read out for a designated pixel group of a part of all pixels included in the photoelectric conversion element 61.

Reading of the analog pixel data 69A of one frame from the photoelectric conversion element 61 is started in accordance with the imaging vertical synchronization signal. The control circuit 62E transfers the imaging vertical synchronization signal supplied from the controller 46 to the reading circuit 62A. In a case where the imaging vertical synchronization signal is input from the control circuit 62E, the reading circuit 62A starts reading out the analog pixel data 69A of one frame from the photoelectric conversion element 61.

Specifically, the control circuit 62E transfers the imaging vertical synchronization signal supplied from the controller 46 to the first reading circuit 62A1 and the second reading circuit 62A2. In a case where the imaging vertical synchronization signal is input into each of the first reading circuit 62A1 and the second reading circuit 62A2, reading of the analog phase difference pixel data 69A1 from the phase difference pixel and reading of the analog non-phase difference pixel data 69A2 from the non-phase difference pixel N are independently performed. Reading of the analog phase difference pixel data 69A1 is performed by the first reading circuit 62A1, and reading of the analog non-phase difference pixel data 69A2 is performed by the second reading circuit 62A2.

More specifically, in a case where the imaging vertical synchronization signal is input from the control circuit 62E, the first reading circuit 62A1 reads out the analog phase difference pixel data of one frame from each phase difference pixel of the photoelectric conversion element 61 for each phase difference pixel line 61A. The second reading circuit 62A2 reads out the analog non-phase difference pixel data of one frame from each non-phase difference pixel N of the photoelectric conversion element 61 for each non-phase difference pixel line 61B in a case where a reading start condition (described later) is satisfied. The "reading start condition" here refers to a condition that the imaging vertical synchronization signal is input from the control circuit 62E, and that reading of the analog phase difference pixel data of one frame by the first reading circuit 62A1 is completed.

The reading circuit 62A performs analog signal processing on the analog pixel data 69A read out from the photoelectric conversion element 61. The analog signal processing includes well-known processing such as noise cancelation processing and analog gain processing. The noise cancelation processing is processing of canceling a noise caused by variations in characteristics between pixels included in the photoelectric conversion element 61. The analog gain processing is processing of applying a gain to the analog pixel data 69A. The analog pixel data 69A on which the analog signal processing is performed in such a manner is output to the digital processing circuit 62B by the reading circuit 62A.

The digital processing circuit 62B comprises an A/D converter 62B1. The digital processing circuit 62B performs digital signal processing on the analog pixel data 69A input from the reading circuit 62A. For example, the digital signal processing includes correlative double sampling, A/D conversion performed by the A/D converter 62B1, and digital gain processing.

The correlative double sampling is performed on the analog pixel data 69A by the digital processing circuit 62B. The A/D converter 62B1 performs the A/D conversion on the analog pixel data 69A on which signal processing of the correlative double sampling is performed. Accordingly, the analog pixel data 69A is digitized, and the digital pixel data 69B is obtained. The digital gain processing is performed on the digital pixel data 69B by the digital processing circuit 62B. The digital gain processing refers to processing of applying a gain to the digital pixel data 69B.

The control circuit 62E acquires the digital pixel data 69B, which is obtained by performing the digital signal processing, from the digital processing circuit 62B and stores the acquired digital pixel data 69B in the memory 64.

The memory 64 is a memory that can store the digital pixel data 69B of a plurality of frames. The memory 64 has a plurality of storage regions (refer to FIG. 5). The digital pixel data 69B is stored in a corresponding storage region of the memory 64 in units of pixels by the control circuit 62E.

The control circuit 62E can randomly access the memory 64 and acquires the digital non-phase difference pixel data 69B2 from the memory 64. The control circuit 62E outputs the digital non-phase difference pixel data 69B2 acquired from the memory 64 to the image processing circuit 62C. The image processing circuit 62C performs image processing on the digital non-phase difference pixel data 69B2 input from the control circuit 62E. Demosaicing, digital thinning processing, digital addition processing, data filling processing, and the like are exemplified as the "image processing" here.

The demosaicing is processing of calculating every color information for each pixel from a mosaic image corresponding to arrangement of the color filters. For example, in a case of an imaging element consisting of color filters of three colors of R, G, and B, color information on all of R, G, and B is calculated from a mosaic image consisting of R, G, and B for each pixel.

The digital thinning processing is processing of thinning out pixels included in the digital non-phase difference pixel data 69B2 in units of lines. For example, the units of lines refer to units of horizontal lines and/or units of vertical lines. The digital addition processing is, for example, processing of calculating an arithmetic mean of pixel values for a plurality of pixels included in the digital non-phase difference pixel data 69B2. Processing of filling a lower empty bit of the digital non-phase difference pixel data 69B2 with specific data, or the like is exemplified as the data filling processing. For example, information for specifying a method of the digital thinning processing performed on the digital non-phase difference pixel data 69B2, or a frame number for specifying a frame is exemplified as the "specific data" here.

The image processing circuit 62C outputs the digital non-phase difference pixel data 69B2 after the image processing to the control circuit 62E. The control circuit 62E stores the digital non-phase difference pixel data 69B2 input from the image processing circuit 62C in the memory 64. The digital non-phase difference pixel data 69B2 after the image processing is an example of "image data based on pixel data" and "first pixel data based on phase difference pixel data" according to the embodiments of the technology of the present disclosure.

The control circuit 62E acquires the digital pixel data 69B from the memory 64. The control circuit 62E outputs the digital pixel data 69B acquired from the memory 64 to the output circuit 62D.

Specifically, each time the digital phase difference pixel data 69B1 of one frame is stored in the memory 64, the control circuit 62E acquires the digital phase difference pixel data 69B1 of one frame from the memory 64 without waiting for storage of the digital non-phase difference pixel data in the memory 64. The control circuit 62E outputs the most recent digital phase difference pixel data 69B1 of one frame acquired from the memory 64 to the output circuit 62D.

In a case where acquisition of the digital phase difference pixel data 69B1 corresponding to the analog phase difference pixel data 69A1 of one frame read out by the first reading circuit 62A1 within the output period is completed, the control circuit 62E acquires the digital non-phase difference pixel data 69B2 from the memory 64. The digital non-phase difference pixel data 69B2 acquired from the memory 64 is the digital non-phase difference pixel data 69B2 corresponding to the analog non-phase difference pixel data 69A2 of one frame read out by the second reading circuit 62A2 within the output period. The control circuit 62E outputs the digital non-phase difference pixel data 69B2 acquired from the memory 64 to the output circuit 62D.

In a case of outputting the digital pixel data 69B of one frame, the output circuit 62D outputs the digital phase difference pixel data 69B1 and the digital non-phase difference pixel data 69B2 at different timings. Specifically, first, the output circuit 62D outputs the digital phase difference pixel data 69B1 and then, outputs the digital non-phase difference pixel data 69B2 after output of the digital phase difference pixel data 69B1 is completed.

The digital phase difference pixel data 69B1 of all frames read out within the output period is output to the output circuit 62E by the control circuit 62E earlier than the digital non-phase difference pixel data 69B2. The output circuit 62D outputs the digital pixel data 69B input from the control circuit 62E to the signal processing portion 50 in order of input. First, the output circuit 62D outputs the digital phase difference pixel data 69B1 of all frames read out within the output period to the signal processing portion 50 and next, outputs the digital non-phase difference pixel data 69B2 of all frames read out within the output period to the signal processing portion 50.

Figure 10:
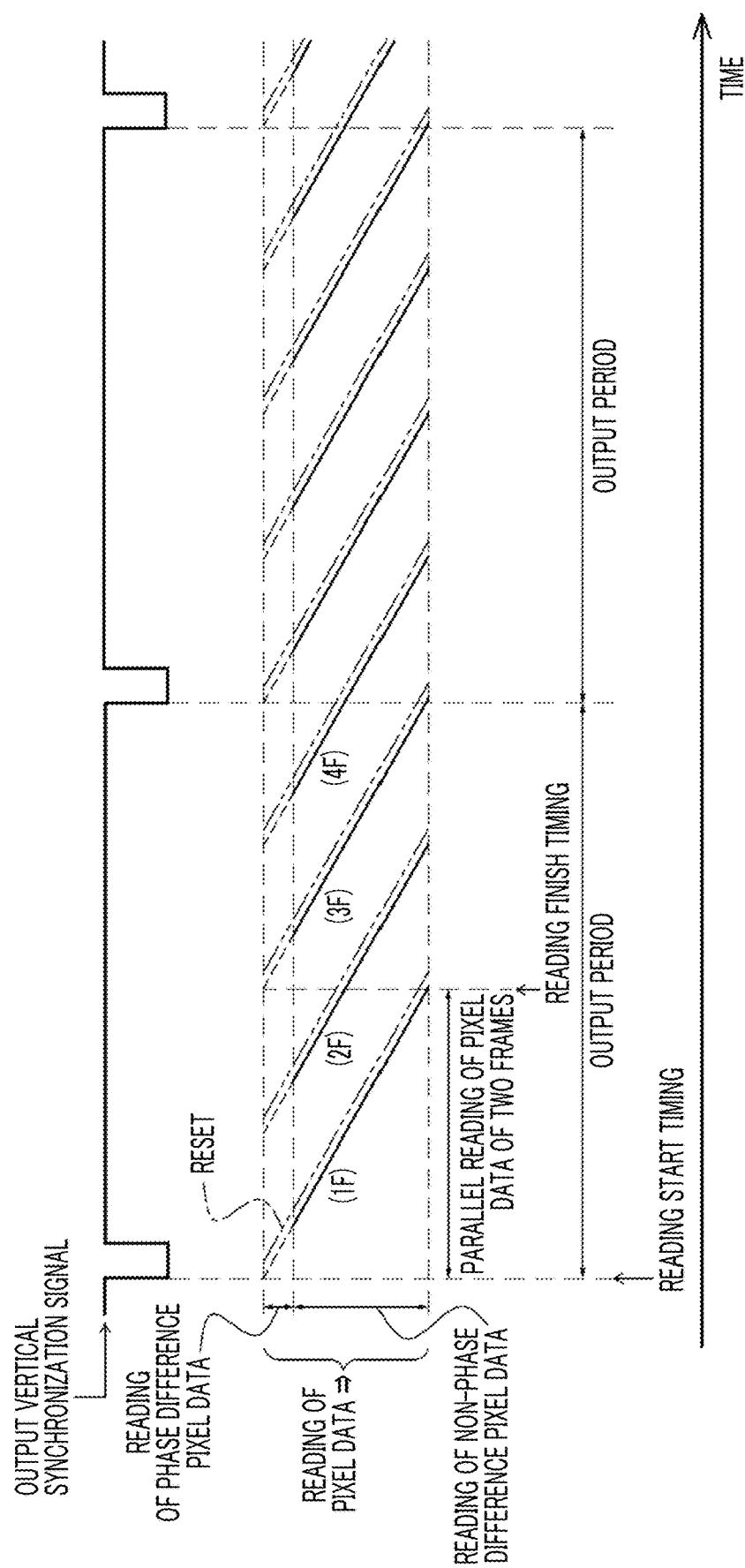
FIG. 10 is a time chart illustrating an example of a reading timing of each of analog phase difference pixel data and analog non-phase difference pixel data for each frame by a reading circuit of the imaging element included in the imaging apparatus according to the first embodiment.

In the imaging apparatus 10, imaging using the rolling shutter method is performed. Accordingly, as illustrated in FIG. 10 as an example, a gap occurs between a reading start timing and a reading finish timing. The reading start timing is a timing at which reading of a horizontal line (hereinafter, referred to as a "first horizontal line") predetermined as a horizontal line in which reading is performed first among all horizontal lines of an imaging region of the imaging element 44 is performed. The reading finish timing is a timing at which reading of a horizontal line (hereinafter, referred to as a "last horizontal line") predetermined as a horizontal line in which reading is performed last among all horizontal lines of the imaging region of the imaging element 44 is performed. In the rolling shutter method, reading of the analog pixel data 69A is sequentially performed for each horizontal line in all horizontal lines of the imaging region of the imaging element 44 in accordance with a horizontal synchronization signal. Thus, the reading finish timing is reached later than the reading start timing. Accordingly, a gap occurs between a timing at which exposure is performed on the first horizontal line, and a timing at which the exposure is performed on the last horizontal line.

In FIG. 10, an example of an aspect of each of a reading timing and a reset timing of four frames within one output period is illustrated. In the example illustrated in FIG. 10, "F" is the abbreviation for "frame". In the example illustrated in FIG. 10, imaging of four frames is performed within one output period. That is, reading of a plurality of pieces of analog pixel data 69A is performed in parallel within one output period. For example, in reading of a first frame to a fourth frame within one output period, reading of the first frame and reading of the second frame are performed in parallel. Accordingly, resetting of the first frame and resetting of the second frame are also performed in parallel. That is, a reading period of the first frame and a reading period of the second frame overlap partially, and a reset period of the first frame and a reset period of the second frame overlap partially. The same applies to the second frame and the third frame. In addition, the same applies to the third frame and the fourth frame.

In such a manner, reading of the analog non-phase difference pixel data 69A2 of four frames and reading of the analog phase difference pixel data 69A1 of four frames are performed within one output period. That is, within one output period, plural reading of the analog phase difference pixel data 69A1 are performed in addition to reading of the analog non-phase difference pixel data 69A2. Here, "reading of the analog non-phase difference pixel data 69A2" refers to reading of the analog non-phase difference pixel data 69A2 from the non-phase difference pixel N. In addition, the "plural reading of the analog phase difference pixel data 69A1" refers to plural reading of the analog phase difference pixel data 69A1 from the phase difference pixel. That is, this means that the analog phase difference pixel data 69A1 is read out many times from the same phase difference pixel within one output period.

In addition, as illustrated in FIG. 10 as an example, in each frame, first, the analog phase difference pixel data 69A1 is read out from the photoelectric conversion element 61 by the first reading circuit 62A1. That is, the analog phase difference pixel data 69A1 is read out one line at a time by the first reading circuit 62A1 using all phase difference pixel lines 61A of one frame as a reading target. Each time reading of one phase difference pixel line 61A by the first reading circuit 62A1 is completed, resetting by the first reading circuit 62A1 is performed.

In a case where reading of the analog phase difference pixel data 69A1 for all phase difference pixel lines 61A is completed, next, the analog non-phase difference pixel data 69A2 is read out one line at a time by the second reading circuit 62A2 using all non-phase difference pixel lines 61B as the reading target. Each time reading of one non-phase difference pixel line 61B by the second reading circuit 62A2 is completed, resetting by the second reading circuit 62A2 is performed.

In such a manner, in a reading period of one frame, reading of the analog phase difference pixel data 69A1 from the phase difference pixel by the first reading circuit 62A1 is performed earlier than reading of the analog non-phase difference pixel data 69A2 from the non-phase difference pixel N by the second reading circuit 62A2.

In addition, in the example illustrated in FIG. 10, reading of the analog non-phase difference pixel data 69A2 of the first frame and reading of the analog phase difference pixel data 69A1 of the second frame are performed in parallel. That is, a reading period of the analog non-phase difference pixel data 69A2 of the first frame overlaps with a reading period of the analog phase difference pixel data 69A1 of the second frame. The same applies to the second frame and the third frame. In addition, the same applies to the third frame and the fourth frame.

Figure 11:
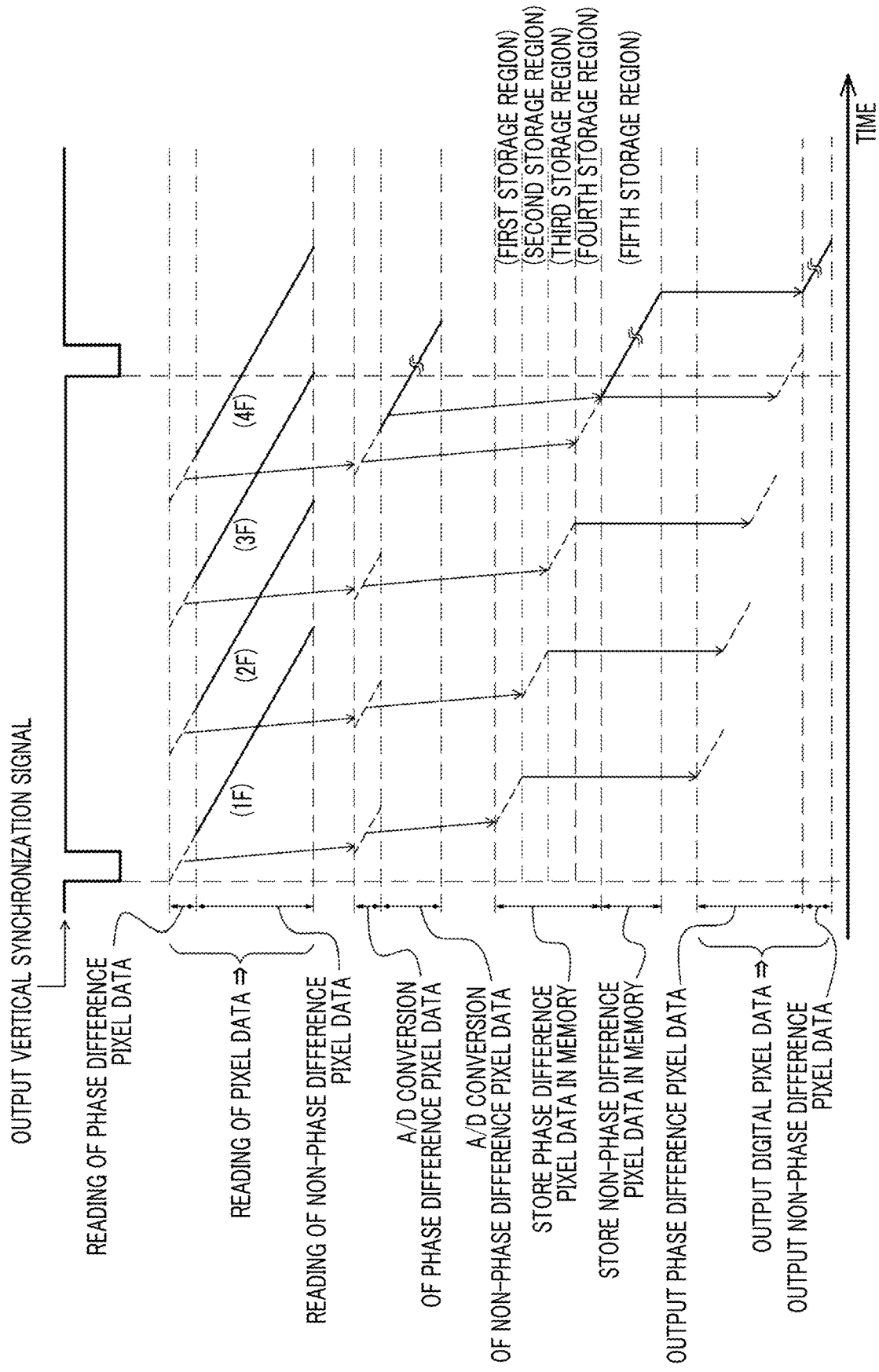
FIG. 11 is a time chart illustrating an example of a reading timing of analog pixel data, a timing of A/D conversion, a storage timing into a memory, and an output timing of digital pixel data in the imaging element included in the imaging apparatus according to the first embodiment.

As illustrated in FIG. 11 as an example, the analog phase difference pixel data 69A1 read out by the first reading circuit 62A1 for each frame within one output period is digitized by the A/D converter 62B1 and converted into the digital phase difference pixel data 69B1. In a case where digitization of all pieces of the analog phase difference pixel data 69A1 read out within one output period is completed, the A/D conversion is performed on the analog non-phase difference pixel data 69A2 read out by the second reading circuit 62A2 for each frame within one output period. That is, the analog non-phase difference pixel data 69A2 read out by the second reading circuit 62A2 for each frame is digitized by the A/D converter 62B1 and converted into the digital non-phase difference pixel data 69B2.

In such a manner, the analog phase difference pixel data 69A1 and the analog non-phase difference pixel data 69A2 are subjected to the A/D conversion at different timings by the A/D converter 62B1. This is because the A/D converter 62B1 is shared for the analog phase difference pixel data 69A1 and the analog non-phase difference pixel data 69A2.

As illustrated in FIG. 11 as an example, each piece of the digital phase difference pixel data 69B1 obtained by performing the A/D conversion for each frame is stored in a corresponding storage region of the memory 64. In the example illustrated in FIG. 11, the digital phase difference pixel data 69B1 of the first frame is stored in the first storage region 64A. In addition, the digital phase difference pixel data 69B1 of the second frame is stored in the second storage region 64B. In addition, the digital phase difference pixel data 69B1 of the third frame is stored in the third storage region 64C. In addition, the digital phase difference pixel data 69B1 of the fourth frame is stored in the fourth storage region 64D.

The digital non-phase difference pixel data 69B2 obtained by performing the A/D conversion for each frame is combined into one frame and stored in the fifth storage region 64E. Here, for example, "combining" refers to an arithmetic mean, in units of pixels, of the digital non-phase difference pixel data 69B2 of a plurality of frames (in the example illustrated in FIG. 11, the first frame to the fourth frame) obtained by performing imaging within one output period. In such a manner, by calculating the arithmetic mean of the digital non-phase difference pixel data 69B2 of the plurality of frames in units of pixels, the digital non-phase difference pixel data 69B2 of one frame is generated.

While an example in which the digital non-phase difference pixel data 69B2 of the plurality of frames is combined into one frame is illustratively described here, the technology of the present disclosure is not limited thereto. For example, all pieces of the digital non-phase difference pixel data 69B2 of the plurality of frames may be stored in the memory 64. In addition, the analog non-phase difference pixel data 69A2 may be read out by the second reading circuit 62A2 for only one representative frame (for example, the first frame) of the plurality of frames. In this case, as will be described in detail later as a modification example, the analog non-phase difference pixel data 69A2 is not read out by the second reading circuit 62A2 for the other frames (for example, the second frame to the fourth frame) (refer to FIG. 16). Thus, only the analog non-phase difference pixel data 69A2 of one frame is subjected to the A/D conversion, and the "combining" is not necessary.

In a case where the digital phase difference pixel data 69B1 is stored in the memory 64 in units of frames, the digital phase difference pixel data 69B1 in the memory 64 is transferred to the output circuit 62D at a timing at which storage of the digital phase difference pixel data 69B1 of one frame in the memory 64 is completed. That is, the digital phase difference pixel data 69B1 in the memory 64 is acquired from the memory 64 and output to the output circuit 62D by the control circuit 62E. The output circuit 62D outputs the digital phase difference pixel data 69B1 input from the control circuit 62E to the signal processing portion 50.

After the digital phase difference pixel data 69B1 in the memory 64 is output by the output circuit 62D, the digital non-phase difference pixel data 69B2 in the memory 64 is acquired from the memory 64 and output to the output circuit 62D by the control circuit 62E. The output circuit 62D outputs the digital non-phase difference pixel data 69B2 input from the control circuit 62E to the signal processing portion 50.

Next, an action of the imaging apparatus 10 will be described.

First, the timing control processing executed by the CPU 46A in accordance with the timing control program 46B1 in a case where a condition under which execution of the timing control processing is started is satisfied will be described with reference to FIG. 12. For example, a condition that the imaging mode is set is exemplified as the condition under which execution of the timing control processing is started.

Figure 12:
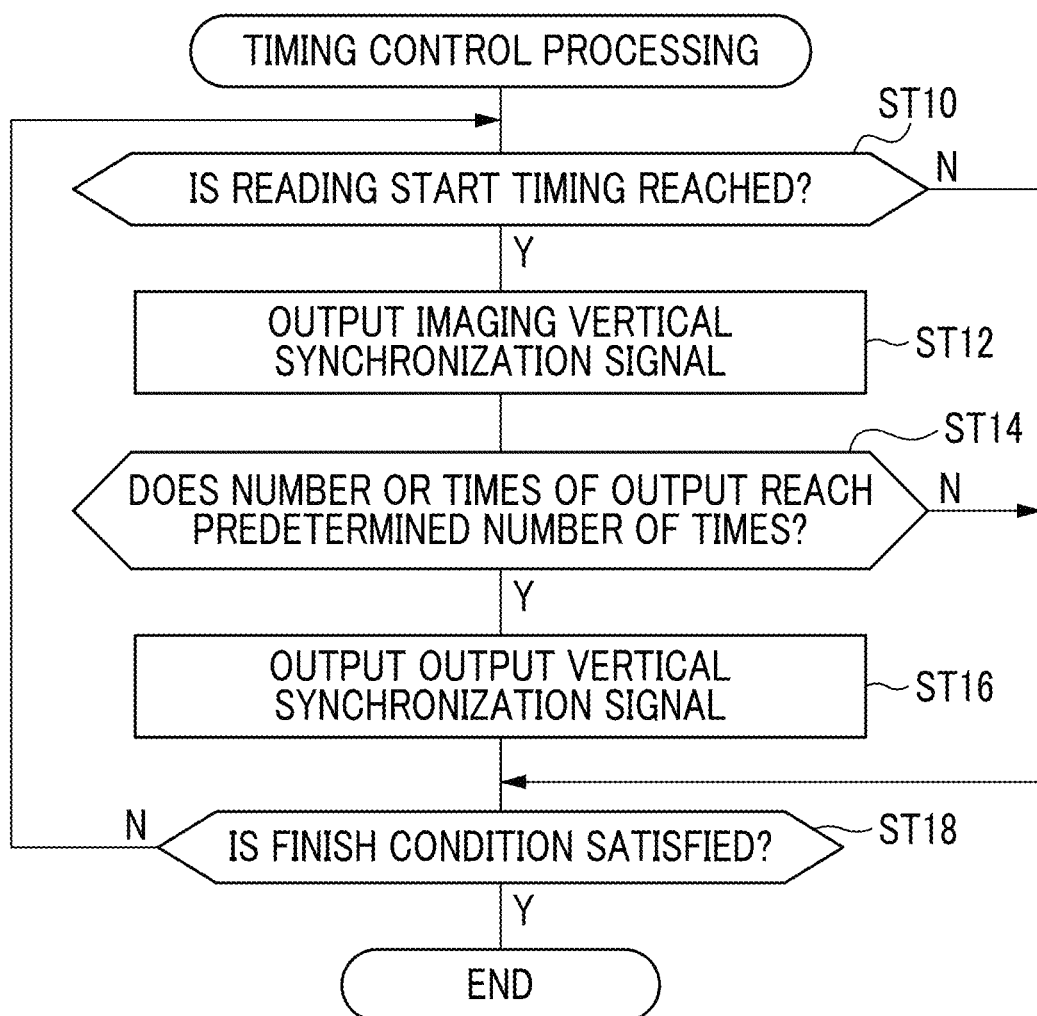
FIG. 12 is a flowchart illustrating an example of a flow of timing control processing according to the first embodiment.

In the timing control processing illustrated in FIG. 12, first, in step ST10, the CPU 46A determines whether or not the reading start timing is reached. The reading start timing refers to a timing at which the imaging element 44 is instructed to start reading out the analog pixel data 69A from the photoelectric conversion element 61. In step ST10, in a case where the reading start timing is not reached, a negative determination is made, and the timing control processing transitions to step ST18. In step ST10, in a case where the reading start timing is reached, a positive determination is made, and the timing control processing transitions to step ST12.

In step ST12, the CPU 46A outputs the imaging vertical synchronization signal to the imaging element 44. Then, the timing control processing transitions to step ST14. The imaging vertical synchronization signal output by executing processing of step ST12 is received by the control circuit 62E of the imaging element 44. In the imaging element 44, imaging is performed at the imaging frame rate that is determined in accordance with the imaging vertical synchronization signal received by the control circuit 62E.

In step ST14, the CPU 46A determines whether or not the number of times of output of the imaging vertical synchronization signal reaches a predetermined number of times (for example, four times). In step ST14, in a case where the number of times of output of the imaging vertical synchronization signal does not reach the predetermined number of times, a negative determination is made, and the timing control processing transitions to step ST18. In step ST14, in a case where the number of times of output of the imaging vertical synchronization signal reaches the predetermined number of times, a positive determination is made, and the timing control processing transitions to step ST16.

In step ST16, the CPU 46A outputs the output vertical synchronization signal to the imaging element 44. Then, the timing control processing transitions to step ST18. The output vertical synchronization signal output by executing processing of step ST16 is received by the control circuit 62E of the imaging element 44. In the imaging element 44, the digital pixel data 69B is output by the output circuit 62D at the output frame rate that is determined in accordance with the output vertical synchronization signal received by the control circuit 62E.

In step ST18, the CPU 46A determines whether or not a condition (hereinafter, referred to as a "timing control processing finish condition") under which the timing control processing is finished is satisfied. For example, a condition that an instruction to finish the timing control processing is received by the reception device 84 (refer to FIG. 4) is exemplified as the timing control processing finish condition. In step ST18, in a case where the timing control processing finish condition is not satisfied, a negative determination is made, and the timing control processing transitions to step ST10. In step ST18, in a case where the timing control processing finish condition is satisfied, a positive determination is made, and the timing control processing is finished.

Next, phase difference pixel processing executed by the processing circuit 62 within the output period will be described with reference to FIG. 13.

Figure 13:
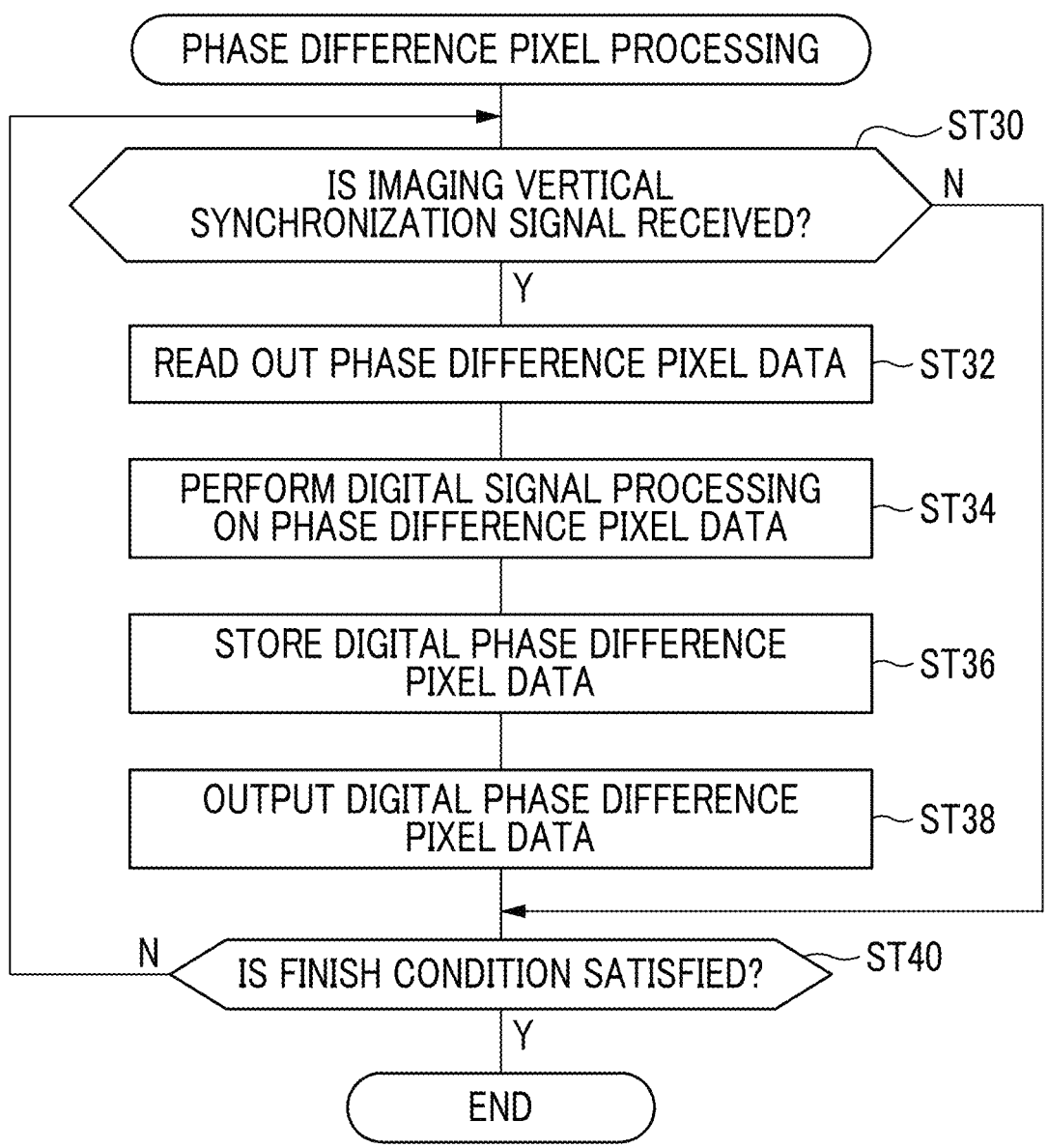
FIG. 13 is a flowchart illustrating an example of a flow of phase difference pixel processing according to the first embodiment.

In the phase difference pixel processing illustrated in FIG. 13, first, in step ST30, the control circuit 62E determines whether or not the imaging vertical synchronization signal output by executing processing of step ST12 of the timing control processing is received. In step ST30, in a case where the imaging vertical synchronization signal is not received, a negative determination is made, and the phase difference pixel processing transitions to step ST40. In step ST30, in a case where the imaging vertical synchronization signal is received, a positive determination is made, and the phase difference pixel processing transitions to step ST32.

In step ST32, the first reading circuit 62A1 reads out the analog phase difference pixel data 69A1 from the phase difference pixel using all phase difference pixel lines 61A of one frame as a target. Then, the phase difference pixel processing transitions to step ST34.

In step ST34, the digital processing circuit 62B converts the analog phase difference pixel data 69A1 into the digital phase difference pixel data 69B1 by performing the digital signal processing on the analog phase difference pixel data 69A1 read out by the first reading circuit 62A1.

In subsequent step ST36, the control circuit 62E acquires the digital phase difference pixel data 69B1 from the digital processing circuit 62B and stores the acquired digital phase difference pixel data 69B1 in the memory 64. Then, the phase difference pixel processing transitions to step ST38.

In a case where the digital phase difference pixel data 69B1 is stored in the memory 64, the digital phase difference pixel data 69B1 is acquired from the memory 64 by the control circuit 62E, and the acquired digital phase difference pixel data 69B1 is transferred to the output circuit 62D.

In subsequent step ST38, the output circuit 62D outputs the digital phase difference pixel data 69B1 input from the control circuit 62E to the signal processing portion 50. Then, the phase difference pixel processing transitions to step ST40.

In step ST40, the control circuit 62E determines whether or not a condition (hereinafter, referred to as a "phase difference pixel processing finish condition") under which the phase difference pixel processing is finished is satisfied. For example, a condition that an instruction to finish the phase difference pixel processing is received by the reception device 84 (refer to FIG. 4) is exemplified as the phase difference pixel processing finish condition. In step ST40, in a case where the phase difference pixel processing finish condition is not satisfied, a negative determination is made, and the phase difference pixel processing transitions to step ST30. In step ST40, in a case where the phase difference pixel processing finish condition is satisfied, a positive determination is made, and the phase difference pixel processing is finished.

Next, non-phase difference pixel processing executed by the processing circuit 62 within the output period will be described with reference to FIG. 14.

Figure 14:
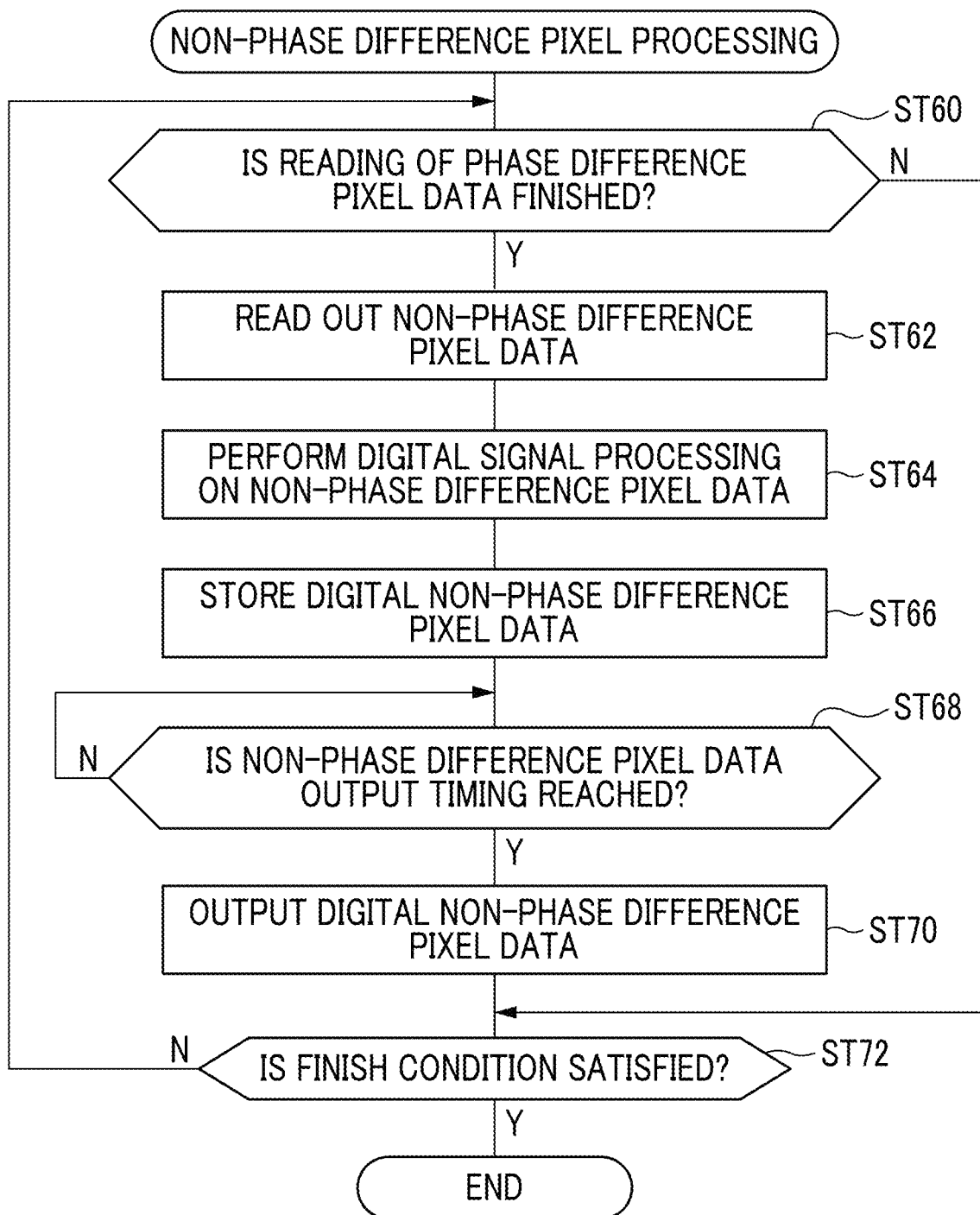
FIG. 14 is a flowchart illustrating an example of a flow of non-phase difference pixel processing according to the first embodiment.

In the non-phase difference pixel processing illustrated in FIG. 14, first, in step ST60, a determination as to whether or not reading of the analog phase difference pixel data 69A1 of one frame by the first reading circuit 62A1 is finished is performed. In step ST60, in a case where reading of the analog phase difference pixel data 69A1 of one frame by the first reading circuit 62A1 is not finished, a negative determination is made, and the non-phase difference pixel processing transitions to step ST72. In step ST60, in a case where reading of the analog phase difference pixel data 69A1 of one frame by the first reading circuit 62A1 is finished, a positive determination is made, and the non-phase difference pixel processing transitions to step ST62.

In step ST62, the second reading circuit 62A2 reads out the analog non-phase difference pixel data 69A2 from the non-phase difference pixel N using all non-phase difference pixel lines 61B of one frame as a target. Then, the non-phase difference pixel processing transitions to step ST64.

In step ST64, the digital processing circuit 62B converts the analog non-phase difference pixel data 69A2 into the digital non-phase difference pixel data 69B2 by performing the digital signal processing on the analog non-phase difference pixel data 69A2 read out by the second reading circuit 62A2.

In subsequent step ST66, the control circuit 62E acquires the digital non-phase difference pixel data 69B2 from the digital processing circuit 62B and stores the acquired digital non-phase difference pixel data 69B2 in the memory 64. Then, the non-phase difference pixel processing transitions to step ST68. The memory 64 stores the digital non-phase difference pixel data 69B2 on which the image processing is performed by the image processing circuit 62C.

In step ST68, the control circuit 62E determines whether or not a non-phase difference pixel data output timing is reached. The non-phase difference pixel data output timing refers to a timing at which the digital non-phase difference pixel data 69B2 in the memory 64 is output to the signal processing portion 50. The non-phase difference pixel data output timing may be a timing that does not overlap with an output timing of the digital phase difference pixel data 69B1 of all frames to the signal processing portion 50 within the same output period. For example, a timing at which output of the digital phase difference pixel data 69B1 of all frames to the signal processing portion 50 within the same output period is completed is exemplified as the non-phase difference pixel data output timing.

In step ST68, in a case where the non-phase difference pixel data output timing is not reached, a negative determination is made, and the determination of step ST68 is performed again. In step ST68, in a case where the non-phase difference pixel data output timing is reached, a positive determination is made, and the non-phase difference pixel processing transitions to step ST70.

In step ST70, the control circuit 62E acquires the digital non-phase difference pixel data 69B2 from the memory 64 and transfers the acquired digital non-phase difference pixel data 69B2 to the output circuit 62D. The output circuit 62D outputs the digital non-phase difference pixel data 69B2 input from the control circuit 62E to the signal processing portion 50. Then, the non-phase difference pixel processing transitions to step ST72.

In step ST72, the control circuit 62E determines whether or not a condition (hereinafter, referred to as a "non-phase difference pixel processing finish condition") under which the non-phase difference pixel processing is finished is satisfied. For example, a condition that an instruction to finish the non-phase difference pixel processing is received by the reception device 84 (refer to FIG. 4) is exemplified as the non-phase difference pixel processing finish condition. In step ST72, in a case where the non-phase difference pixel processing finish condition is not satisfied, a negative determination is made, and the non-phase difference pixel processing transitions to step ST60. In step ST72, in a case where the non-phase difference pixel processing finish condition is satisfied, a positive determination is made, and the non-phase difference pixel processing is finished.

In the signal processing portion 50, various types of signal processing are performed on the digital pixel data 69B input from the imaging element 44, and the digital pixel data 69B on which the various types of signal processing are performed is output to the controller 46.

Next, pixel data processing executed by the CPU 46A in accordance with the pixel data processing program 46B2 in a case where the digital pixel data 69B is input into the controller 46 from the signal processing portion 50 will be described with reference to FIG. 15.

Figure 15:
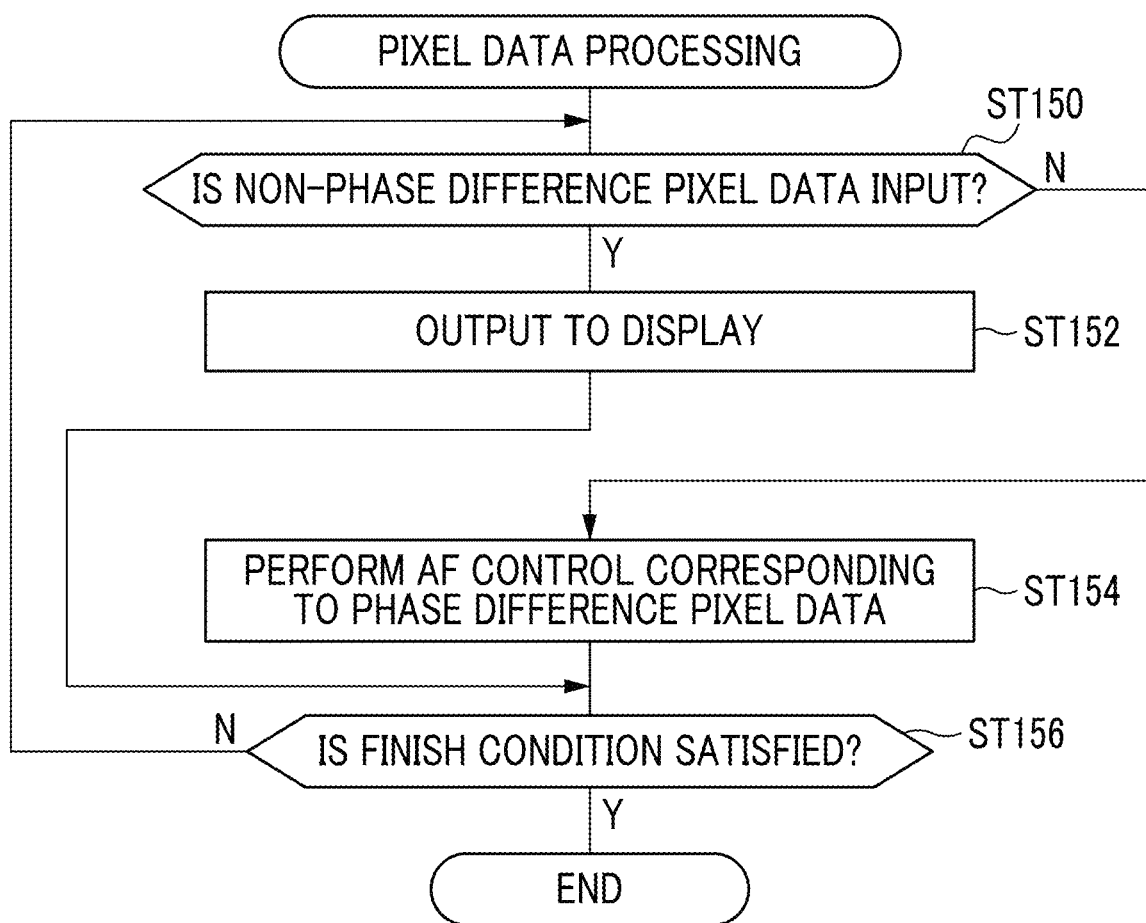
FIG. 15 is a flowchart illustrating an example of a flow of pixel data processing according to the first embodiment.

In the pixel data processing illustrated in FIG. 15, first, in step ST150, the CPU 46A determines whether or not the digital pixel data 69B input from the signal processing portion 50 is the digital non-phase difference pixel data 69B2. In step ST150, in a case where the digital pixel data 69B input from the signal processing portion 50 is the digital phase difference pixel data 69B1, a negative determination is made, and the pixel data processing transitions to step ST154. In step ST150, in a case where the digital pixel data 69B input from the signal processing portion 50 is the digital non-phase difference pixel data 69B2, a positive determination is made, and the pixel data processing transitions to step ST152.

In step ST152, the CPU 46A outputs the digital non-phase difference pixel data 69B2 to the display 32. Then, the pixel data processing transitions to step ST156.

In a case where the digital non-phase difference pixel data 69B2 is output to the display 32, the display 32 displays an image based on the digital non-phase difference pixel data 69B2.

In step ST154, the CPU 46A executes the AF control using the digital phase difference pixel data 69B1 input from the signal processing portion 50. Then, the pixel data processing transitions to step ST156.

In step ST156, the CPU 46A determines whether or not a condition (hereinafter, referred to as a "pixel data processing finish condition") under which the pixel data processing is finished is satisfied. For example, a condition that an instruction to finish the pixel data processing is received by the reception device 84 (refer to FIG. 4) is exemplified as the pixel data processing finish condition. In step ST156, in a case where the pixel data processing finish condition is not satisfied, a negative determination is made, and the pixel data processing transitions to step ST150. In step ST156, in a case where the pixel data processing finish condition is satisfied, a positive determination is made, and the pixel data processing is finished.

As described above, in the imaging apparatus 10 according to the first embodiment, the analog pixel data 69A of each of the plurality of frames is read out in parallel within the output period by the reading circuit 62A. In addition, reading of the analog non-phase difference pixel data 69A2 and plural reading of the analog phase difference pixel data 69A1 are performed within the output period by the reading circuit 62A.

In a case where, for example, the pixel data is read out a plurality of number of times from a pixel dedicated to the AF within a reading period in which the analog pixel data 69A of one frame is read out, mounting of the A/D converter is required for each pixel dedicated to the AF, and a configuration of the imaging element is complicated.

Meanwhile, in a configuration of the imaging element 44 according to the first embodiment, the A/D converter is not mounted for each phase difference pixel. Thus, the configuration of the imaging element 44 is simpler than the configuration of the imaging element in which the A/D converter is mounted for each pixel dedicated to the AF (for example, the phase difference pixel). In addition, within the output period, the analog pixel data 69A of each of the plurality of frames is read out in parallel, and reading of the analog non-phase difference pixel data 69A2 and plural reading of the analog phase difference pixel data 69A1 are performed.

A plurality of pieces of digital phase difference pixel data 69B1 obtained by digitizing a plurality of pieces of analog phase difference pixel data 69A1 are used for the AF control. Apparently, the plurality of pieces of digital phase difference pixel data 69B1 contribute to achieving high accuracy of the AF more than one piece of digital phase difference pixel data 69B1. Accordingly, according to the imaging element 44 according to the first embodiment, high accuracy of the AF can be achieved with a simpler configuration than in a case where the pixel data is read out a plurality of number of times from the pixel dedicated to the AF within a reading period in which an image of one frame is read out.

In addition, in the imaging element 44 according to the first embodiment, reading of the analog non-phase difference pixel data 69A2 and reading of the analog phase difference pixel data 69A1 are performed in parallel by the reading circuit 62A. Accordingly, more pieces of the analog phase difference pixel data 69A1 and the analog non-phase difference pixel data 69A2 can be read out within a limited time period, compared to a case where reading of one of the analog phase difference pixel data 69A1 and the analog non-phase difference pixel data 69A2 is started after reading of the other is completed.

In addition, in the imaging element 44 according to the first embodiment, the analog pixel data 69A is read out in units of horizontal lines by the reading circuit 62A. Accordingly, thinning in units of horizontal lines can be implemented.

In addition, in the imaging element 44 according to the first embodiment, pixel data of the phase difference pixel is employed as the analog phase difference pixel data 69A1, and pixel data of the non-phase difference pixel N is employed as the analog non-phase difference pixel data 69A2. Accordingly, the analog phase difference pixel data 69A1 and the analog non-phase difference pixel data 69A2 can be more easily obtained than in a case of generating the analog phase difference pixel data 69A1 from pixel data of a pixel other than the phase difference pixel and generating the analog non-phase difference pixel data 69A2 from pixel data of a pixel other than the non-phase difference pixel.

In addition, in the imaging element 44 according to the first embodiment, within the output period, the analog non-phase difference pixel data 69A2 is read out from the non-phase difference pixel N, and the analog phase difference pixel data 69A1 is read out a plurality of number of times from the phase difference pixel. Accordingly, the analog non-phase difference pixel data 69A2 and a plurality of pieces of analog phase difference pixel data 69A1 can be obtained within the output period, compared to a case where reading of the analog non-phase difference pixel data 69A2 from the non-phase difference pixel N and reading of the analog phase difference pixel data 69A1 from the phase difference pixel are alternately performed once for each output period.

In addition, in the imaging element 44 according to the first embodiment, the analog phase difference pixel data 69A1 is read out from each phase difference pixel included in the plurality of phase difference pixel lines 61A by the first reading circuit 62A1. In addition, the analog non-phase difference pixel data 69A2 is read out from each non-phase difference pixel N included in the plurality of non-phase difference pixel lines 61B by the second reading circuit 62A2. Accordingly, a load exerted on reading of the analog phase difference pixel data 69A1 and a load exerted on reading of the analog non-phase difference pixel data 69A2 can be distributed.

In addition, in the imaging element 44 according to the first embodiment, reading of the analog phase difference pixel data 69A1 by the first reading circuit 62A1 and reading of the analog non-phase difference pixel data 69A2 by the second reading circuit 62A2 are independently performed. Accordingly, a case where one of reading of the analog phase difference pixel data 69A1 and reading of the analog non-phase difference pixel data 69A2 affects the other can be avoided.

In addition, in the imaging element 44 according to the first embodiment, reading of the analog phase difference pixel data 69A1 from the phase difference pixel by the first reading circuit 62A1 is performed earlier than reading of the analog non-phase difference pixel data 69A2 from the non-phase difference pixel N by the second reading circuit 62A2. Accordingly, the digital phase difference pixel data 69B1 can be quickly used for the AF control, compared to a case where reading of the analog non-phase difference pixel data 69A2 is performed earlier than reading of the analog phase difference pixel data 69A1.

In addition, in the imaging element 44 according to the first embodiment, the horizontal line in which the phase difference pixels and the non-phase difference pixels N are periodically arranged is employed as the phase difference pixel line 61A. Accordingly, accuracy of the AF for a wide area can be increased, compared to a case of using a horizontal line in which the phase difference pixels and the non-phase difference pixels N are arranged in a locally concentrated manner.

In addition, in the imaging element 44 according to the first embodiment, the phase difference pixel lines 61A and the predetermined number of lines of the non-phase difference pixel lines 61B are alternately arranged on the imaging surface 44A in the column direction. Accordingly, the accuracy of the AF for a wide area can be increased, compared to a case where the phase difference pixel lines 61A and the non-phase difference pixel lines 61B are arranged in the column direction in a locally concentrated manner.

In addition, in the imaging element 44 according to the first embodiment, in a case where the digital pixel data 69B of one frame is output by the output circuit 62D, the digital phase difference pixel data 69B1 and the digital non-phase difference pixel data 69B2 are output at different timings. Accordingly, it is possible to contribute to size reduction of the imaging element 44, compared to a case of using a dedicated output circuit for each of the digital phase difference pixel data 69B1 and the digital non-phase difference pixel data 69B2.

In addition, in the imaging element 44 according to the first embodiment, the digital non-phase difference pixel data 69B2 is output after output of the digital phase difference pixel data 69B1 is completed. Accordingly, the digital phase difference pixel data 69B1 can be quickly used for the AF control, compared to a case where the digital phase difference pixel data 69B1 is output after output of the digital non-phase difference pixel data 69B2 is completed.

In addition, in the imaging element 44 according to the first embodiment, the A/D conversion is performed on the analog phase difference pixel data 69A1 and the analog non-phase difference pixel data 69A2 at different timings. Accordingly, it is possible to contribute to size reduction of the imaging element 44, compared to a case of using a dedicated A/D converter for each of the analog phase difference pixel data 69A1 and the analog non-phase difference pixel data 69A2.

In addition, the imaging element 44 according to the first embodiment is an imaging element in which the photoelectric conversion element 61, the processing circuit 62, and the memory 64 are formed in one chip. Accordingly, portability of the imaging element 44 is increased, compared to an imaging element in which the photoelectric conversion element 61, the processing circuit 62, and the memory 64 are not formed in one chip. In addition, a degree of design freedom can be increased, compared to a case of the imaging element in which the photoelectric conversion element 61, the processing circuit 62, and the memory 64 are not formed in one chip. Furthermore, it is possible to contribute to size reduction of the imaging apparatus main body 12, compared to a case of the imaging element in which the photoelectric conversion element 61, the processing circuit 62, and the memory 64 are not formed in one chip.

In addition, as illustrated in FIG. 5, the laminated imaging element in which the photoelectric conversion element 61 is laminated with the memory 64 is employed as the imaging element 44. Accordingly, since a wire that connects the photoelectric conversion element 61 to the memory 64 can be shortened, a wire delay can be reduced. Consequently, a transfer speed of the image data 69 from the photoelectric conversion element 61 to the memory 64 can be increased, compared to a case where the photoelectric conversion element 61 and the memory 64 are not laminated. Improving the transfer speed contributes to high-speed processing in the entire processing circuit 62. In addition, the degree of design freedom can be increased, compared to a case of not laminating the photoelectric conversion element 61 and the memory 64. Furthermore, it is possible to contribute to size reduction of the imaging apparatus main body 12, compared to a case of not laminating the photoelectric conversion element 61 and the memory 64.

Furthermore, in the imaging apparatus 10, the live view image or the like based on the digital pixel data 69B is displayed on the display 32. In addition, the digital pixel data 69B is stored in the secondary storage device 80. Accordingly, general-purpose properties of the digital pixel data 69B can be increased.

While the imaging element in which the photoelectric conversion element 61, the processing circuit 62, and the memory 64 are formed in one chip is illustrated as the imaging element 44 in the first embodiment, the technology of the present disclosure is not limited thereto. For example, at least the photoelectric conversion element 61 and the memory 64 among the photoelectric conversion element 61, the processing circuit 62, and the memory 64 may be formed in one chip.

In addition, in the first embodiment, the image processing circuit 62C performs the image processing on the digital non-phase difference pixel data 69B2 obtained by performing the A/D conversion, and the digital non-phase difference pixel data 69B2 on which the image processing is performed is used as an output target. However, the technology of the present disclosure is not limited thereto. The digital non-phase difference pixel data 69B2 obtained by performing the A/D conversion may be output by the output circuit 62D without performing the image processing on the digital non-phase difference pixel data 69B2. In this case, instead of the image processing circuit 62C, the signal processing portion 50 and/or the controller 46 which is the rear stage circuit of the imaging element 44 may perform the image processing on the digital non-phase difference pixel data 69B2.

In addition, in the first embodiment, while the image processing is not performed on the digital phase difference pixel data 69B1 by the image processing circuit 62C, the technology of the present disclosure is not limited thereto. For example, the image processing may be performed on the digital phase difference pixel data 69B1 by the image processing circuit 62C. In this case, the digital phase difference pixel data 69B1 on which the image processing is performed by the image processing circuit 62C is output to the signal processing portion 50 by the output circuit 62D. The digital non-phase difference pixel data 69B2 on which the image processing is performed by the image processing circuit 62C is an example of the "image data" and "second pixel data based on the phase difference pixel data" according to the embodiments of the technology of the present disclosure.

In addition, in the first embodiment, while an example of a form of performing wired communication between the imaging element 44 and the signal processing portion 50 through the communication line 53 is illustratively described, the technology of the present disclosure is not limited thereto. For example, wireless communication may be performed between the imaging element 44 and the signal processing portion 50. Similarly, wireless communication may be performed between the imaging element 44 and the controller 46, and wireless communication may be performed between the signal processing portion 50 and the controller 46.

Figure 16:
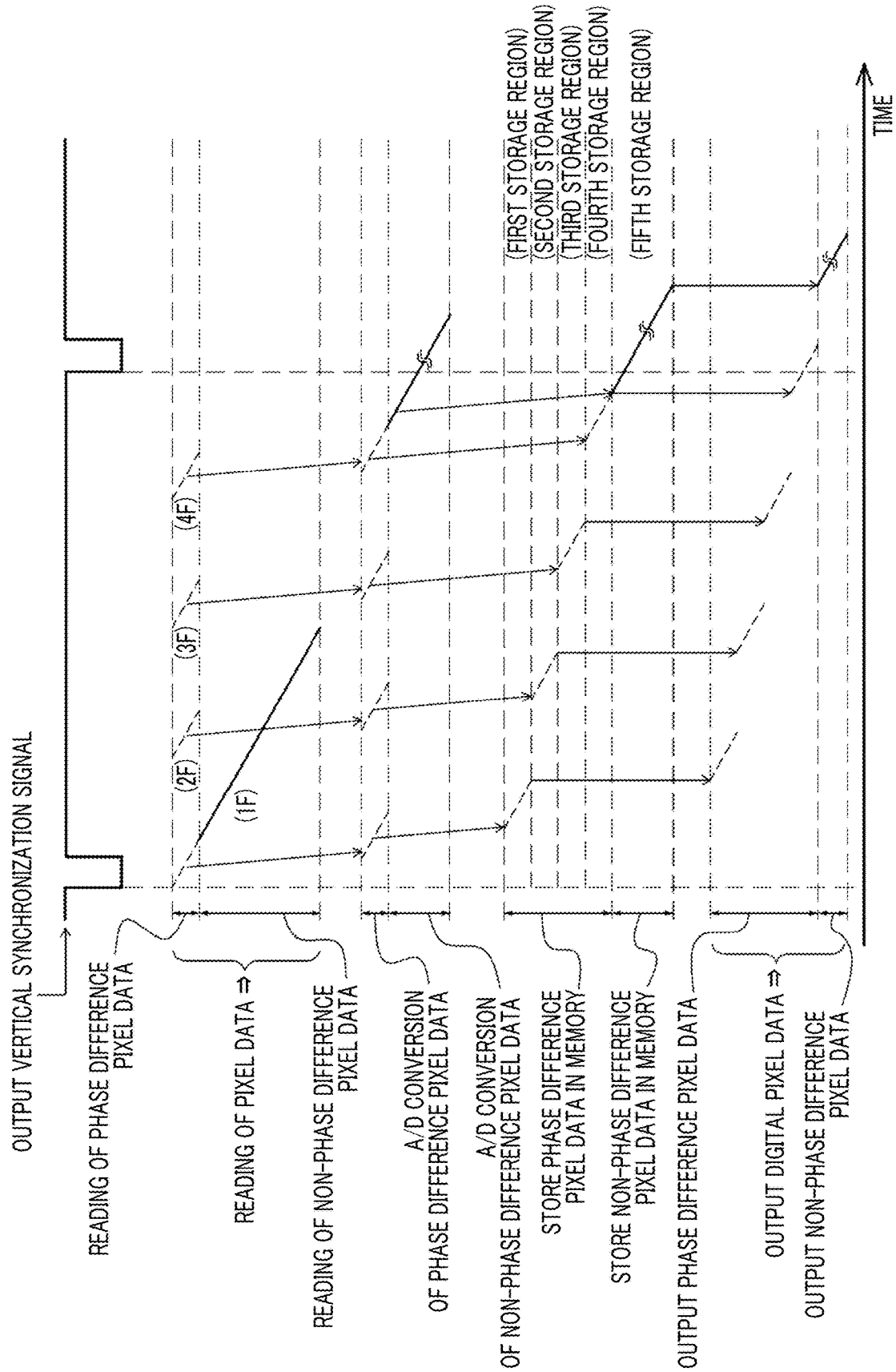
FIG. 16 is a time chart illustrating a first modification example of the reading timing of the analog pixel data, the timing of the A/D conversion, the storage timing in the memory, and the output timing of the digital pixel data in the imaging element included in the imaging apparatus according to the first embodiment.

In addition, in the first embodiment, while an example of a form of reading out the analog phase difference pixel data 69A1 and the analog non-phase difference pixel data 69A2 for all frames within the output period is illustratively described, the technology of the present disclosure is not limited thereto. For example, as illustrated in FIG. 16, the analog phase difference pixel data 69A1 and the analog non-phase difference pixel data 69A2 may be read out for only one representative frame (in the example illustrated in FIG. 16, the first frame) of all frames within the output period. In this case, only the analog phase difference pixel data 69A1 may be read out for each of the other frames (in the example illustrated in FIG. 16, the second frame to the fourth frame). Accordingly, since reading of the analog non-phase difference pixel data 69A2 is not performed for the frames other than the representative frame, power consumption can be reduced, compared to a case where the analog phase difference pixel data 69A1 and the analog non-phase difference pixel data 69A2 are read out for each of all frames.

Figure 17:
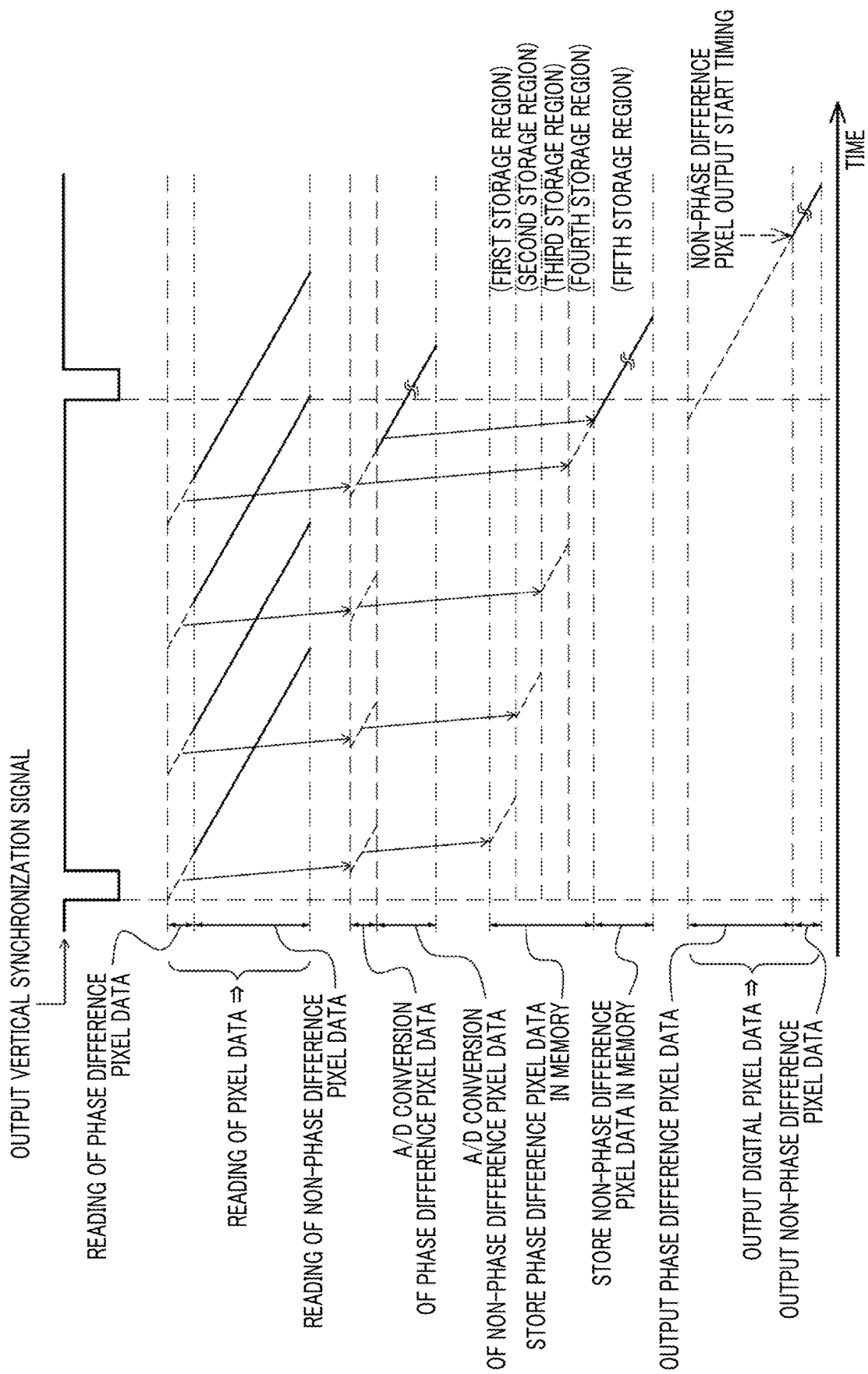
FIG. 17 is a time chart illustrating a second modification example of the reading timing of the analog pixel data, the timing of the A/D conversion, the storage timing in the memory, and the output timing of the digital pixel data in the imaging element included in the imaging apparatus according to the first embodiment.
Figure 18:
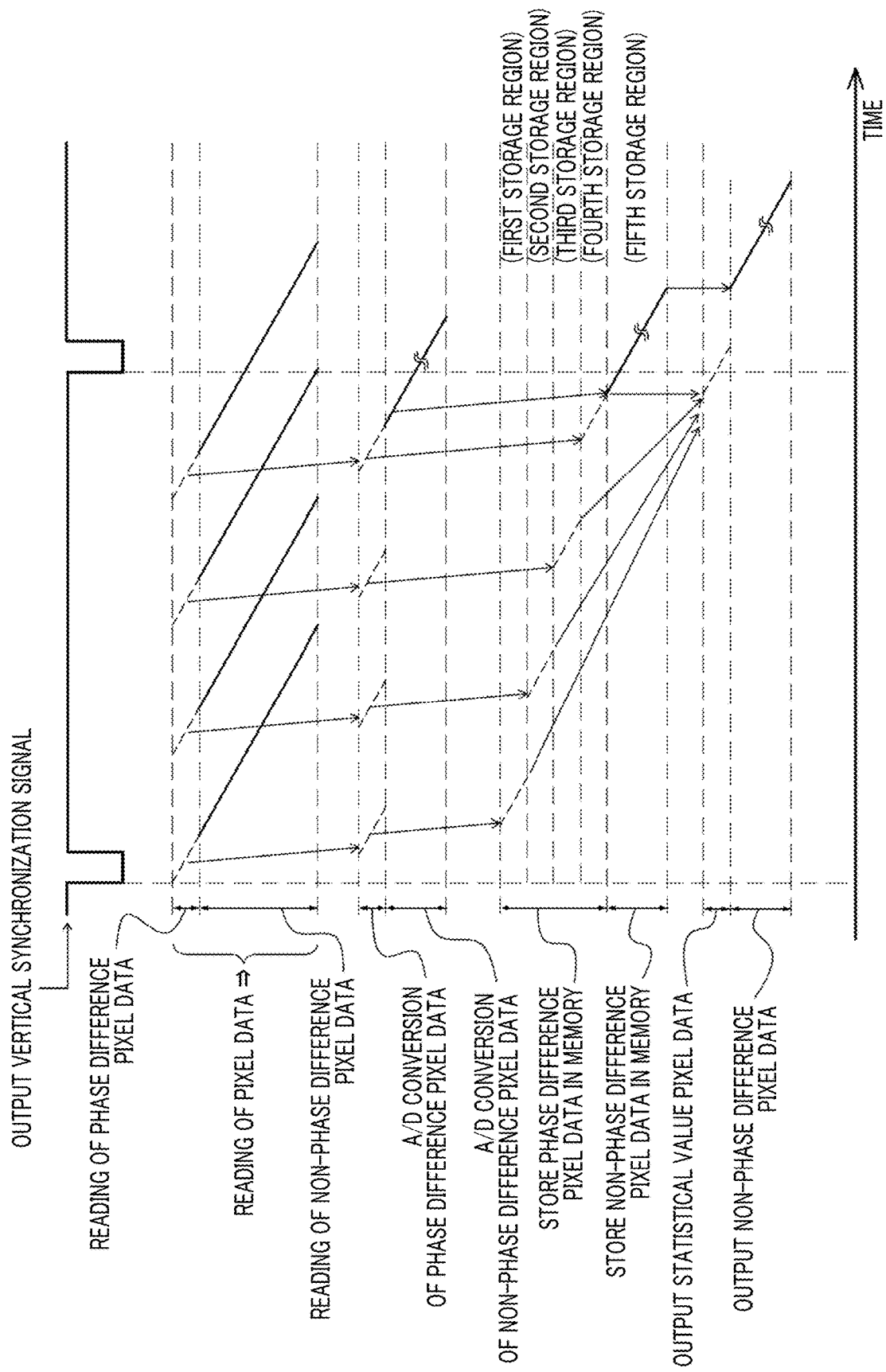
FIG. 18 is a time chart illustrating a third modification example of the reading timing of the analog pixel data, the timing of the A/D conversion, the storage timing in the memory, and the output timing of the digital pixel data in the imaging element included in the imaging apparatus according to the first embodiment.

In addition, in the first embodiment, while an example of a form in which each time the digital phase difference pixel data 69B1 is stored in the memory 64, the digital phase difference pixel data 69B1 is output to the signal processing portion 50 without waiting for storage of the digital phase difference pixel data 69B1 of a subsequent frame in the memory 64 is illustratively described, the technology of the present disclosure is not limited thereto. For example, as illustrated in FIG. 17, the digital phase difference pixel data 69B1 of all frames may be output to the signal processing portion 50 by the output circuit 62D after waiting for storage of the digital phase difference pixel data 69B1 of all frames in the memory 64 in one output period. In this case, the digital non-phase difference pixel data 69B2 may be output to the signal processing portion 50 by the output circuit 62D after waiting for completion of output of the digital phase difference pixel data 69B1 of all frames to the signal processing portion 50. Accordingly, an output timing of the digital phase difference pixel data 69B1 and an output timing of the digital non-phase difference pixel data 69B2 can be differently set.

In addition, in the first embodiment, while an example of a form of outputting the digital phase difference pixel data 69B1 of each frame to the signal processing portion 50 by the output circuit 62D is illustratively described, the technology of the present disclosure is not limited thereto. For example, pixel data based on a statistical value of a plurality of pieces of digital phase difference pixel data 69B1 obtained for each frame may be output to the signal processing portion 50 by the output circuit 62D. Accordingly, an output data amount from the imaging element 44 to the signal processing portion 50 can be decreased, compared to a case of outputting the plurality of pieces of digital phase difference pixel data 69B1 obtained for each frame to the signal processing portion 50.

An arithmetic mean value of a plurality of pieces of digital phase difference pixel data 69B1 obtained for each frame within the output period is exemplified as the statistical value. Here, for example, the digital phase difference pixel data 69B1 of the plurality of frames is combined into the digital phase difference pixel data 69B1 of one frame by calculating the arithmetic mean value between positionally corresponding pixels among the plurality of frames of the digital phase difference pixel data 69B1. Accordingly, the output data amount from the imaging element 44 to the signal processing portion 50 can be decreased, compared to a case of outputting the plurality of pieces of digital phase difference pixel data 69B1 obtained for each frame to the signal processing portion 50. Besides the arithmetic mean value, a center value, a mode value, or the like is exemplified as another example of the statistical value.

Second Embodiment

In the first embodiment, an example of a form of reading out the analog phase difference pixel data 69A1 used for the AF control and the analog non-phase difference pixel data 69A2 used for an application other than the AF control is illustrative described. In a second embodiment, a case where the analog phase difference pixel data 69A1 is also used for the application other than the AF control will be described. In the second embodiment, the same constituents as the first embodiment will be designated by the same reference numerals and will not be described. Hereinafter, parts different from the first embodiment will be mainly described.

As illustrated in FIG. 4 as an example, the imaging apparatus 10 according to the second embodiment is different from the imaging apparatus 10 according to the first embodiment in that a pixel data processing program 46B3 is stored in the ROM 46B of the controller 46 instead of the pixel data processing program 46B2.

Figure 19:
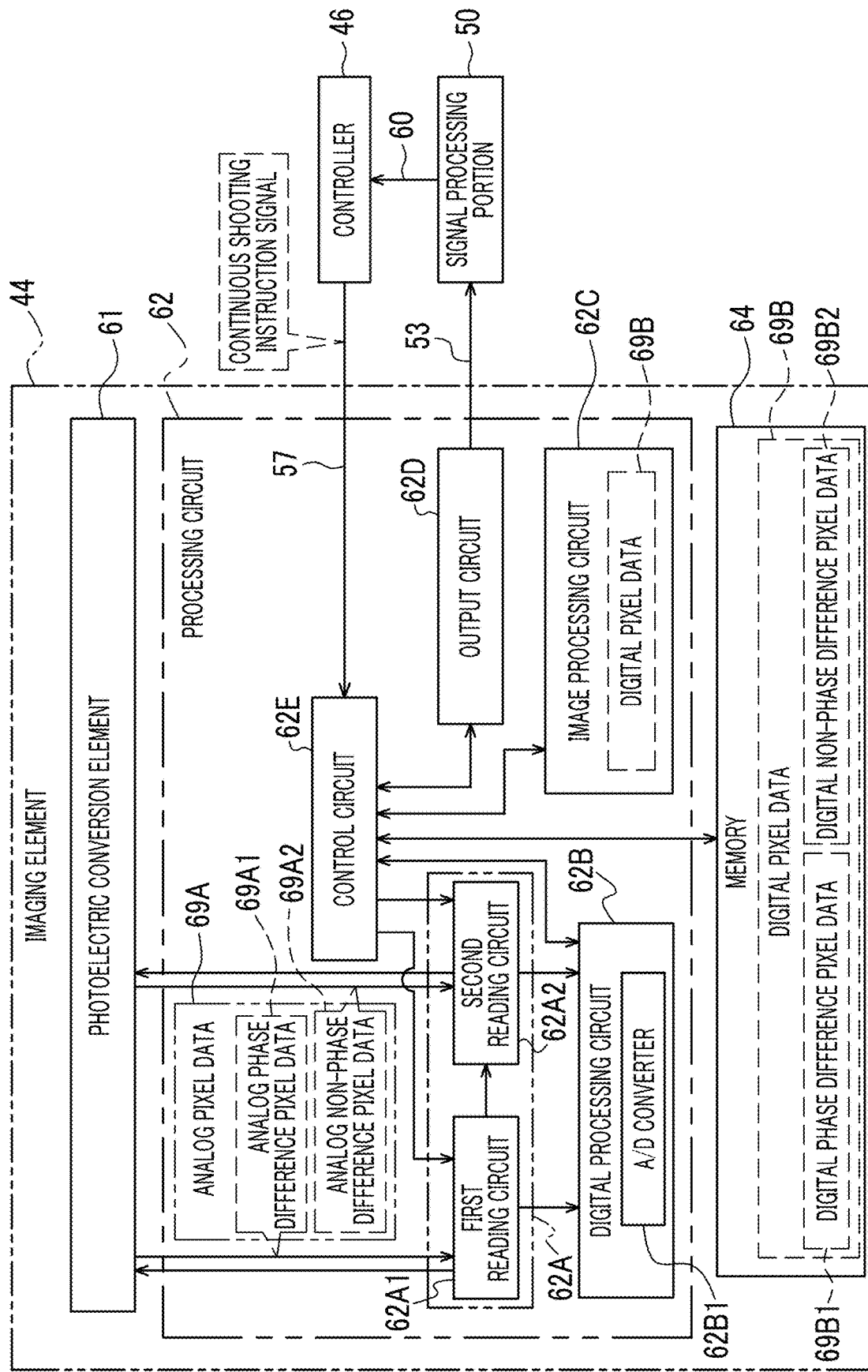
FIG. 19 is a block diagram illustrating an example of a configuration of an electric system of the imaging element included in the imaging apparatus according to the second embodiment.

As illustrated in FIG. 19 as an example, in the imaging apparatus 10 according to the second embodiment, in a case where an instruction to set the operation mode of the imaging apparatus 10 to a continuous shooting mode is received by the reception device 84 (refer to FIG. 4), a continuous shooting instruction signal is supplied to the control circuit 62E from the controller 46 through the communication line 57. The continuous shooting instruction signal refers to a signal for instructing the imaging element 44 to perform imaging as continuous shooting mode.

Figure 20:
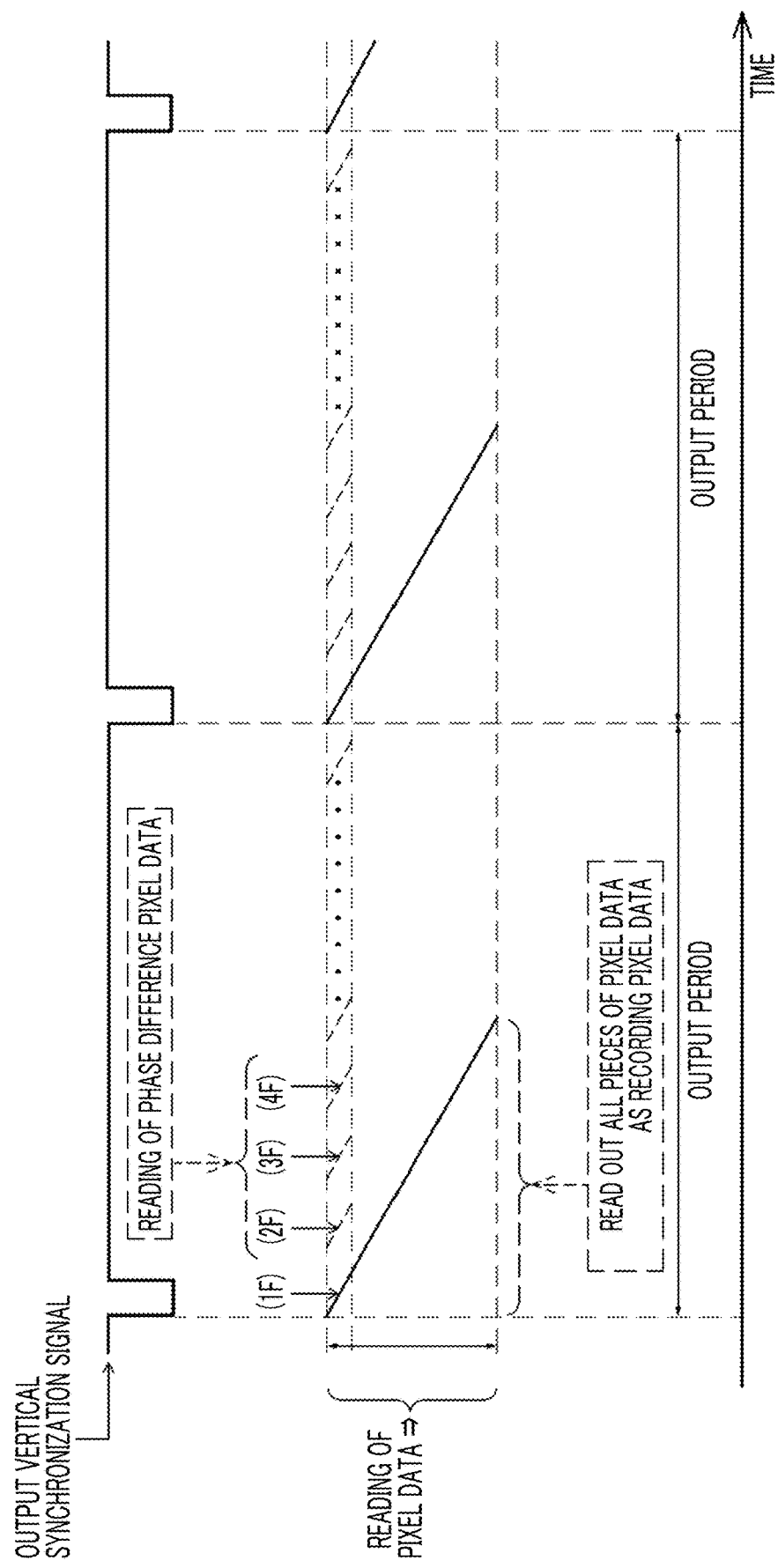
FIG. 20 is a time chart illustrating an example of a reading timing of analog pixel data for each frame by a reading circuit of the imaging element included in the imaging apparatus according to the second embodiment.

In a case where the imaging apparatus 10 is set to the continuous shooting mode, as illustrated in FIG. 20 as an example, all pieces of analog pixel data 69A are read out by the second reading circuit 62A2 for one representative frame (in the example illustrated in FIG. 20, the first frame) in each output period as the recording pixel data. In the example illustrated in FIG. 20, the second reading circuit 62A2 reads out the analog pixel data 69A for the first frame in order from the first row to the last row of the photoelectric conversion element 61. That is, reading of the analog pixel data 69A is performed for all horizontal lines including the phase difference pixel lines 61A and the non-phase difference pixel lines 61B.

While an example of a form of performing reading using all horizontal lines as a target is illustratively described here for convenience of description, the analog pixel data 69A may be read out by performing thinning in units of a few rows and/or units of a few columns using the phase difference pixels and the non-phase difference pixels N as a target.

In the example illustrated in FIG. 20, in one output period, for the second frame or later, the analog phase difference pixel data 69A1 is read out by the first reading circuit 62A1, and reading of the analog non-phase difference pixel data 69A2 is not performed.

In addition, as illustrated in FIG. 20 as an example, in the imaging element 44, reading of the analog phase difference pixel data 69A1 for the other frames is performed by the first reading circuit 62A1 in the reading period of the analog pixel data 69A of one frame. The "analog pixel data 69A of one frame" here includes the analog phase difference pixel data 69A1 and the analog non-phase difference pixel data 69A2.

In the example illustrated in FIG. 20, the analog phase difference pixel data 69A1 is read out by the first reading circuit 62A1 for the other plurality of frames during reading of the analog pixel data 69A as the recording pixel data within a reading period of the first frame. In the example illustrated in FIG. 20, the other plurality of frames refer to the second frame to the fourth frame.

Here, the analog phase difference pixel data 69A1 is read out by the first reading circuit 62A1 for the other plurality of frames during reading of the analog pixel data 69A as the recording pixel data within the reading period of one frame. However, the technology of the present disclosure is not limited thereto. For example, the analog phase difference pixel data 69A1 may be read out by the first reading circuit 62A1 for the subsequent one frame during reading of the analog pixel data 69A as the recording pixel data within the reading period of one frame.

Figure 21:
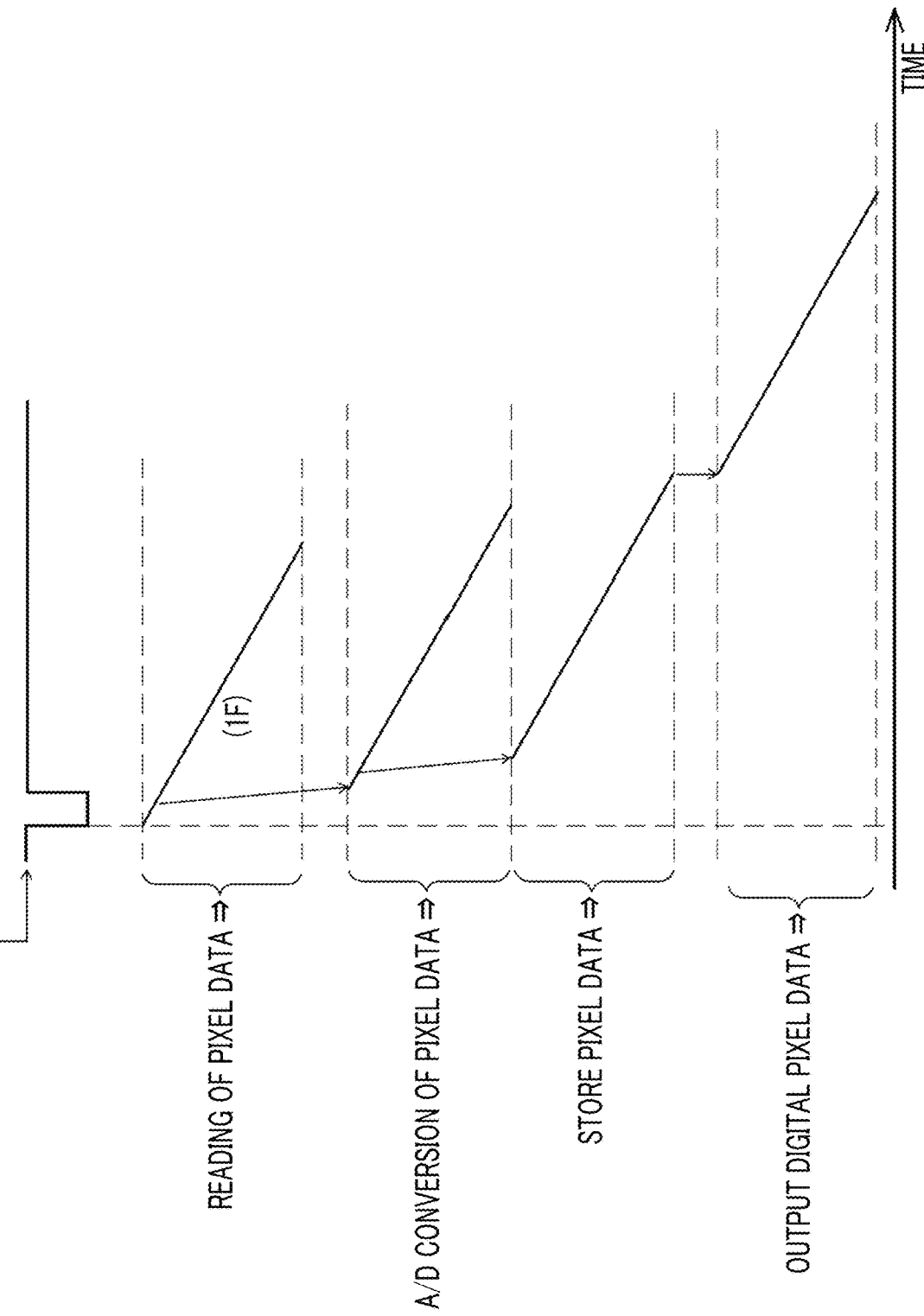
FIG. 21 is a time chart illustrating an example of a reading timing of analog pixel data, a timing of A/D conversion, a storage timing into a memory, and an output timing of digital pixel data in the imaging element included in the imaging apparatus according to the second embodiment.

In a case where the analog pixel data 69A is read out by the second reading circuit 62A2 as the recording pixel data within the reading period of the first frame, the A/D conversion is performed on the analog pixel data 69A read out as the recording pixel data as illustrated in FIG. 21 as an example. Accordingly, the analog pixel data 69A is converted into the digital pixel data 69B and stored in the memory 64. The digital pixel data 69B stored in the memory 64 is output to the signal processing portion 50 by the output circuit 62D.

Next, an action of the imaging apparatus 10 according to the second embodiment will be described.

First, in-imaging element processing executed by the processing circuit 62 of the imaging element 44 within the output period will be described with reference to FIG. 22 and FIG. 23.

Figure 22:
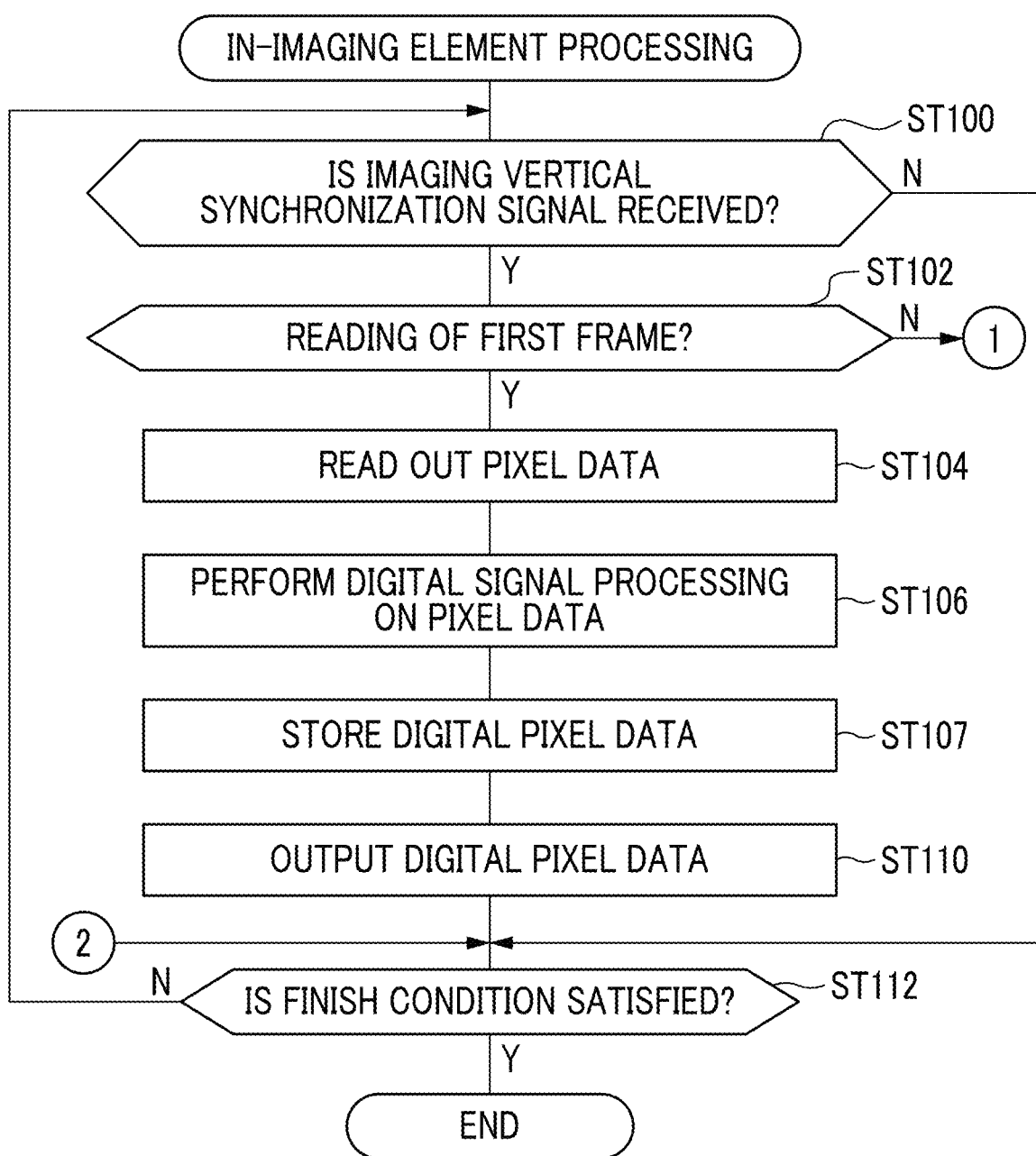
FIG. 22 is a flowchart illustrating an example of a flow of in-imaging element processing according to the second embodiment.

In the in-imaging element processing illustrated in FIG. 22, first, in step ST100, the control circuit 62E determines whether or not the imaging vertical synchronization signal output by executing processing of step ST12 of the timing control processing described in the first embodiment is received. In step ST100, in a case where the imaging vertical synchronization signal is not received, a negative determination is made, and the in-imaging element processing transitions to step ST112. In step ST100, in a case where the imaging vertical synchronization signal is received, a positive determination is made, and the in-imaging element processing transitions to step ST102.

In step ST102, the control circuit 62E determines whether or not reading of the analog pixel data 69A performed by the reading circuit 62A is reading of the first frame. In step ST102, in a case where reading of the analog pixel data 69A performed by the reading circuit 62A is reading of the second frame or later, a negative determination is made, and the in-imaging element processing transitions to step ST114 illustrated in FIG. 23. In step ST102, in a case where reading of the analog pixel data 69A performed by the reading circuit 62A is reading of the first frame, a positive determination is made, and the in-imaging element processing transitions to step ST104. Here, the read analog pixel data 69A includes the analog phase difference pixel data 69A1 of one frame and the analog non-phase difference pixel data 69A2 of one frame.

In step ST104, the second reading circuit 62A2 reads out the analog pixel data 69A of one frame from the photoelectric conversion element 61. Then, the in-imaging element processing transitions to step ST106.

In step ST106, the digital processing circuit 62B converts the analog pixel data 69A into the digital pixel data 69B by performing the digital signal processing on the analog pixel data 69A read out by the second reading circuit 62A2.

In subsequent step ST107, the control circuit 62E acquires the digital pixel data 69B from the digital processing circuit 62B and stores the acquired digital pixel data 69B in the memory 64. Then, the in-imaging element processing transitions to step ST110. The memory 64 stores the digital pixel data 69B on which the image processing is performed by the image processing circuit 62C.

In a case where the digital pixel data 69B is stored in the memory 64, the digital pixel data 69B is acquired from the memory 64 by the control circuit 62E, and the acquired digital pixel data 69B is transferred to the output circuit 62D.

In subsequent step ST110, the output circuit 62D outputs the digital pixel data 69B input from the control circuit 62E to the signal processing portion 50. Then, the in-imaging element processing transitions to step ST112.

Figure 23:
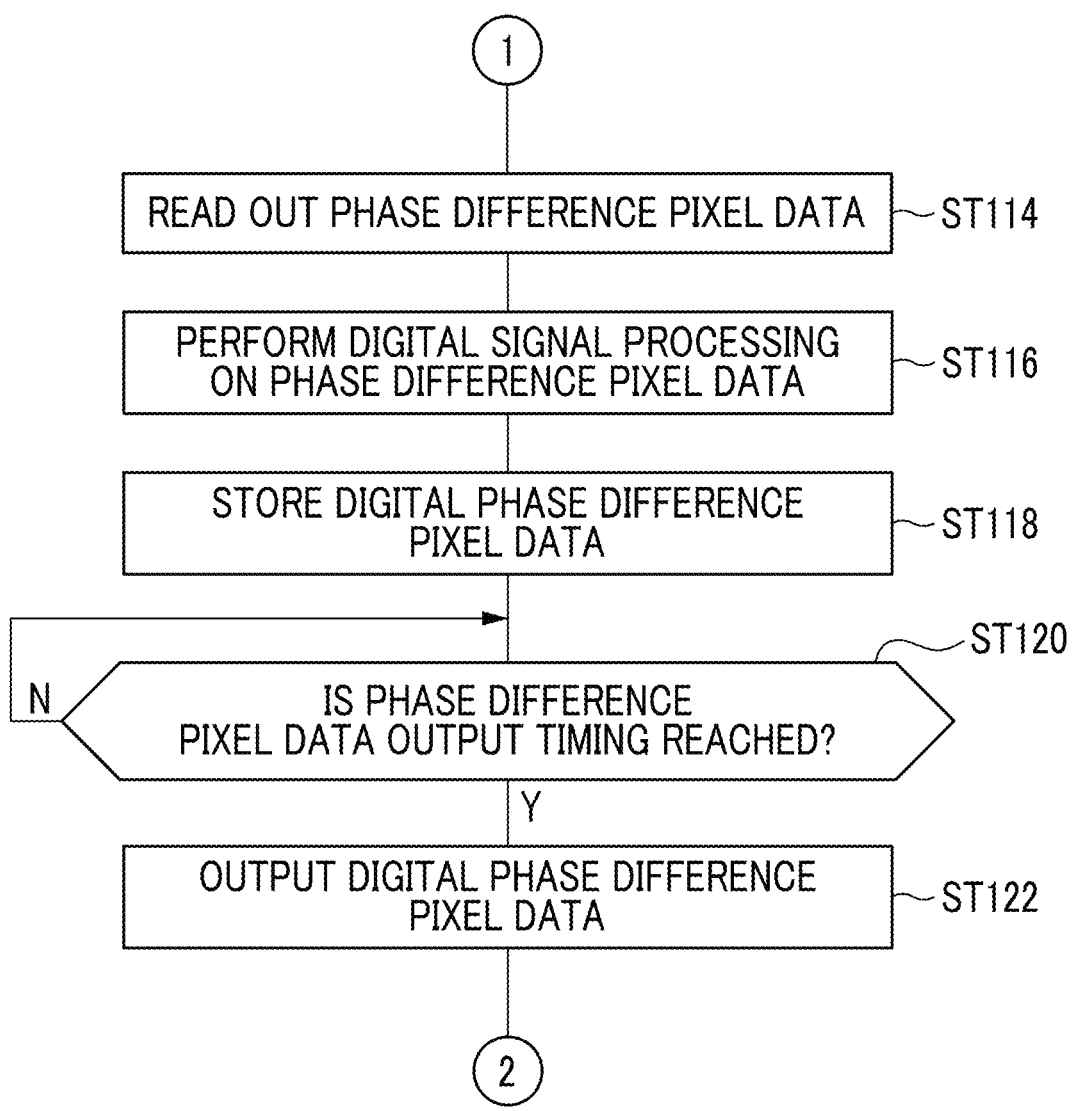
FIG. 23 is a continuation of the flowchart illustrated in FIG. 22.

In step ST114 illustrated in FIG. 23, the first reading circuit 62A1 reads out the analog phase difference pixel data 69A1 of one frame from the photoelectric conversion element 61. Then, the in-imaging element processing transitions to step ST116.

In step ST116, the digital processing circuit 62B converts the analog phase difference pixel data 69A1 into the digital phase difference pixel data 69B1 by performing the digital signal processing on the analog phase difference pixel data 69A1 read out by the first reading circuit 62A1.

In subsequent step ST118, the control circuit 62E acquires the digital phase difference pixel data 69B1 from the digital processing circuit 62B and stores the acquired digital phase difference pixel data 69B1 in the memory 64. Then, the in-imaging element processing transitions to step ST120.

In step ST120, the control circuit 62E determines whether or not a phase difference pixel data output timing is reached. The phase difference pixel data output timing refers to a timing at which the digital phase difference pixel data 69B1 in the memory 64 is output to the signal processing portion 50. The phase difference pixel data output timing may be a timing that does not overlap with an output timing of the digital pixel data 69B of the first frame to the signal processing portion 50 within the same output period. For example, a timing at which output of the digital pixel data 69B of the first frame to the signal processing portion 50 within the same output period is completed is exemplified as the phase difference pixel data output timing.

In step ST120, in a case where the phase difference pixel data output timing is not reached, a negative determination is made, and the determination of step ST120 is performed again. In step ST120, in a case where the phase difference pixel data output timing is reached, a positive determination is made, and the in-imaging element processing transitions to step ST122.

In step ST122, the control circuit 62E acquires the digital phase difference pixel data 69B1 from the memory 64 and transfers the acquired digital phase difference pixel data 69B1 to the output circuit 62D. The output circuit 62D outputs the digital phase difference pixel data 69B1 input from the control circuit 62E to the signal processing portion 50. Then, the in-imaging element processing transitions to step ST112 illustrated in FIG. 22.

In step ST112, the control circuit 62E determines whether or not a condition (hereinafter, referred to as an "in-imaging element processing finish condition") under which the in-imaging element processing is finished is satisfied. For example, a condition that an instruction to finish the in-imaging element processing is received by the reception device 84 (refer to FIG. 4) is exemplified as the in-imaging element processing finish condition. In step ST112, in a case where the in-imaging element processing finish condition is not satisfied, a negative determination is made, and the in-imaging element processing transitions to step ST100. In step ST112, in a case where the in-imaging element processing finish condition is satisfied, a positive determination is made, and the in-imaging element processing is finished.

In the signal processing portion 50, various types of signal processing are performed on the digital pixel data 69B input from the imaging element 44, and the digital pixel data 69B on which the various types of signal processing are performed is output to the controller 46.

Next, pixel data processing executed by the CPU 46A in accordance with the pixel data processing program 46B3 in a case where the digital pixel data 69B is input into the controller 46 from the signal processing portion 50 will be described with reference to FIG. 24.

Figure 24:
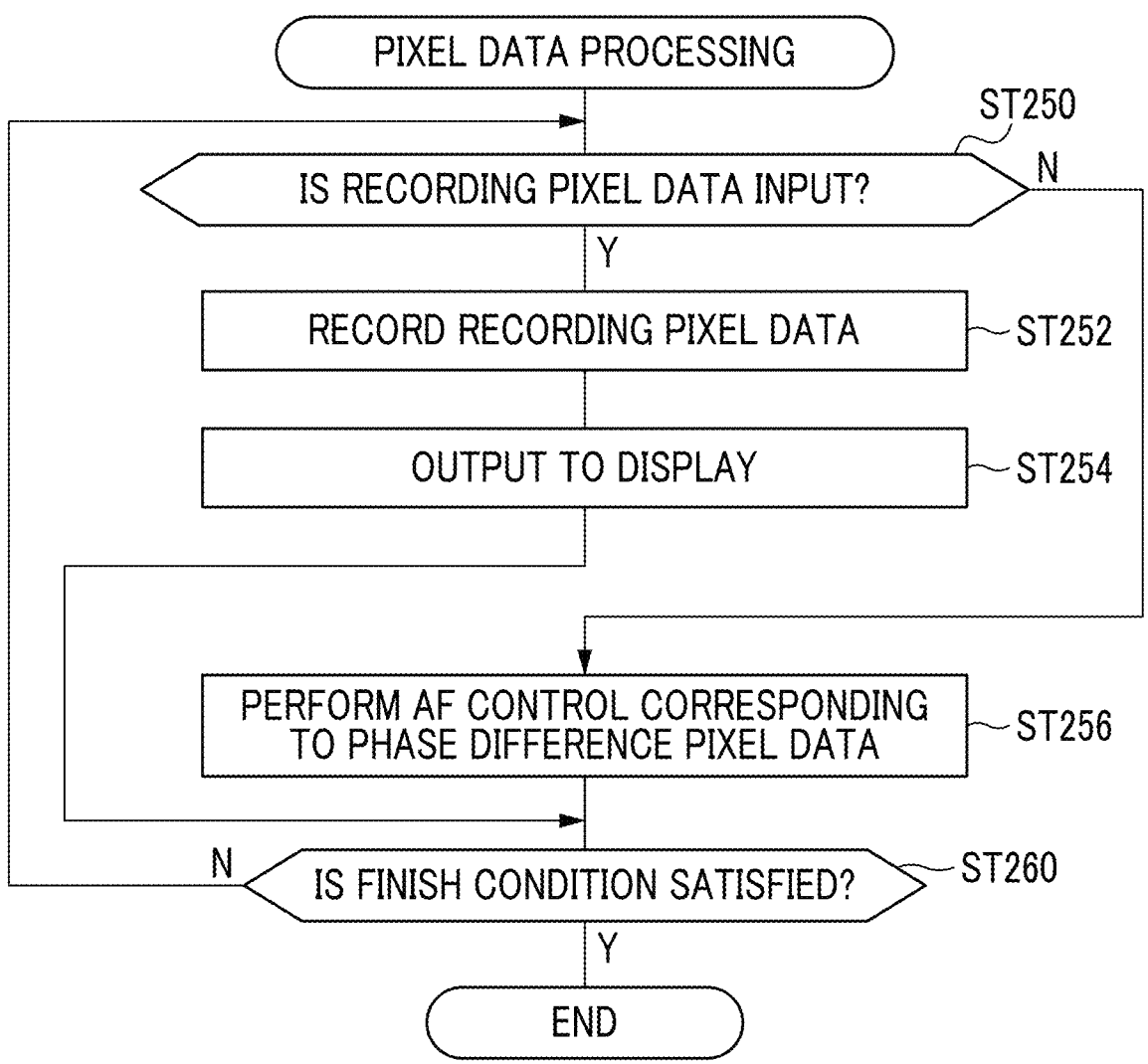
FIG. 24 is a flowchart illustrating an example of a flow of pixel data processing according to the second embodiment.

In the pixel data processing illustrated in FIG. 24, first, in step ST250, the CPU 46A determines whether or not the digital pixel data 69B input from the signal processing portion 50 is the recording pixel data. The "recording pixel data" here refers to pixel data obtained by performing the various types of signal processing on the digital pixel data 69B (digital pixel data 69B output in step ST110) of the first frame by the signal processing portion 50. In addition, the "digital pixel data 69B of the first frame" here refers to the digital pixel data 69B obtained by digitizing the analog pixel data 69A (analog pixel data 69A read out in step ST104) of the first frame read out by the second reading circuit 62A2 within the output period.

In step ST250, in a case where the digital pixel data 69B input from the signal processing portion 50 is the digital phase difference pixel data 69B1, a negative determination is made, and the pixel data processing transitions to step ST256. In step ST250, in a case where the digital pixel data 69B input from the signal processing portion 50 is the recording pixel data, a positive determination is made, and the pixel data processing transitions to step ST252.

In step ST252, the CPU 46A records the recording pixel data on the predetermined recording medium. Then, the pixel data processing transitions to step ST254.

In step ST254, the CPU 46A acquires the recording pixel data, which is recorded on the predetermined recording medium in step ST250, from the predetermined recording medium, and thins out and outputs the recording pixel data to the display 32. Then, the pixel data processing transitions to step ST254. For example, a method of thinning out even-numbered lines or odd-numbered lines in the column direction is exemplified as a method of thinning out the recording pixel data. In a case where the recording pixel data is output to the display 32, the display 32 displays an image based on the recording pixel data.

In step ST256, the CPU 46A executes the AF control using the digital phase difference pixel data 69B1 input from the signal processing portion 50. Then, the pixel data processing transitions to step ST260.

In step ST260, the CPU 46A determines whether or not the pixel data processing finish condition described in the first embodiment is satisfied. In step ST260, in a case where the pixel data processing finish condition is not satisfied, a negative determination is made, and the pixel data processing transitions to step ST250. In step ST260, in a case where the pixel data processing finish condition is satisfied, a positive determination is made, and the pixel data processing is finished.

As described above, in the imaging element 44 according to the second embodiment, the analog pixel data 69A including the analog phase difference pixel data 69A1 and the analog non-phase difference pixel data 69A2 of one frame is read out by the second reading circuit 62A2 as the recording pixel data within the reading period of one frame. The analog phase difference pixel data 69A1 of the other frames is read out by the first reading circuit 62A during reading of the analog pixel data 69A as the recording pixel data. Accordingly, more pieces of the analog pixel data 69A as the recording pixel data and the analog phase difference pixel data 69A1 can be read out within a limited time period, compared to a case where the analog phase difference pixel data 69A1 is read out after waiting for reading of the analog pixel data 69A as the recording pixel data.

In addition, in the imaging element 44 according to the second embodiment, the analog non-phase difference pixel data 69A2 is read out as the recording pixel data in a case of the continuous shooting mode. Accordingly, in a case of the continuous shooting mode, the digital non-phase difference pixel data 69B2 obtained by digitizing the analog non-phase difference pixel data 69A2 read out as the recording pixel data can be recorded on the predetermined recording medium.

In the second embodiment, while an example of a form of reading out the analog non-phase difference pixel data 69A2 as the recording pixel data in a case of the continuous shooting mode is illustratively described, the technology of the present disclosure is not limited thereto. For example, the analog non-phase difference pixel data 69A2 may be read out as the recording pixel data in a case where a predetermined condition is satisfied. A condition that the predetermined recording medium is electrically connected to the external FF 82 is exemplified as a first example of the predetermined condition. A condition that the imaging apparatus 10 is set to the motion picture image recording imaging mode is exemplified as a second example of the predetermined condition. A condition that the imaging apparatus 10 is set to the still picture image recording imaging mode is exemplified as a third example of the predetermined condition. A condition that the imaging frame rate is set to a frame rate higher than a first predetermined frame rate (for example, 120 fps) is exemplified as a fourth example of the predetermined condition. A condition that the output frame rate is set to a frame rate higher than a second predetermined frame rate (for example, 30 fps) is exemplified as a fifth example of the predetermined condition. In such a manner, by reading out the analog non-phase difference pixel data 69A2 as the recording pixel data in a case where the predetermined condition is satisfied, general-purpose properties can be increased, compared to a case of reading out the analog non-phase difference pixel data 69A2 at all times as the recording pixel data.

As illustrated in FIG. 7 as an example, the left region passing light 300L that has passed through the exit pupil of the imaging lens 40 passes through the microlens 19 corresponding to the first phase difference pixel L and is received by the photodiode PD of the first phase difference pixel L. However, in a case where the left region passing light 300L passes through the microlens 19 corresponding to the second phase difference pixel R, the light shielding member 21B is shielding against the left region passing light 300L. Thus, the left region passing light 300L is not received by the photodiode PD of the second phase difference pixel R.

Meanwhile, the right region passing light 300R that has passed through the exit pupil of the imaging lens 40 passes through the microlens 19 corresponding to the second phase difference pixel R and is received by the photodiode PD of the second phase difference pixel R. However, in a case where the right region passing light 300R passes through the microlens 19 corresponding to the first phase difference pixel L, the light shielding member 21A is shielding against the right region passing light 300R. Thus, the right region passing light 300R is not received by the photodiode PD of the first phase difference pixel L.

Figure 25:
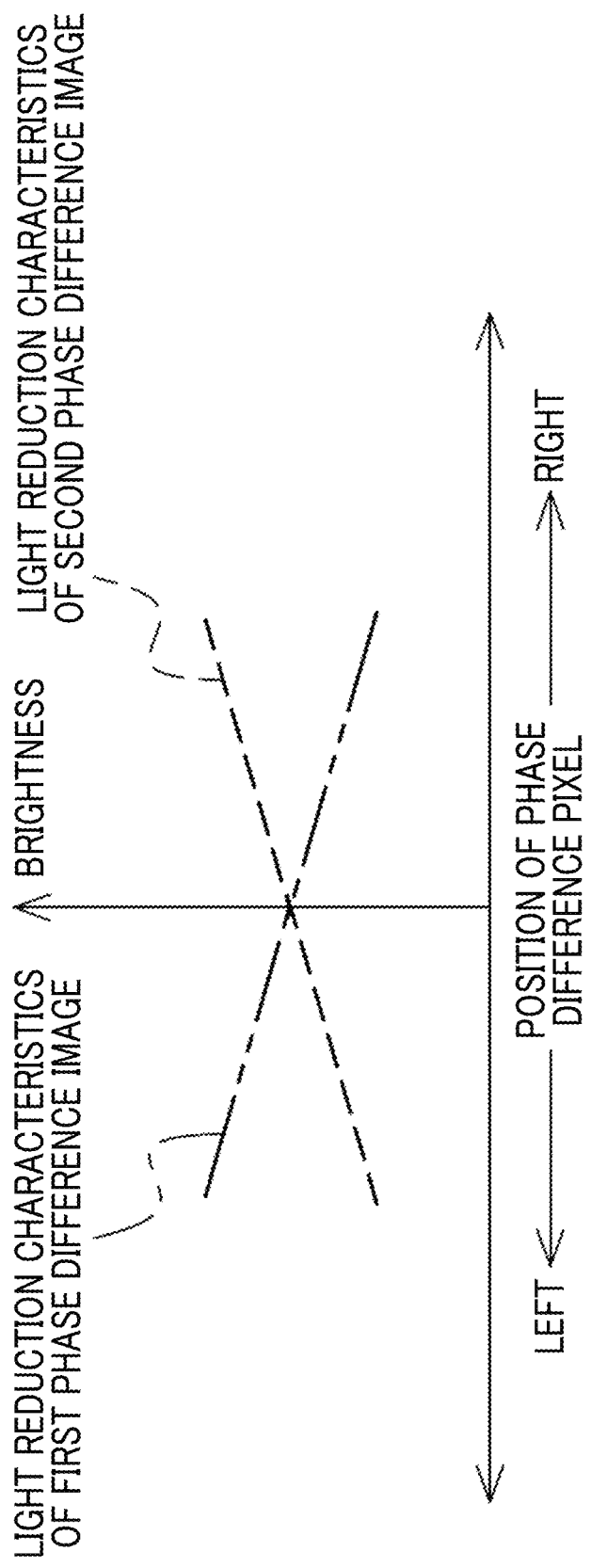
FIG. 25 is a graph illustrating an example of light reduction characteristics of a first phase difference image based on first phase difference pixel data from a first phase difference pixel and light reduction characteristics of a second phase difference image based on second phase difference pixel data from a second phase difference pixel included in the imaging element according to the second embodiment.

In such a manner, since the light shielding member is arranged in a half of the pixel, and a center of each of the left region passing light 300L and the right region passing light 300R deviates from an optical axis of the imaging lens 40, light reduction characteristics linearly change in each of the first phase difference pixel L and the second phase difference pixel R in accordance with a pixel position on the horizontal line. For example, in a case where the digital phase difference pixel data 69B1 is employed as the recording pixel data, a change in light reduction characteristics appears as a change in output of the image based on the recording pixel data. For example, as illustrated in FIG. 25, in a first phase difference image based on the digital phase difference pixel data 69B1 obtained from the first phase difference pixel L, brightness is decreased as the pixel position moves in a rightward direction. In addition, in a second phase difference image based on the digital phase difference pixel data 69B1 obtained from the second phase difference pixel R, the brightness is decreased as the pixel position moves in a leftward direction.

Figure 26:
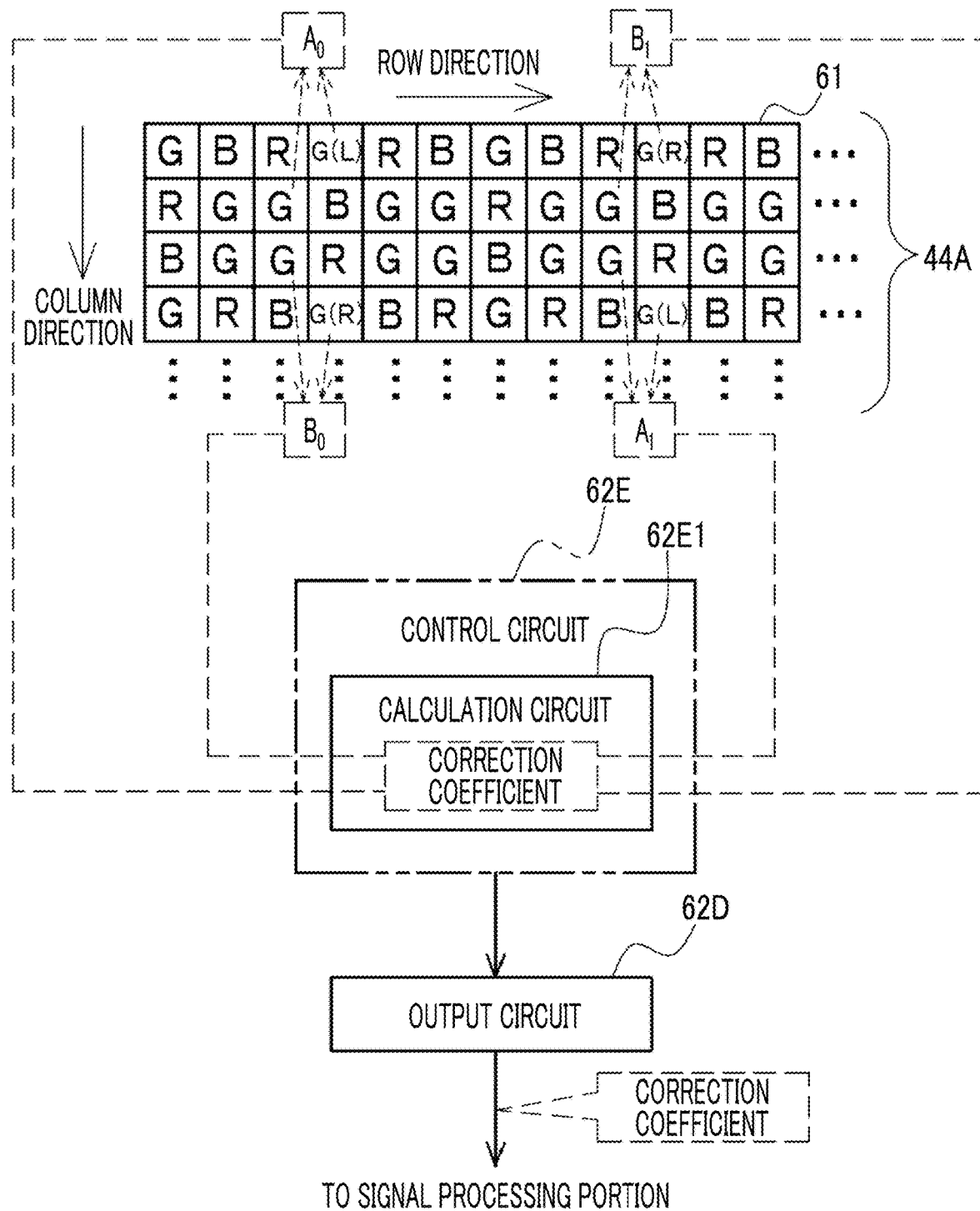
FIG. 26 is a block diagram illustrating an example of a calculation circuit that calculates a correction coefficient for correcting the light reduction characteristics illustrated in FIG. 25.

Therefore, a correction coefficient for correcting the light reduction characteristics caused by the phase difference pixels may be derived by the control circuit 62E. In order to derive the correction coefficient, the control circuit 62E comprises a calculation circuit 62E1 as illustrated in FIG. 26 as an example. The calculation circuit 62E1 is an example of a "derivation portion (derivation circuit)" according to the embodiments of the technology of the present disclosure and calculates the correction coefficient. The correction coefficient is broadly divided into a first phase difference pixel correction coefficient and a second phase difference pixel correction coefficient.

The first phase difference pixel correction coefficient refers to a ratio $A_n$ of the digital phase difference pixel data 69B1 of the first phase difference pixel L to the digital non-phase difference pixel data 69B2 of the non-phase difference pixel N in a case where the non-phase difference pixel N and the first phase difference pixel L adjacent to each other are used as a target. In the example illustrated in FIG. 26, a ratio $A_0$ and a ratio $A_1$ are illustrated as an example of the ratio $A_n$.

The second phase difference pixel correction coefficient refers to a ratio $B_n$ of the digital phase difference pixel data 69B1 of the second phase difference pixel R to the digital non-phase difference pixel data 69B2 of the non-phase difference pixel N in a case where the non-phase difference pixel N and the second phase difference pixel R adjacent to each other are used as a target. In the example illustrated in FIG. 26, a ratio $B_0$ and a ratio $B_1$ are illustrated as an example of the ratio $B_n$.

Figure 27:
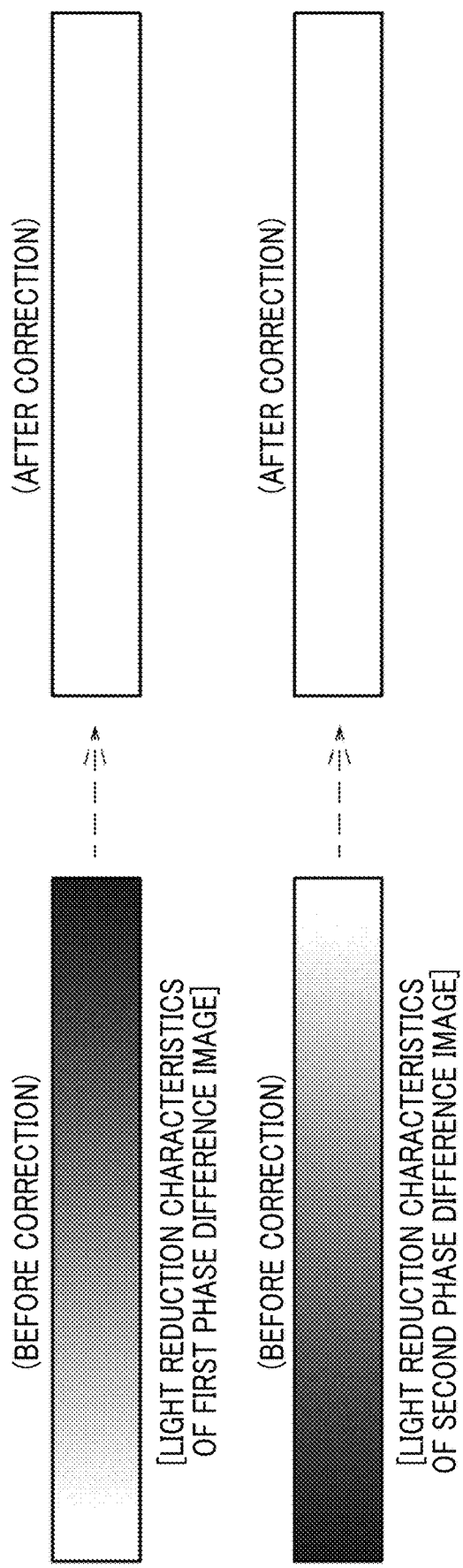
FIG. 27 is a conceptual diagram illustrating an example of an aspect before and after correction of the first phase difference image based on the first phase difference pixel data from the first phase difference pixel and the second phase difference image based on the second phase difference pixel data from the second phase difference pixel included in the imaging element according to the second embodiment.

The correction coefficient calculated by the calculation circuit 62E1 is output to the signal processing portion 50 by the output circuit 62D. In the signal processing portion 50, as illustrated in FIG. 27 as an example, the light reduction characteristics are corrected using the correction coefficient. In such a manner, by calculating the correction coefficient for correcting the light reduction characteristics by the calculation circuit 62E1 and outputting the calculated correction coefficient to the signal processing portion 50 by the output circuit 62D, the light reduction characteristics appearing in an image based on the digital phase difference pixel data 69B1 can be corrected.

While an example of a form of calculating the correction coefficient is illustratively described here, the technology of the present disclosure is not limited thereto. For example, the control circuit 62E may derive the correction coefficient using an association table in which the digital non-phase difference pixel data 69B2 of the non-phase difference pixel N and the digital phase difference pixel data 69B1 are associated with the correction coefficient.

In addition, while an example of a form of outputting the correction coefficient to the signal processing portion 50 is illustratively described here, the technology of the present disclosure is not limited thereto. For example, the image processing circuit 62C and/or the control circuit 62E may correct the light reduction characteristics appearing in the image based on the digital phase difference pixel data 69B1 using the correction coefficient.

Figure 28:
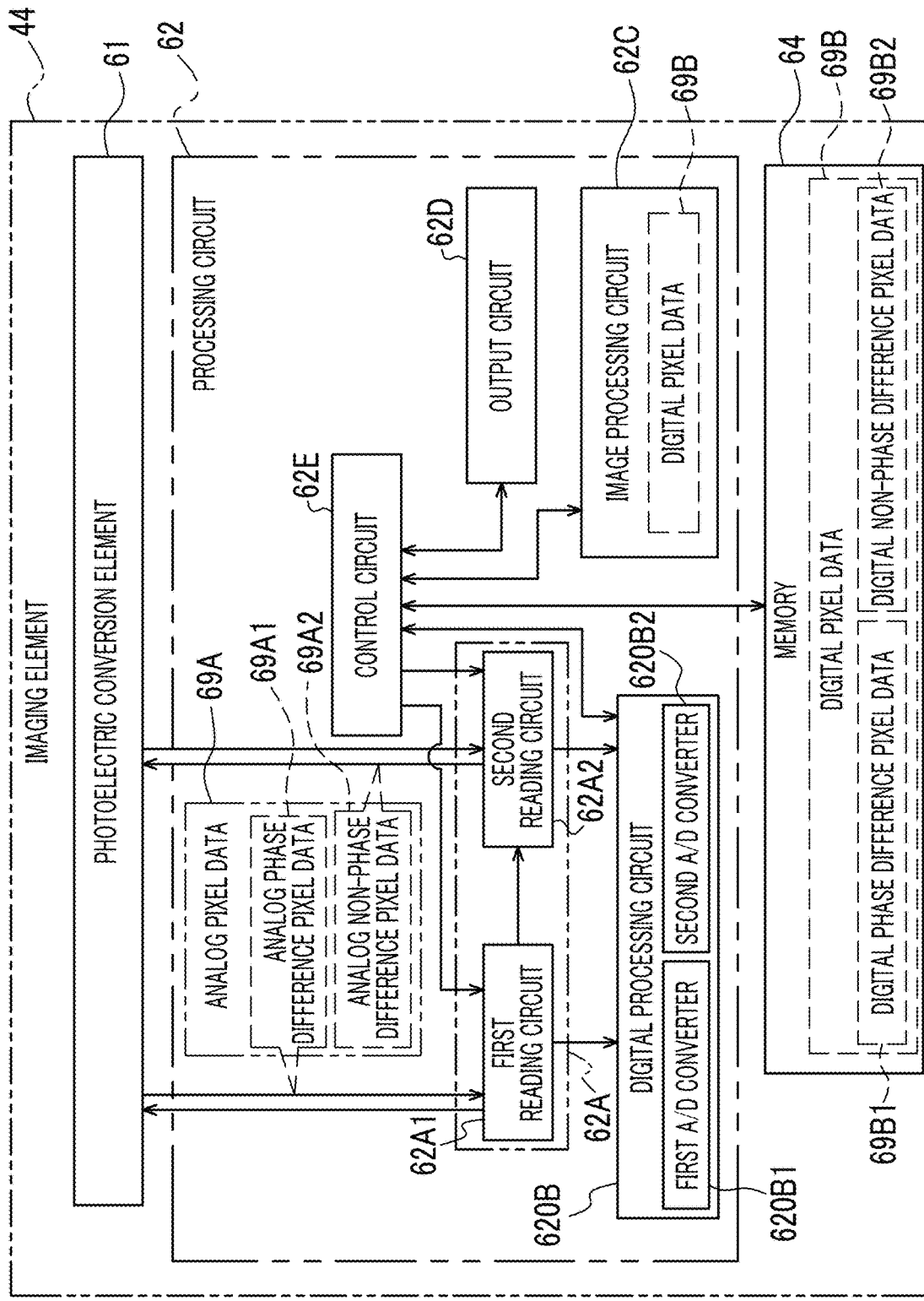
FIG. 28 is a block diagram illustrating a modification example of the configuration of the electric system of the imaging element included in the imaging apparatus according to the first and second embodiments.

In each of the embodiments, while the A/D converter 62B1 shared for the analog phase difference pixel data 69A1 and the analog non-phase difference pixel data 69A2 is illustrated, the technology of the present disclosure is not limited thereto, and a plurality of A/D converters may be applied. In this case, for example, as illustrated in FIG. 28, a digital processing circuit 620B is applied instead of the digital processing circuit 62B (refer to FIG. 9 and FIG. 19) described in each of the embodiments. The digital processing circuit 620B includes a plurality of A/D converters. The "plurality of A/D converters" here include a first A/D converter 620B1 and a second A/D converter 620B2. The first A/D converter 620B1 is an A/D converter used for only the analog phase difference pixel data 69A1, and the second A/D converter 620B2 is an A/D converter used for only the analog non-phase difference pixel data 69A2. The first A/D converter 620B1 and the second A/D converter 620B2 perform the A/D conversion independently of each other. Accordingly, the A/D conversion of the analog phase difference pixel data 69A1 and the A/D conversion of the analog non-phase difference pixel data 69A2 can be performed in parallel in the output period using the first A/D converter 620B1 and the second A/D converter 620B2.

In each of the embodiments, while an example of a form in which the output circuit 62D outputs the digital phase difference pixel data 69B1 to the signal processing portion 50 from the imaging element 44 is exemplified, the technology of the present disclosure is not limited thereto. For example, the output circuit 62D may output correlation data to the signal processing portion 50. In this case, the control circuit 62E acquires various types of information such as information indicating characteristics of an incidence angle of the subject light, an F number, and a defocus amount from the controller 46. The control circuit 62E corrects brightness of the digital phase difference pixel data 69B1 related to the first phase difference pixel L and brightness of the digital phase difference pixel data 69B1 related to the second phase difference pixel R in accordance with the acquired various types of information. That is, the control circuit 62E performs sensitivity ratio correction on the digital phase difference pixel data 69B1 related to the first phase difference pixel L and the digital phase difference pixel data 69B1 related to the second phase difference pixel R. The control circuit 62E performs a correlation operation using the digital phase difference pixel data 69B1 subjected to the sensitivity ratio correction, and the output circuit 62D outputs the correlation data that is a result of the correlation operation, to the signal processing portion 50.

In such a manner, by outputting the correlation data to the signal processing portion 50 from the imaging element 44, an output data amount from the output circuit 62D to the signal processing portion 50 can be decreased, compared to a case of outputting the digital phase difference pixel data 69B1 from the output circuit 62D. Consequently, high-speed AF can be achieved.

In the correlation operation, pattern matching is performed. Thus, it is preferable that the brightness of the digital phase difference pixel data 69B1 related to the first phase difference pixel L is the same as or similar to the brightness of the digital phase difference pixel data 69B1 related to the second phase difference pixel R. Thus, the correlation operation performed by the control circuit 62E may be a normalized cross-correlation operation. In this case, similarity between the digital phase difference pixel data 69B1 related to the first phase difference pixel L and the digital phase difference pixel data 69B1 related to the second phase difference pixel R can be stably calculated even in a case where brightness of the subject changes.

In each of the embodiments, while a case where the imaging frame rate is fixed is described, the technology of the present disclosure is not limited thereto. For example, the imaging frame rate may be changed in connection with an exposure time period. In addition, the imaging frame rate may be increased as the exposure time period is shortened. In addition, exposure of the photoelectric conversion element 61 may be resumed after reading of the analog pixel data 69A of at least one pixel by the reading circuit 62A is completed after exposure is started. In addition, a reading speed of the analog pixel data 69A by the reading circuit 62A may be changed in accordance with the number of frames from which the analog pixel data 69A is read out in parallel. In addition, the reading circuit 62A may change a data amount of the analog pixel data 69A in a case of performing the A/D conversion on the analog pixel data 69A, in accordance with the number of frames from which the analog pixel data 69A is read out in parallel, and the number of A/D converters performing the A/D conversion on the read analog pixel data 69A.

In addition, while an example of a form of implementing the processing circuit 62 by the device including the ASIC and the FPGA is illustratively described in each of the embodiments, the technology of the present disclosure is not limited thereto. For example, imaging processing described above may be implemented by a software configuration using a computer.

Figure 29:
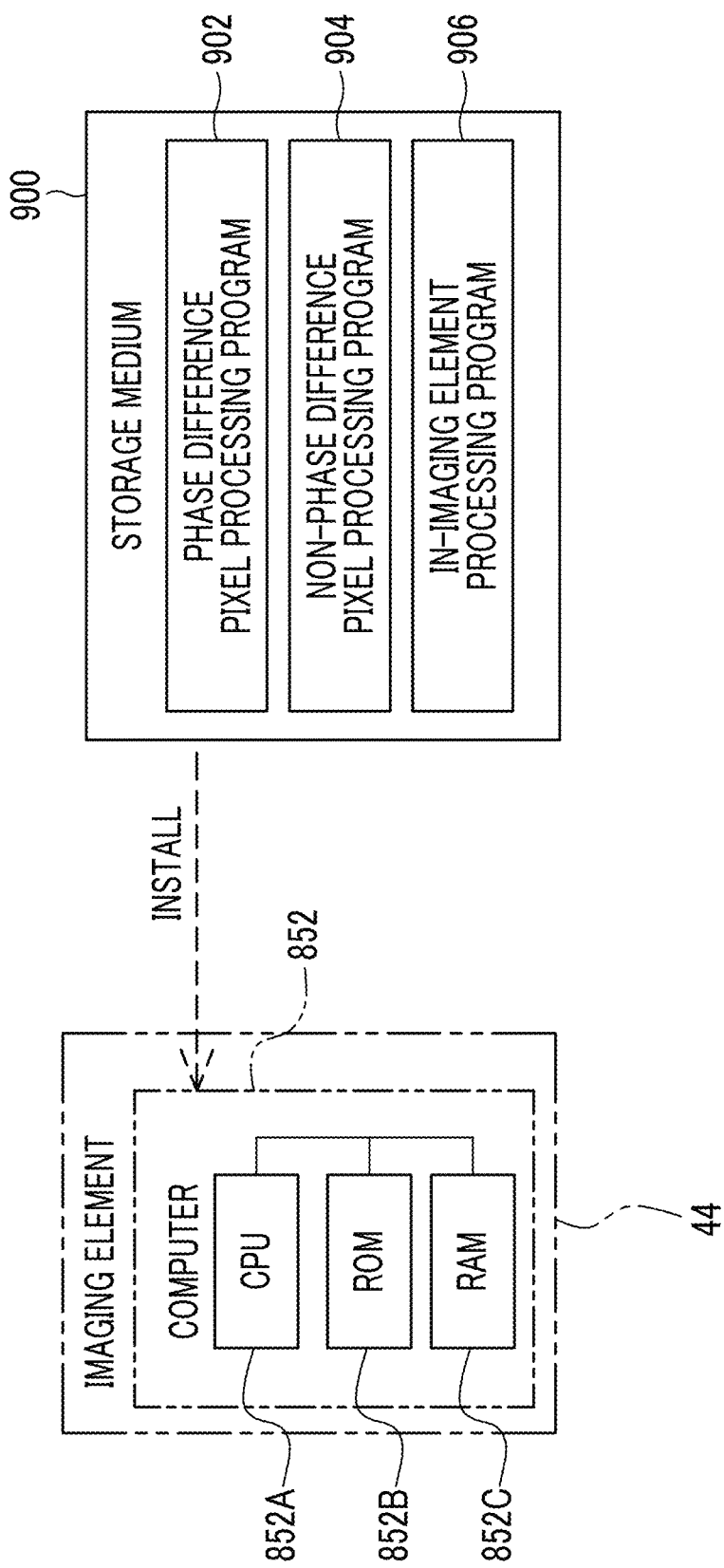
FIG. 29 is a conceptual diagram illustrating an example of an aspect in which various programs are installed on a computer in the imaging element from a storage medium storing the various programs.

In this case, for example, as illustrated in FIG. 29, various programs causing a computer 852 incorporated in the imaging element 44 to execute the phase difference pixel processing, the non-phase difference pixel processing, and the in-imaging element processing are stored in a storage medium 900.

The various programs refer to a phase difference pixel processing program 902, a non-phase difference pixel processing program 904, and an in-imaging element processing program 906. The phase difference pixel processing program 902 is a program causing the computer 852 to execute the phase difference pixel processing. The non-phase difference pixel processing program 904 is a program causing the computer 852 to execute the non-phase difference pixel processing. The in-imaging element processing program 906 is a program causing the computer 852 to execute the in-imaging element processing.

As illustrated in FIG. 29 as an example, the computer 852 comprises a CPU 852A, a ROM 852B, and a RAM 852C. The various programs stored in the storage medium 900 are installed on the computer 852. The CPU 852A executes the phase difference pixel processing in accordance with the phase difference pixel processing program 902. In addition, the CPU 852A executes the non-phase difference pixel processing in accordance with the non-phase difference pixel processing program 904. Furthermore, the CPU 852A executes the in-imaging element processing in accordance with the in-imaging element processing program 906.

While a single CPU is illustrated as the CPU 852A here, the technology of the present disclosure is not limited thereto. A plurality of CPUs may be employed instead of the CPU 852A. The storage medium is a non-temporary storage medium. Any portable storage medium such as an SSD or a USB memory is exemplified as an example of the storage medium 900.

While the various programs are stored in the storage medium 900 in the example illustrated in FIG. 29, the technology of the present disclosure is not limited thereto. For example, the various programs may be stored in advance in the ROM 852B, and the CPU 852A may read out the various programs from the ROM 852B, load the various programs into the RAM 852C, and execute the loaded various programs.

In addition, the various programs may be stored in a storage portion of another computer, a server apparatus, or the like connected to the computer 852 through a communication network (not illustrated), and the various programs may be downloaded to the computer 852 in response to a request from the imaging apparatus 10. In this case, the downloaded various programs are executed by the CPU 852A of the computer 852.

In addition, the computer 852 may be disposed on an outside of the imaging element 44. In this case, the computer 852 may control the processing circuit 62 in accordance with the various programs.

The following various processors can be used as a hardware resource for executing the phase difference pixel processing, the non-phase difference pixel processing, the in-imaging element processing, the timing control processing, and the pixel data processing (hereinafter, referred to as "various types of processing") described in each of the embodiments. For example, as described above, a CPU that is a general-purpose processor functioning as the hardware resource for executing the various types of processing by executing software, that is, the programs, is exemplified as a processor. In addition, a dedicated electric circuit such as an FPGA, a PLD, or an ASIC that is a processor having a circuit configuration dedicatedly designed to execute a specific type of processing is exemplified as a processor.

The hardware resource for executing the various types of processing may be configured with one of those various processors or may be configured with a combination of two or more processors of the same type or different types (for example, a combination of a plurality of FPGAs or a combination of a CPU and an FPGA). In addition, the hardware resource for executing the various types of processing may be one processor.

As an example of a configuration with one processor, first, as represented by a computer such as a client and a server, a form in which one processor is configured with a combination of one or more CPUs and software, and in which this processor functions as a hardware resource for executing in-imaging apparatus processing is available. Second, as represented by an SoC or the like, a form of using a processor that implements, by one IC chip, a function of the entire system including a plurality of hardware resources for executing the various types of processing is available. In such a manner, the in-imaging apparatus processing is implemented using one or more of the various processors as the hardware resource.

Furthermore, as a hardware structure of those various processors, more specifically, an electric circuit in which circuit elements such as semiconductor elements are combined can be used.

Figure 30:
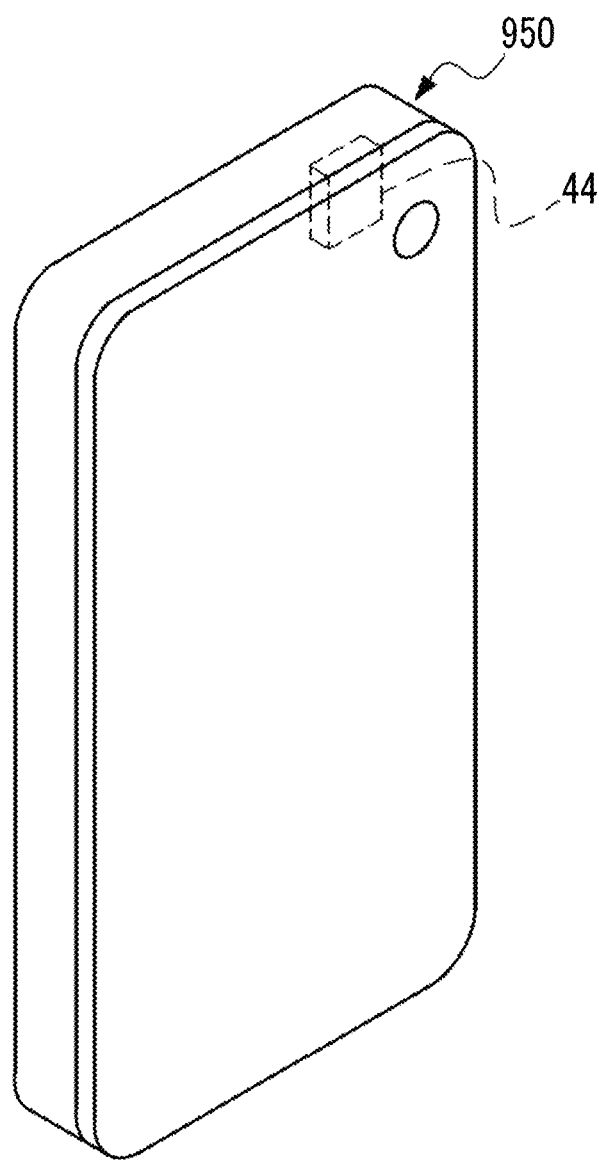
FIG. 30 is a block diagram illustrating an example of a schematic configuration of a smart device incorporating the imaging element according to the first and second embodiments.

While an interchangeable lens camera is illustrated as the imaging apparatus 10 in each of the embodiments, the technology of the present disclosure is not limited thereto. For example, the technology of the present disclosure may be applied to a smart device 950 illustrated in FIG. 30. The smart device 950 illustrated in FIG. 30 as an example is an example of the imaging apparatus according to the embodiments of the technology of the present disclosure. The imaging element 44 described in the embodiments is mounted in the smart device 950. Even with the smart device 950 configured in such a manner, the same actions and effects as the imaging apparatus 10 described in each of the embodiments are obtained. The technology of the present disclosure can be applied to not only the smart device 950 but also a personal computer or a wearable terminal apparatus.

In addition, while the display 32 is illustrated in each of the embodiments, the technology of the present disclosure is not limited thereto. For example, a separate display that is retrofit into the imaging apparatus main body 12 may be used as the "display portion (display)" according to the embodiments of the technology of the present disclosure.

In addition, the various types of processing are merely an example. Accordingly, unnecessary steps may be deleted, new steps may be added, or a processing order may be rearranged without departing from a gist of the technology of the present disclosure.

Above described contents and illustrated contents are detailed description for parts according to the embodiments of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiments of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An imaging element including a focus related pixel, which is a pixel that can acquire data related to a focus state of a subject, the imaging element comprising:
   a reading circuit that reads out pixel data obtained by imaging the subject at a first frame rate;
   a memory that stores the pixel data read out by the reading circuit; and
   an output circuit that outputs image data based on the pixel data stored in the memory at a second frame rate, wherein the first frame rate is a higher frame rate than the second frame rate, wherein the pixel data includes focus related pixel data, which is data related to the focus state, and non-focus related pixel data different from the focus related pixel data, and wherein the reading circuit reads out the pixel data of each of a plurality of frames in parallel within an output period defined by the second frame rate as a period in which the image data of one frame is output, and performs reading of the non-focus related pixel data and a plurality of readings of the focus related pixel data within the output period.

2. The imaging element according to claim 1, wherein the reading circuit performs reading of the non-focus related pixel data and reading of the focus related pixel data in parallel.

3. The imaging element according to claim 1, wherein the reading circuit reads out the pixel data in units of lines.

4. The imaging element according to claim 1, wherein:

the focus related pixel data is pixel data of the focus related pixel, and the non-focus related pixel data is pixel data of a non-focus related pixel that is a pixel different from the focus related pixel.

5. The imaging element according to claim 4, wherein:

reading of the non-focus related pixel data is reading of the non-focus related pixel data from the non-focus related pixel, and the plurality of readings of the focus related pixel data is a plurality of readings of the focus related pixel data from the focus related pixel.

6. The imaging element according to claim 4, further comprising:

an imaging surface on which a plurality of first lines including the focus related pixel and a plurality of second lines consisting of only the non-focus related pixel are arranged, wherein the reading circuit includes a first reading circuit that reads out the focus related pixel data from each focus related pixel included in the plurality of first lines, and a second reading circuit that reads out the non-focus related pixel data from each non-focus related pixel included in the plurality of second lines.

7. The imaging element according to claim 6, wherein reading of the focus related pixel data from the focus related pixel by the first reading circuit and reading of the non-focus related pixel data from the non-focus related pixel by the second reading circuit are independently performed.

8. The imaging element according to claim 7, wherein in a reading period of one frame, reading of the focus related pixel data from the focus related pixel by the first reading circuit is performed earlier than reading of the non-focus related pixel data from the non-focus related pixel by the second reading circuit.

9. The imaging element according to claim 6, wherein the first lines are lines in which the focus related pixel and the non-focus related pixel are periodically arranged.

10. The imaging element according to claim 6, wherein, on the imaging surface, the first lines and a predetermined number of lines of the second lines are alternately arranged in a direction intersecting with a line direction of the first lines.

11. The imaging element according to claim 1, wherein the reading circuit reads out the non-focus related pixel data of one frame as recording pixel data within a reading period of one frame, and reads out the focus related pixel data during reading of the non-focus related pixel data as the recording pixel data.

12. The imaging element according to claim 11, wherein the reading circuit reads out the non-focus related pixel data and the focus related pixel data as display pixel data within the reading period of one frame, and reads out the non-focus related pixel data as the recording pixel data in a case in which a predetermined condition is satisfied.

13. The imaging element according to claim 11, wherein the reading circuit reads out the non-focus related pixel data as the recording pixel data in a case of a continuous shooting mode.

14. The imaging element according to claim 1, further comprising:

a derivation circuit that derives a correction coefficient for correcting light reduction characteristics caused by the focus related pixel based on the focus related pixel data, wherein the output circuit outputs the correction coefficient derived by the derivation circuit.

15. The imaging element according to claim 1, wherein the image data includes first pixel data based on the non-focus related pixel data and second pixel data based on the focus related pixel data obtained by the plurality of reading of the focus related pixel data, and in a case of outputting the image data of one frame, the output circuit outputs the first pixel data and the second pixel data at different timings.

16. The imaging element according to claim 15, wherein the output circuit outputs the first pixel data after output of the second pixel data is completed.

17. The imaging element according to claim 1, wherein the image data includes pixel data based on the non-focus related pixel data and pixel data based on a statistical value of the focus related pixel data obtained by the plurality of reading of the focus related pixel data.

18. The imaging element according to claim 17, wherein the statistical value is an arithmetic mean value of the focus related pixel data.

19. The imaging element according to claim 1, further comprising:

an A/D converter that is shared for the focus related pixel data and the non-focus related pixel data, wherein the A/D converter performs A/D conversion on the focus related pixel data and the non-focus related pixel data at different timings.

20. The imaging element according to claim 1, further comprising:

a plurality of A/D converters, wherein the plurality of A/D converters include a first A/D converter used for only the focus related pixel data and a second A/D converter used for only the non-focus related pixel data.

21. The imaging element according to claim 1, wherein at least a photoelectric conversion element and the memory are formed in one chip.

22. The imaging element according to claim 21, wherein the imaging element is a laminated imaging element in which the photoelectric conversion element is laminated with the memory.

23. An imaging apparatus comprising:

the imaging element according to claim 1; and a processor configured to perform at least one of a control for displaying the image based on the image data output by the output circuit on a display or a control for storing the image data output by the output circuit in a storage device.

24. An operation method of an imaging element that includes a focus related pixel, which is a pixel that can acquire data related to a focus state of a subject, a reading circuit that reads out pixel data obtained by imaging the subject at a first frame rate, a memory that stores the pixel data read out by the reading circuit, and an output circuit that outputs image data based on the pixel data stored in the memory at a second frame rate,
  wherein the first frame rate is a higher frame rate than the second frame rate, and
  wherein the pixel data includes focus related pixel data and non-focus related pixel data different from the focus related pixel data,
  the operation method comprising, by the reading circuit, reading out the pixel data of each of a plurality of frames in parallel within an output period defined by the second frame rate as a period in which the image data of one frame is output, and performing reading of the non-focus related pixel data and a plurality of readings of the focus related pixel data within the output period.

25. A non-transitory computer-readable storage medium storing a program executable by a computer to function, in an imaging element including a focus related pixel, which is a pixel that can acquire data related to a focus state of a subject, as a reading circuit that reads out pixel data obtained by imaging the subject at a first frame rate, as a memory that stores the pixel data read out by the reading circuit, and as an output circuit that outputs image data based on the pixel data stored in the memory at a second frame rate,
  wherein the first frame rate is a higher frame rate than the second frame rate,
  wherein the pixel data includes focus state pixel data that is data related to the focus state and non-focus related pixel data different from the focus state pixel data, and
  wherein the reading circuit reads out the pixel data of each of a plurality of frames in parallel within an output period defined by the second frame rate as a period in which the image data of one frame is output, and performs reading of the non-focus related pixel data and a plurality of readings of the focus related pixel data within the output period.

* * * * *